US012656764B2

(12) United States Patent
Yu et al.

(10) Patent No.: US 12,656,764 B2
(45) Date of Patent: Jun. 16, 2026

(54) ASSET RISK PREDICTOR OF OPERATION OF AN INDUSTRIAL ASSET

(71) Applicant: Rockwell Automation Technologies, Inc., Mayfield Heights, OH (US)

(72) Inventors: Min Hua Yu, Toronto (CA); Mohammad Esmalifalak, Toronto (CA); Tareq Al-Masri, Toronto (CA); Chatheersh Sivakumaran, Toronto (CA); Ashish Mistry, Toronto (CA); Yifeng Chen, Toronto (CA); Michael Cooper, Toronto (CA); Hyo Jung Son, Calgary (CA); Liudmila Domakhina, Toronto (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 298 days.

(21) Appl. No.: 18/231,666

(22) Filed: Aug. 8, 2023

(65) Prior Publication Data
US 2025/0004451 A1 Jan. 2, 2025

Related U.S. Application Data

(60) Provisional application No. 63/523,544, filed on Jun. 27, 2023.

(51) Int. Cl.
*G05B 19/418* (2006.01)

(52) U.S. Cl.
CPC ..... *G05B 19/4185* (2013.01); *G05B 19/4183* (2013.01)

(58) Field of Classification Search
CPC ........................ G05B 19/4185; G05B 19/4183
See application file for complete search history.

(56) References Cited

U.S. PATENT DOCUMENTS

| | | | |
|---|---|---|---|
| 11,656,605 B1 * | 5/2023 | Manley ................. | G05B 23/02 700/108 |
| 2004/0186927 A1 * | 9/2004 | Eryurek ............ | G05B 23/0278 710/13 |

(Continued)

OTHER PUBLICATIONS

Tractian; https://tractian.com/en, previously accessed Jun. 12, 2023, 30 pages.

(Continued)

*Primary Examiner* — Christopher E. Everett
(74) *Attorney, Agent, or Firm* — Fletcher Yoder, PC

(57) ABSTRACT
Systems and methods described herein relate to an asset risk predictor that may receive data corresponding to one or more industrial assets and generate a device model corresponding to the one or more industrial assets. The device model may indicate a relationship between a normal operation of a first industrial asset and data acquired by a second industrial asset. The device model may be trained while the first industrial asset and the second industrial asset are in situ and operating within a desired industrial automation process. An alert score may be generated based on the relationship indicated by the device model, where the alert score may be an indication of a likelihood of an event occurring at the first industrial asset. A maintenance work order may be generated based on alert scores and existing work orders.

20 Claims, 24 Drawing Sheets

(56) References Cited

U.S. PATENT DOCUMENTS

| | | | |
|---|---|---|---|
| 2014/0250153 A1* | 9/2014 | Nixon ..................... | G06F 16/22 707/812 |
| 2021/0096551 A1* | 4/2021 | Sayyarrodsari .. | G06Q 10/06395 |
| 2021/0097456 A1* | 4/2021 | Sayyarrodsari .... | G05B 19/4183 |
| 2021/0356943 A1* | 11/2021 | Taguchi ............. | G05B 19/4183 |

OTHER PUBLICATIONS

Amazon Monitron, https://aws.amazon.com/monitron/, previously accessed May 4, 2023, 7 pages.
Augury, https://www.augury.com/, previously accessed Apr. 26, 2023, 10 pages.
Sensemore, https://sensemore.io/, previously accessed May 31, 2023, 12 pages.
Streametric, https://www.streametric.io/, previously accessed Apr. 2, 2023, 3 pages.
Mechmine, https://mechmine.com/en/, previously accessed Apr. 20, 2022, 11 pages.
SpaceAge Labs, https://www.spaceage-labs.com/, previously accessed Jun. 10, 2023, 6 pages.

* cited by examiner

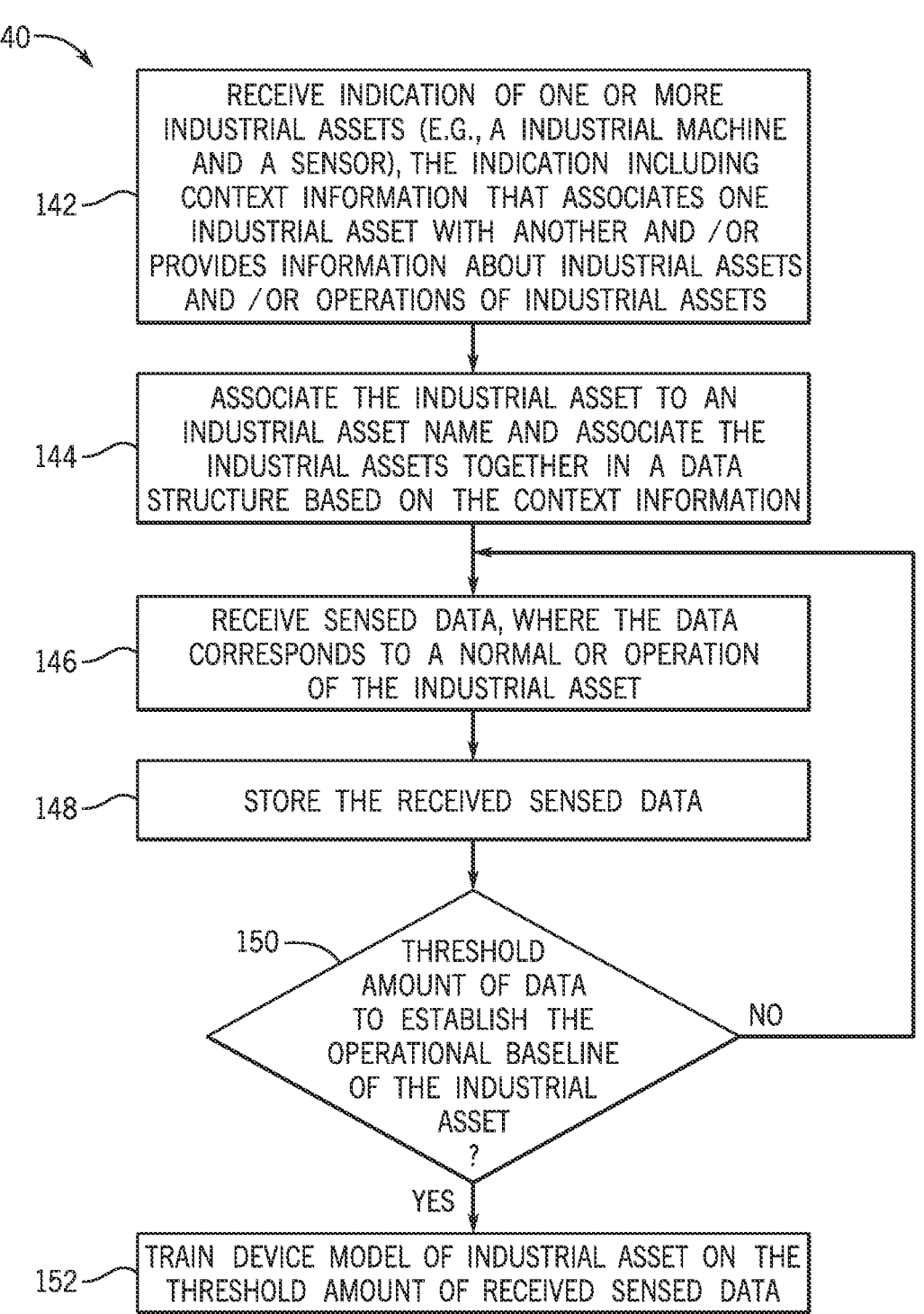

140

142 — RECEIVE INDICATION OF ONE OR MORE INDUSTRIAL ASSETS (E.G., A INDUSTRIAL MACHINE AND A SENSOR), THE INDICATION INCLUDING CONTEXT INFORMATION THAT ASSOCIATES ONE INDUSTRIAL ASSET WITH ANOTHER AND /OR PROVIDES INFORMATION ABOUT INDUSTRIAL ASSETS AND /OR OPERATIONS OF INDUSTRIAL ASSETS

144 — ASSOCIATE THE INDUSTRIAL ASSET TO AN INDUSTRIAL ASSET NAME AND ASSOCIATE THE INDUSTRIAL ASSETS TOGETHER IN A DATA STRUCTURE BASED ON THE CONTEXT INFORMATION

146 — RECEIVE SENSED DATA, WHERE THE DATA CORRESPONDS TO A NORMAL OR OPERATION OF THE INDUSTRIAL ASSET

148 — STORE THE RECEIVED SENSED DATA

150 — THRESHOLD AMOUNT OF DATA TO ESTABLISH THE OPERATIONAL BASELINE OF THE INDUSTRIAL ASSET ?

NO

YES

152 — TRAIN DEVICE MODEL OF INDUSTRIAL ASSET ON THE THRESHOLD AMOUNT OF RECEIVED SENSED DATA

Figure 6:
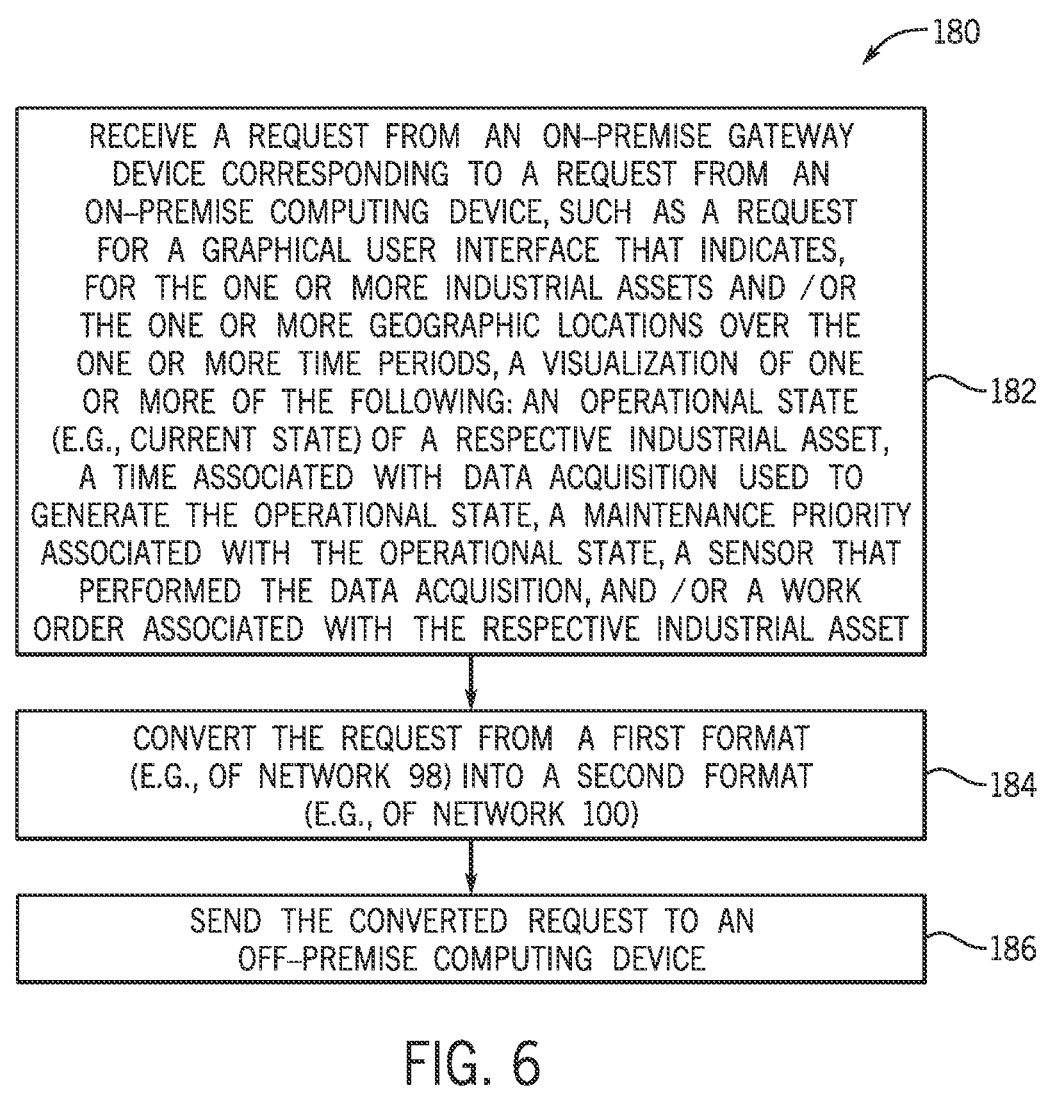

RECEIVE A REQUEST FROM AN ON-PREMISE GATEWAY DEVICE CORRESPONDING TO A REQUEST FROM AN ON-PREMISE COMPUTING DEVICE, SUCH AS A REQUEST FOR A GRAPHICAL USER INTERFACE THAT INDICATES, FOR THE ONE OR MORE INDUSTRIAL ASSETS AND / OR THE ONE OR MORE GEOGRAPHIC LOCATIONS OVER THE ONE OR MORE TIME PERIODS, A VISUALIZATION OF ONE OR MORE OF THE FOLLOWING: AN OPERATIONAL STATE (E.G., CURRENT STATE) OF A RESPECTIVE INDUSTRIAL ASSET, A TIME ASSOCIATED WITH DATA ACQUISITION USED TO GENERATE THE OPERATIONAL STATE, A MAINTENANCE PRIORITY ASSOCIATED WITH THE OPERATIONAL STATE, A SENSOR THAT PERFORMED THE DATA ACQUISITION, AND / OR A WORK ORDER ASSOCIATED WITH THE RESPECTIVE INDUSTRIAL ASSET

~182

CONVERT THE REQUEST FROM A FIRST FORMAT (E.G., OF NETWORK 98) INTO A SECOND FORMAT (E.G., OF NETWORK 100)

~184

SEND THE CONVERTED REQUEST TO AN OFF-PREMISE COMPUTING DEVICE

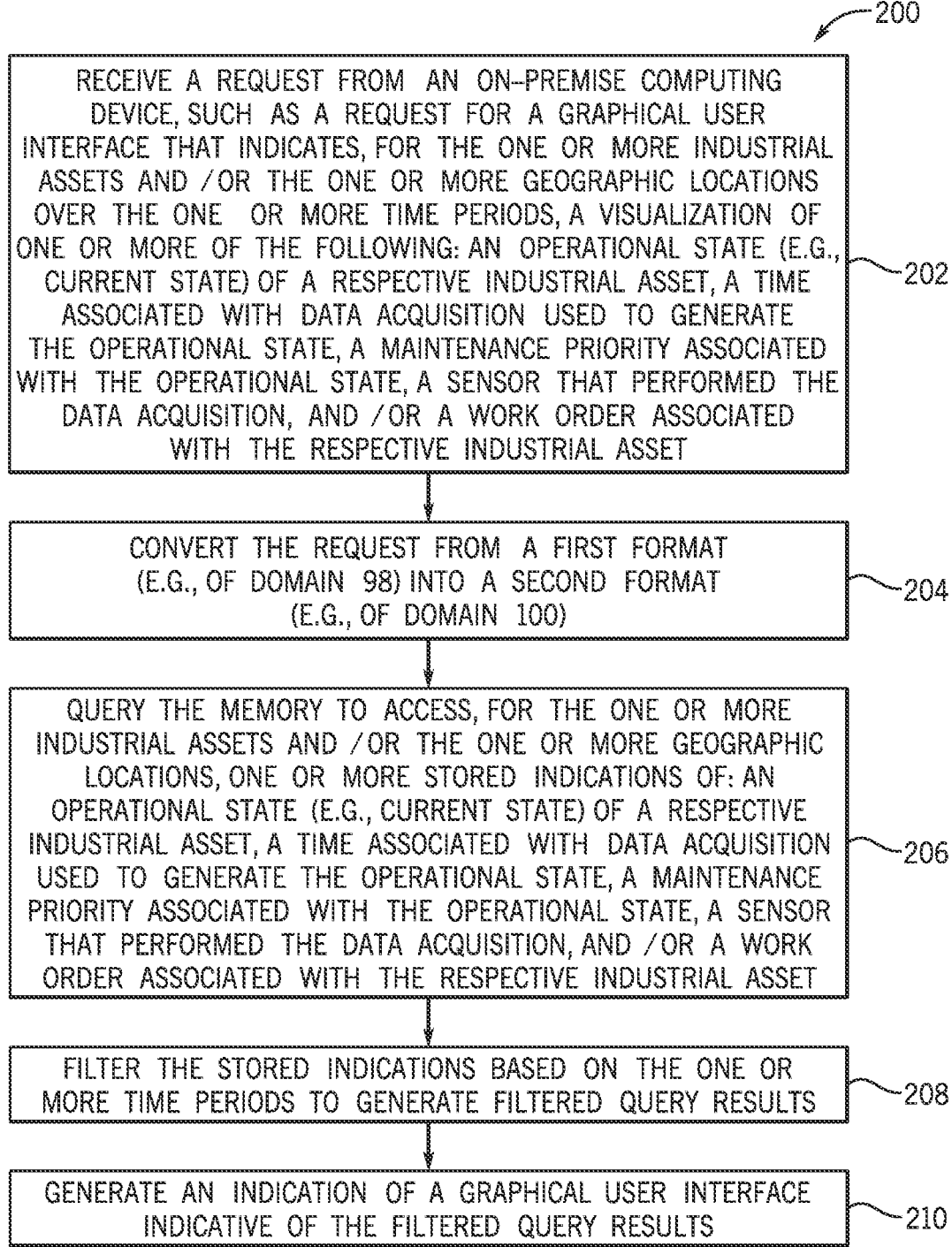

200

RECEIVE A REQUEST FROM AN ON-PREMISE COMPUTING DEVICE, SUCH AS A REQUEST FOR A GRAPHICAL USER INTERFACE THAT INDICATES, FOR THE ONE OR MORE INDUSTRIAL ASSETS AND /OR THE ONE OR MORE GEOGRAPHIC LOCATIONS OVER THE ONE OR MORE TIME PERIODS, A VISUALIZATION OF ONE OR MORE OF THE FOLLOWING: AN OPERATIONAL STATE (E.G., CURRENT STATE) OF A RESPECTIVE INDUSTRIAL ASSET, A TIME ASSOCIATED WITH DATA ACQUISITION USED TO GENERATE THE OPERATIONAL STATE, A MAINTENANCE PRIORITY ASSOCIATED WITH THE OPERATIONAL STATE, A SENSOR THAT PERFORMED THE DATA ACQUISITION, AND /OR A WORK ORDER ASSOCIATED WITH THE RESPECTIVE INDUSTRIAL ASSET

202

CONVERT THE REQUEST FROM A FIRST FORMAT (E.G., OF DOMAIN 98) INTO A SECOND FORMAT (E.G., OF DOMAIN 100)

204

QUERY THE MEMORY TO ACCESS, FOR THE ONE OR MORE INDUSTRIAL ASSETS AND /OR THE ONE OR MORE GEOGRAPHIC LOCATIONS, ONE OR MORE STORED INDICATIONS OF: AN OPERATIONAL STATE (E.G., CURRENT STATE) OF A RESPECTIVE INDUSTRIAL ASSET, A TIME ASSOCIATED WITH DATA ACQUISITION USED TO GENERATE THE OPERATIONAL STATE, A MAINTENANCE PRIORITY ASSOCIATED WITH THE OPERATIONAL STATE, A SENSOR THAT PERFORMED THE DATA ACQUISITION, AND /OR A WORK ORDER ASSOCIATED WITH THE RESPECTIVE INDUSTRIAL ASSET

206

FILTER THE STORED INDICATIONS BASED ON THE ONE OR MORE TIME PERIODS TO GENERATE FILTERED QUERY RESULTS

208

GENERATE AN INDICATION OF A GRAPHICAL USER INTERFACE INDICATIVE OF THE FILTERED QUERY RESULTS

Figure 8:
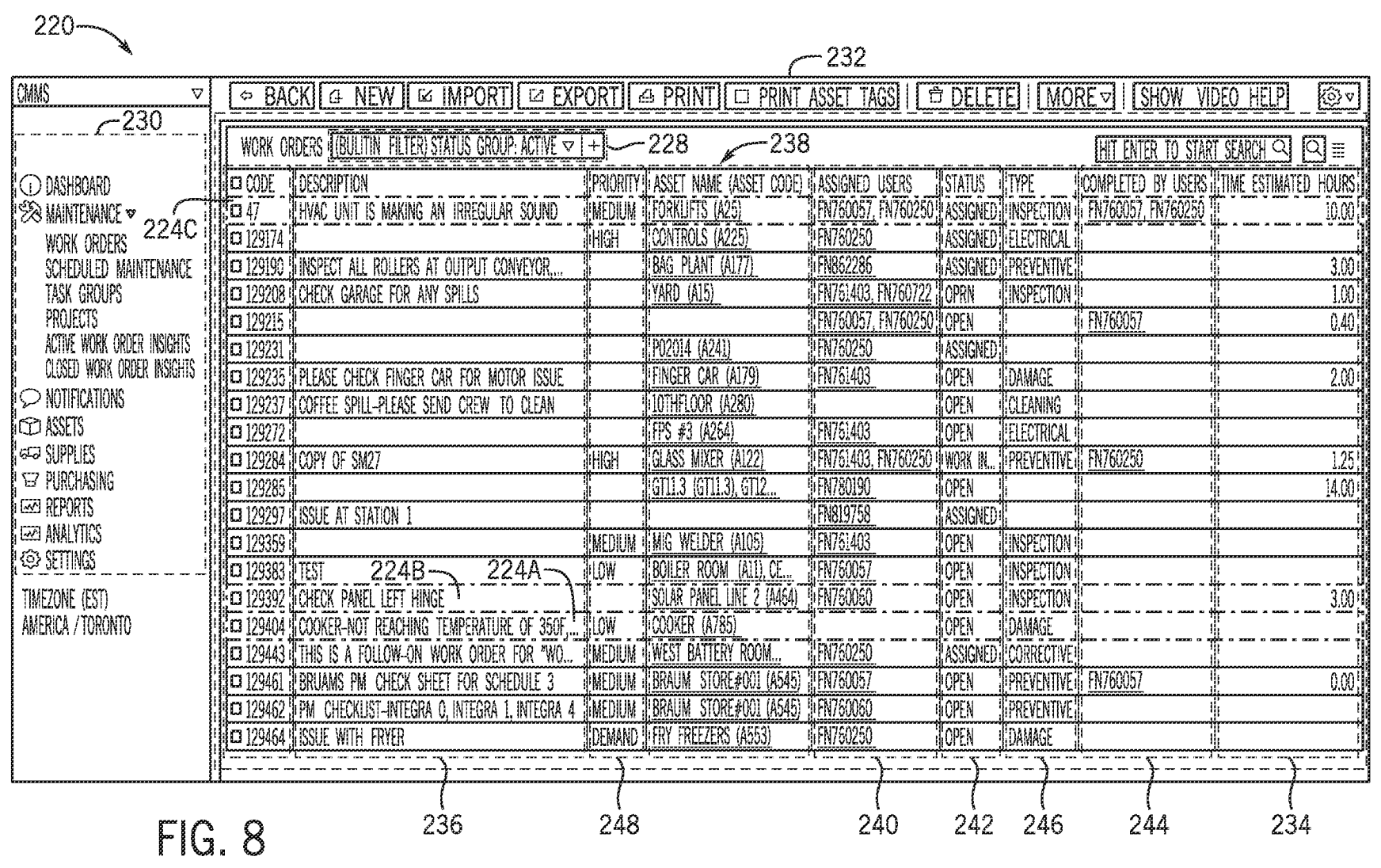

CMMS

- DASHBOARD
- MAINTENANCE ▾ (224C)
  - WORK ORDERS
  - SCHEDULED MAINTENANCE
  - TASK GROUPS
  - PROJECTS
  - ACTIVE WORK ORDER INSIGHTS
  - CLOSED WORK ORDER INSIGHTS
- NOTIFICATIONS
- ASSETS
- SUPPLIES
- PURCHASING
- REPORTS
- ANALYTICS
- SETTINGS

TIMEZONE (EST)
AMERICA / TORONTO

BACK | NEW | IMPORT | EXPORT | PRINT | PRINT ASSET TAGS | DELETE | MORE ▾ | SHOW VIDEO HELP | ⚙▾

WORK ORDERS [BUILT-IN FILTER] STATUS GROUP: ACTIVE ▾ | +

HIT ENTER TO START SEARCH 🔍

| CODE | DESCRIPTION | PRIORITY | ASSET NAME (ASSET CODE) | ASSIGNED USERS | STATUS | TYPE | COMPLETED BY USERS | TIME ESTIMATED HOURS |
|---|---|---|---|---|---|---|---|---|
| 47 | HVAC UNIT IS MAKING AN IRREGULAR SOUND | MEDIUM | FORKLIFTS (A25) | FN760057, FN760250 | ASSIGNED | INSPECTION | FN760057, FN760250 | 10.00 |
| 129174 | | HIGH | CONTROLS (A225) | FN760250 | ASSIGNED | ELECTRICAL | | 3.00 |
| 129190 | INSPECT ALL ROLLERS AT OUTPUT CONVEYOR... | | BAG PLANT (A177) | FN862286 | ASSIGNED | PREVENTIVE | | 1.00 |
| 129208 | CHECK GARAGE FOR ANY SPILLS | | YARD (A15) | FN761403, FN760722 | OPEN | INSPECTION | | 0.40 |
| 129215 | | | | FN760057, FN760250 | OPEN | | FN760057 | |
| 129231 | | | PO2014 (A241) | FN760250 | ASSIGNED | | | |
| 129235 | PLEASE CHECK FINGER CAR FOR MOTOR ISSUE | | FINGER CAR (A179) | FN761403 | OPEN | DAMAGE | | 2.00 |
| 129257 | COFFEE SPILL-PLEASE SEND CREW TO CLEAN | | 10TH FLOOR (A280) | | OPEN | CLEANING | | |
| 129272 | | | FPS #3 (A264) | | OPEN | ELECTRICAL | | |
| 129284 | COPY OF SM27 | HIGH | GLASS MIXER (A122) | FN761403, FN760250 | WORK IN... | ELECTRICAL | | 1.25 |
| 129285 | | | GT113 (GT113, GT12... | FN780190 | ASSIGNED | PREVENTIVE | FN760250 | 14.00 |
| 129297 | ISSUE AT STATION 1 | | | FN919758 | ASSIGNED | | | |
| 129359 | | MEDIUM | MIG WELDER (A105) | FN761403 | OPEN | INSPECTION | | |
| 129383 | TEST | LOW | BOILER ROOM (A11) CE... | FN760057 | OPEN | INSPECTION | | |
| 129392 | CHECK PANEL LEFT HINGE | | SOLAR PANEL LINE 2 (A464) | FN760050 | OPEN | INSPECTION | | 3.00 |
| 129404 | COOKER-NOT REACHING TEMPERATURE OF 350F... | LOW | COOKER (A785) | | OPEN | DAMAGE | | |
| 129443 | THIS IS A FOLLOW-ON WORK ORDER FOR "WO... | MEDIUM | WEST BATTERY ROOM... | FN760250 | ASSIGNED | CORRECTIVE | | |
| 129461 | BRUJAMS PM CHECK SHEET FOR SCHEDULE 3 | MEDIUM | BRAUM STORE#101 (A545) | FN760057 | OPEN | PREVENTIVE | FN760057 | 3.00 |
| 129462 | PM CHECKLIST-INTEGRA C, INTEGRA L, INTEGRA 4 | MEDIUM | BRAUM STORE#101, INTEGRA 1, INTEGRA 4 | FN760060 | OPEN | PREVENTIVE | | 0.00 |
| 129464 | ISSUE WITH FRYER | DEMAND | FRY FREEZERS (A553) | FN760250 | OPEN | DAMAGE | | |

INITIALIZE, A PUBLIC API ON COMPUTERIZED MAINTENANCE MANAGEMENT SYSTEM (CMMS) AND ASSET ANOMALY PREDICTOR OPERATIONS FOR TENANT

544

IDENTIFY AND REGISTER, NEW TENANTS BASED ON TIME INTERVAL INDICATION

546

UPDATE SUBSCRIPTION TABLE IN DATA WAREHOUSE TO INCLUDE IDENTIFIED NEW TENANTS

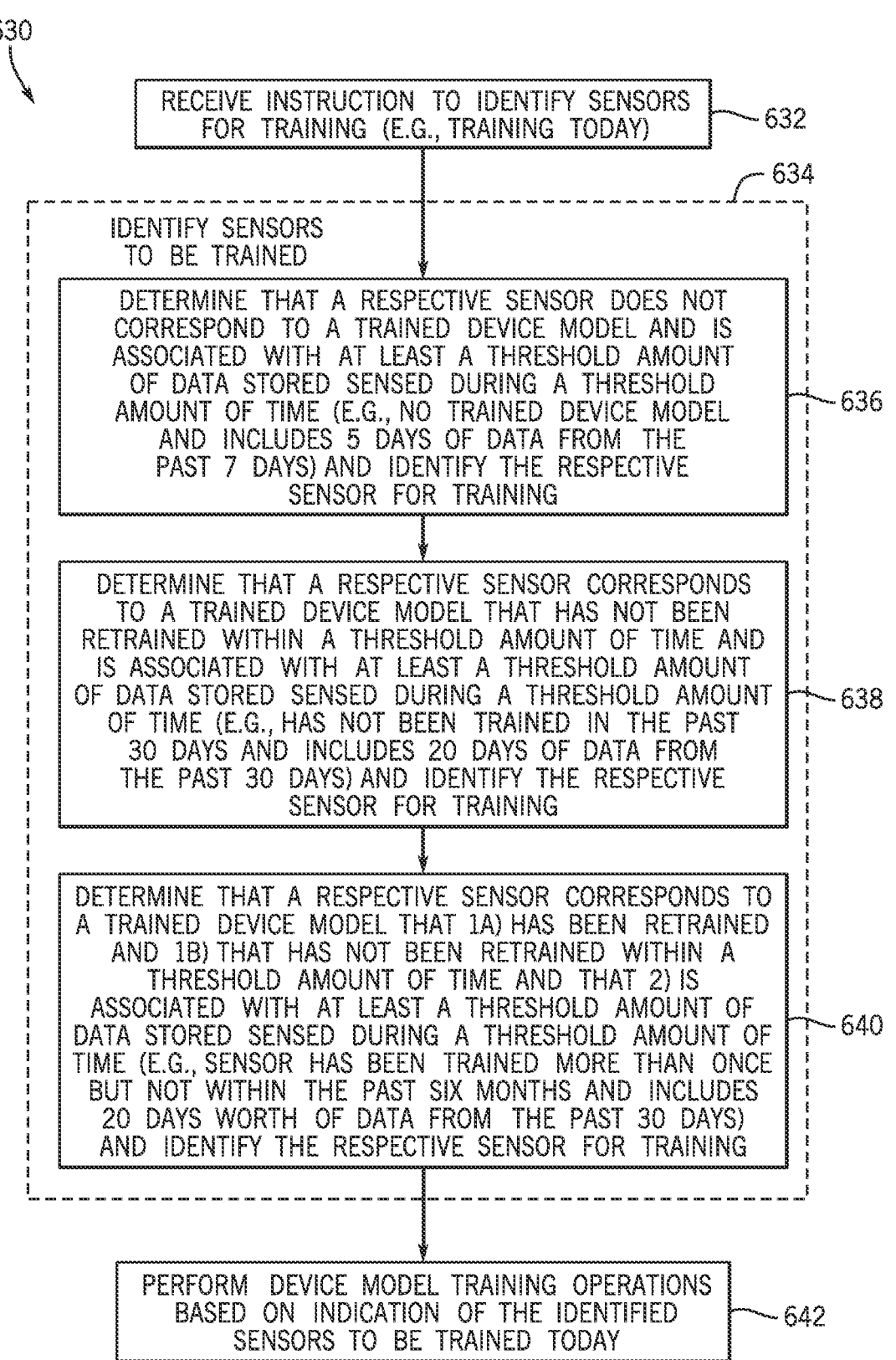

630

RECEIVE INSTRUCTION TO IDENTIFY SENSORS
FOR TRAINING (E.G., TRAINING TODAY) ~632

634

IDENTIFY SENSORS
TO BE TRAINED

DETERMINE THAT A RESPECTIVE SENSOR DOES NOT
CORRESPOND TO A TRAINED DEVICE MODEL AND IS
ASSOCIATED WITH AT LEAST A THRESHOLD AMOUNT
OF DATA STORED SENSED DURING A THRESHOLD
AMOUNT OF TIME (E.G., NO TRAINED DEVICE MODEL
AND INCLUDES 5 DAYS OF DATA FROM THE
PAST 7 DAYS) AND IDENTIFY THE RESPECTIVE
SENSOR FOR TRAINING ~636

DETERMINE THAT A RESPECTIVE SENSOR CORRESPONDS
TO A TRAINED DEVICE MODEL THAT HAS NOT BEEN
RETRAINED WITHIN A THRESHOLD AMOUNT OF TIME AND
IS ASSOCIATED WITH AT LEAST A THRESHOLD AMOUNT
OF DATA STORED SENSED DURING A THRESHOLD AMOUNT
OF TIME (E.G., HAS NOT BEEN TRAINED IN THE PAST
30 DAYS AND INCLUDES 20 DAYS OF DATA FROM
THE PAST 30 DAYS) AND IDENTIFY THE RESPECTIVE
SENSOR FOR TRAINING ~638

DETERMINE THAT A RESPECTIVE SENSOR CORRESPONDS TO
A TRAINED DEVICE MODEL THAT 1A) HAS BEEN RETRAINED
AND 1B) THAT HAS NOT BEEN RETRAINED WITHIN A
THRESHOLD AMOUNT OF TIME AND THAT 2) IS
ASSOCIATED WITH AT LEAST A THRESHOLD AMOUNT OF
DATA STORED SENSED DURING A THRESHOLD AMOUNT OF
TIME (E.G., SENSOR HAS BEEN TRAINED MORE THAN ONCE
BUT NOT WITHIN THE PAST SIX MONTHS AND INCLUDES
20 DAYS WORTH OF DATA FROM THE PAST 30 DAYS)
AND IDENTIFY THE RESPECTIVE SENSOR FOR TRAINING ~640

PERFORM DEVICE MODEL TRAINING OPERATIONS
BASED ON INDICATION OF THE IDENTIFIED
SENSORS TO BE TRAINED TODAY ~642

FIG. 20

ASSET RISK PREDICTOR OF OPERATION OF AN INDUSTRIAL ASSET

CROSS-REFERENCE TO RELATED APPLICATION

This application claims priority to and the benefit of U.S. Patent Application No. 63/523,544, entitled "ASSET ANOMALY PREDICTOR OF OPERATION OF AN INDUSTRIAL ASSET", filed Jun. 27, 2023, which is herein incorporated by reference in its entirety for all purposes.

BACKGROUND

This disclosure generally relates to industrial automation systems and, more particularly, to systems and methods that enable off-premise reporting and analysis of an industrial automation system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Industrial automation systems may include automation control and monitoring systems. The automation control and monitoring systems may monitor and/or receive status information and/or sensing data from a wide range of devices, such as valves, electric motors, various types of sensors, other suitable monitoring devices, or the like. In addition, one or more components of the automation control and monitoring systems, such as programming terminals, automation controllers, input/output (IO) modules, communication networks, human-machine interface (HMI) terminals, and the like, may use the statuses and/or collected information to provide alerts to operators to change or adjust an operation of one or more components of the industrial automation system (e.g., such as adjusting operation of one or more actuators), to manage the industrial automation system, or the like.

Recent developments in industrial automation systems have increased complexity of industrial automation devices and interactions between the devices. New generations of industrial automation devices are expected to interface with, or control, legacy devices. Different brands, types, and generations of industrial automation devices may each generate different types of data for different purposes and with different measurement units. For example, voltages sensed for one motor drive might be in volts (V) but be sensed in kilovolts (kV) from another motor drive. Thus, industrial automation systems and methods that promote predictive maintenance and reduce complexity of monitoring operations of these various legacy and more contemporary industrial automation devices may be desired.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a non-transitory, computer-readable medium may store instructions that, when executed by processing circuitry of a computing device, cause the computing device to perform operations. The operations may include receiving an indication of an industrial device and a sensor, where the sensor may be associated with the industrial device. The operations may include receiving data from the sensor, where the sensor may acquire the data during a normal operation of the industrial device. The operations may include adjusting an indication of a baseline operation based on the data, where the data indicates the normal operation of the industrial device. The operations may include determining that the indication of the baseline operation has been adjusted based on a threshold amount of data acquired by the sensor. The operations may include storing the indication of the baseline operation, as a trained device model, in association with the sensor and the industrial device in memory based on determining that the indication of the baseline operation has been adjusted based on the threshold amount of sensor data.

In another embodiment, a tangible, non-transitory, computer-readable medium may include instructions that, when executed by a processor, causes a control system to perform operations. The operations may include receiving an indication of an industrial device and a data source, where the data source is associated with the industrial device. The operations may include generating a device model based on the indication of the industrial device and the data source, where the device model may indicate a relationship between a normal operation of the industrial device and data acquired by one or more data sources including the data source during the normal operation. The operations may include receiving first data from the data source, where the data source may acquire the first data during an operation of the industrial device. The operations may include determining a first alert score based on comparing the first data to the device model and storing, in memory, an indication of a current state of the industrial device based on the first alert score.

In yet another embodiment, a method may include receiving an indication of an industrial device and a sensor associated with the industrial device. The method may include generating a device model based on the indication of the industrial device and the sensor, where the device model may indicate a relationship between a normal operation of the industrial device and data acquired by a plurality of sensors including the sensor during the normal operation. The method may include receiving first data from the sensor, where the sensor may acquire the first data during an operation of the industrial device. The method may include determining a first alert score based on comparing the first data to the device model and determining an indication of a current state of the industrial device based on the first alert score. The method may include generating an indication of a graphical user interface based on the indication of the current state.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein:

FIG. 4 is a flow diagram of a method for operating the second computing device of FIG. 2 to train a data model based on an operational baseline of an industrial automation device of FIG. 2, in accordance with an embodiment;

FIG. 6 is a flow diagram of a method for operating an edge gateway device of FIG. 2 to handle and convert a request from the first computing device of FIG. 2 from a first format used by a first communication network of FIG. 2 to a second format used by a second communication network of FIG. 2, in accordance with an embodiment;

FIG. 7 is a flow diagram of a method for operating the second computing device of FIG. 2 to handle and convert a request from the first computing device of FIG. 2 from the first format used by the first communication network of FIG. 2 to the second format used by the second communication network of FIG. 2, in accordance with an embodiment;

FIG. 8 is a diagrammatic representation of a first graphical user interface (GUI) presented via the first computing device of FIG. 2, where the GUI may be generated based on one or more operations of FIGS. 5-7, in accordance with an embodiment;

FIG. 9 is a diagrammatic representation of a GUI presented via the first computing device of FIG. 2, where the GUI may be generated based on one or more operations of FIGS. 5-7, in accordance with an embodiment;

FIG. 20 is a flow diagram of a second method for operating the second computing device of FIG. 2 to generate a trained device model via the asset risk predictor of FIG. 2, in accordance with an embodiment;

DETAILED DESCRIPTION

Figure 1:
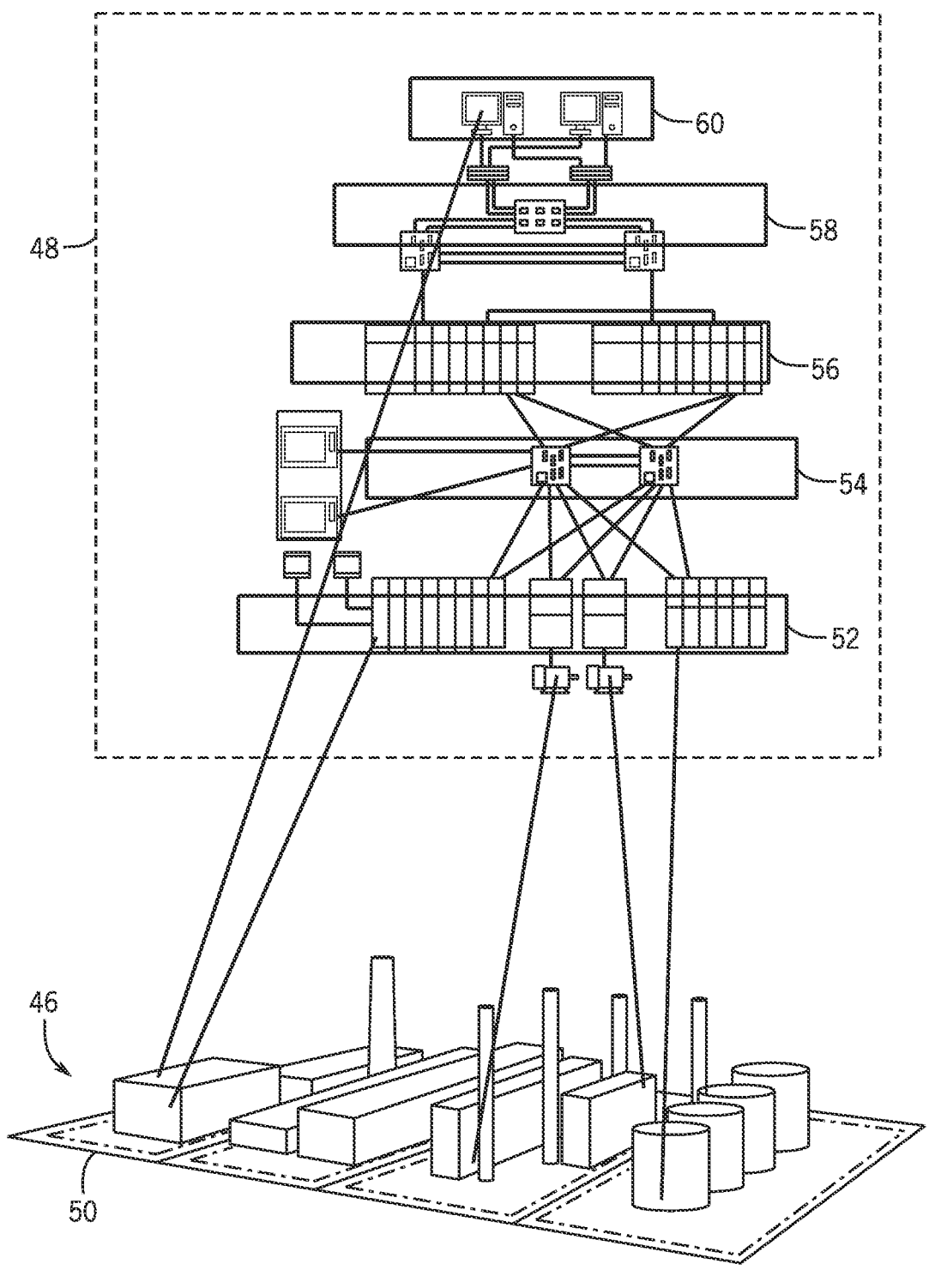
FIG. 1 is a diagrammatic representation of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Connecting intelligent devices and off-premise systems and services to an industrial automation system has been a time consuming and complex process for customers integrating new devices and monitoring operations into existing systems. Moreover, integrating legacy devices and these new intelligent devices in the industrial automation system into predictive maintenance operations continues to be a challenge. This challenge is worsened when considering the difficulty of obtaining and modelling data from various types of devices that respectively operate using different communication protocols, different information model formats, manufactured by different entities, different operational set points and operational characteristics that react differently to different in situ environments and processes, and the like. Instead, predictive models may be shipped with system-generic device-based models that may overlook specific use-case nuances characterizing a specific device use. Furthermore, developments in industrial systems have resulted in increased complexity of interactions between the currently installed devices and newer generations of industrial automation devices. These complex interactions and other monitoring techniques may shroud otherwise discoverable device operational anomalies. The shrouding may be further worsened due to a lack of integration between acquired sensor data and asset management operations. For example, current solutions may not integrate alarm data, work order data, and/or historic trending information for a device, which may obscure a relationship between work orders issued and an overall device health indication or other alarm information.

With this in mind, the present disclosure is generally directed toward an asset risk predictor that may improve monitoring and data processing operations of an industrial automation system. The asset risk predictor may be implemented as a software-as-a-service/function-as-a-service (SaaS/FaaS) platform. However, other suitable technological implementations of the asset risk predictor may be used. The asset risk predictor may receive data from various sources and train device models to indicate an operational baseline for a specific industrial asset based on the data. Based on the trained device models, the asset risk predictor may identify current and future operational statuses of the specific industrial asset and/or generate alerts indicative of the current and expected future operational statuses. Alerts may include reactive, proactive, and/or predictive notifications or determinations. Alert levels and alert scores may be triggered by or representative of forecasted probability of a component facing a problem or an event occurring. Indeed, the asset risk predictor may determine and report an alert score. The alert score may indicate a relative priority or urgency of the alert (e.g., whether the alert is of relative low priority or high priority) and/or a relative value of the alert (e.g., whether the alert corresponds to a relatively low calculated alert score or high score). The asset risk predictor may determine an alert level based on one or more alert scores, where the alert level corresponds to likelihood of one or more operations occurring for the specific industrial asset. The likelihood of the one or more operations occurring may correspond to a likelihood of an end-of-life event, a maintenance-triggering event, an unexpected operation, a fault, or the like occurring.

In some cases, the asset risk predictor may generate or provide information to dashboards to be presented via a graphical user interface. The dashboards and indications that identify one or more alert scores, one or more alert levels, and other device identifying information associated with an industrial asset. The graphical user interface may be presented by one or more computing devices associated with an industrial automation system that includes the industrial asset. Moreover, work order or health information may be presented in association with the one or more alert scores, one or more alert levels, and other device identifying information associated with an industrial asset to provide a comprehensive device monitoring and reporting solution.

By using systems and methods corresponding to the asset risk predictor, operations of the industrial automation system may improve due to fewer computing operations and queries being requested from a computing device to obtain results that include work orders, health information, status of operation, or the like for the specific industrial asset. Asset risk predictor systems and methods may use unsupervised anomaly detection methods to calculate alert scores and alert levels for sensor readings related to various assets within an industrial automation system. This approach may streamline operations as it may eliminate or reduce use of static thresholds for the various sensors, where manual thresholds often do not accurately reflect the dynamics of normal operations. Indeed, the device model may be trained using operational data of the industrial asset while situated and operating at a normal operation. Once the model is trained to indicate a baseline operation as the normal operation, the in situ training data may not be retained in memory, freeing up computing and memory resources. The overall training and monitoring process may lead to streamlined performance modelling due to maintenance logs or fault history not having to be stored or maintained to evaluate whether an operation is normal and/or to establish the baseline operation. Furthermore, extraction of a baseline operation from streamed data may be accomplished even when the streamed data is polluted with anomalies. The systems and methods may help mitigate additional error arising from misclassifying operations by improving accuracy of the classifying of operations.

Furthermore, additional benefits may be realized by training a device model on operations of a device while that device is in situ and operating at a normal baseline within the industrial automation system. Indeed, when training the device models based on the normal baseline, training operations are improved by reducing complexity and a total time used to train a device model, since the data received can be processed as indicative of the baseline, normal operation itself as opposed to being further evaluated to determine whether such data is indicative of a normal or anomalous operation (which traditionally increases total training time and has the potential to introduce more error in the event that the normal or anomalous classification is incorrect). This approach using a modeled normal operation and current operational statuses associated with the industrial asset may also cause a reduced number of false positive alerts being generated. For example, if an industrial asset is hit with a hammer, although a vibration sensor may detect that as an anomalous vibration, other sensors associated with the industrial asset would indicate normal operation and thus the anomalous vibration may not increase an alert level of that industrial asset. These systems and methods corresponding to the asset risk predictor may provide improved efficiency by reducing the number of computing operations and queries, leading to faster results and healthier operational statuses. Further details on these examples and other descriptions are provided below.

By way of introduction, FIG. 1 is a diagrammatic representation of an example industrial automation system 46 that includes a distributed control system (DCS) 48. The industrial automation system 46 may include any number of industrial components (e.g., industrial assets).

Industrial components may include a user interface, the distributed control system 48, a motor drive, a motor, a conveyor, specialized original equipment manufacturer machines, fire suppressant system, and any other device that may enable production or manufacture products or process certain materials. In addition to the aforementioned types of industrial components, the industrial components may also include controllers, input/output (IO) modules, motor control centers, motors, human-machine interfaces (HMIs), user interfaces, contactors, starters, sensors, drives, relays, protection devices, switchgear, compressors, network switches (e.g., Ethernet switches, modular-managed, fixed-managed, service-router, industrial, unmanaged), and the like. The industrial components may also be related to various industrial equipment such as mixers, machine conveyors, tanks, skids, specialized original equipment manufacturer machines, and the like. The industrial components may also be associated with devices used in conjunction with the equipment such as scanners, flow meters, relays, gauges, valves, and the like. In one embodiment, every aspect of the industrial component may be controlled or operated by a single controller (e.g., control system), which may itself be considered an industrial component. In another embodiment, the control and operation of each aspect of the industrial components may be distributed via multiple controllers (e.g., control system).

The industrial automation system 46 may divide logically and physically into different units 50 corresponding to cells, areas, factories, subsystems, or the like of the industrial automation system 46. The industrial components (e.g., load components, processing components) may be used within a unit 50 to perform various operations for the unit 50. The industrial components may be logically and/or physically divided into the units 50 as well to control performance of the various operations for the unit 50.

The distributed control system 48 may include computing devices with communication abilities, processing abilities, controlling abilities, and the like. For example, the distributed control system 48 may include IO modules, relays, sensors, protection devices, switchgear, network switches, processing modules, a control system, a programmable logic controller (PLC), a programmable automation controller (PAC), or any other controller that may monitor, control, and operate an industrial automation device or component. In this way, a motor drive may be considered a device associated with the distributed control system 48 and an industrial component and a motor controlled by the drive may be considered an industrial component.

The distributed control system 48 may be wholly or partially incorporated into one or more physical devices (e.g., the industrial components), wholly or partially implemented as a stand-alone computing device (e.g., general purpose computer), such as a desktop computer, a laptop computer, a tablet computer, a mobile device computing device, or the like. For example, the distributed control system 48 may include many processing devices logically arranged in a hierarchy to implement control operations by disseminating control signals, monitoring operations of the industrial automation system 46, logging data as part of historical tracking operations, and so on. Devices of the distributed control system 48 may convert logical operations or computer commands into mechanical changes implemented via one or more industrial components.

In an example distributed control system 48, different hierarchical levels of devices may correspond to different operations. A first level 52 may include input/output communication modules (IO modules) to interface with industrial components in the unit 50. A second level 54 may include control systems that control components of the first level 52 and/or enable intercommunication between components of the first level 52, even if not communicatively coupled in the first level 52. A third level 56 may include network components, such as network switches, that support availability of a mode of electronic communication between industrial components. A fourth level 58 may include server components, such as application servers, data servers, human-machine interface servers, or the like. The server components may store data as part of these servers that enable industrial automation operations to be monitored and adjusted over time. A fifth level 60 may include computing devices, such as virtual computing devices operated from a server to enable human-machine interaction via an HMI presented via a computing device. It should be understood that levels of the hierarchy are not exhaustive and nonexclusive, and thus devices described in any of the levels may be included in any of the other levels. For example, any of the levels may include some variation of an HMI.

One or more of the levels or components of the distributed control system 48 may use and/or include one or more processing components, including microprocessors (e.g., field programmable gate arrays (FPGAs), digital signal processors, application specific instruction set processors, programmable logic devices (PLDs), programmable logic controllers), tangible, non-transitory, machine-readable media (e.g., memory such as non-volatile memory, random access memory (RAM), read-only memory (ROM), and so forth. The machine-readable media may collectively store one or more sets of instructions (e.g., algorithms) in computer-readable code form, and may be grouped into applications depending on the type of control performed by the distributed control system 48. In this way, the distributed control system 48 may be application-specific, or general purpose.

Furthermore, portions of the distributed control system 48 may correspond to one or more closed loop control systems (e.g., uses feedback for control), one or more open loop control systems (e.g., does not use feedback for control), or may include a combination of both open and closed loop control system components and/or algorithms. Further, in some embodiments, the distributed control system 48 may utilize feed forward inputs. For example, the distributed control system 48 may control flow of a feedstock into a reactor depending on information relating to the feedstock.

As noted above, industrial components may include an HMI. Indeed, the distributed control system 48 may include or couple to one or more HMIs. The distributed control system 48 may represent components of the industrial automation system 46 through visualizations of the components on the display/operator interface. The distributed control system 48 may use data generated by sensors to update visualizations of the components via changing one or more indications of current operations of the components. These sensors may be any device adapted to provide information regarding process conditions. An operator monitoring the industrial automation system 46 may reference the display/operator interface to determine various statuses, states, and/ or current operations, such as when adjusting operations of the industrial automation system 46 and/or for a particular component.

The distributed control system 48 may correspond to on-premise computing and control operations. However, recent expansion of software-as-a-service/function-as-a-service (SaaS/FaaS) offerings has increased a desire to interconnect data of the industrial automation system 46 and/or the distributed control system 48 with computing devices, such as to enable enhanced monitoring operations. For example, some computing devices may be enabled with relatively larger amounts of computing power and increased capability for backup and storage relative to a single on-premise computing system. For at least these reasons, hybrid monitoring and storage systems (e.g., that use on-premise computing and off-premise computing) may realize computational advantages relative to a system that just uses on-premise monitoring and storage systems. Although one or more computing devices are described herein as deploying the asset risk predictor systems and methods, it should be understood that in some cases the asset risk predictor systems and methods may be deployed via one or more computing devices.

Figure 2:
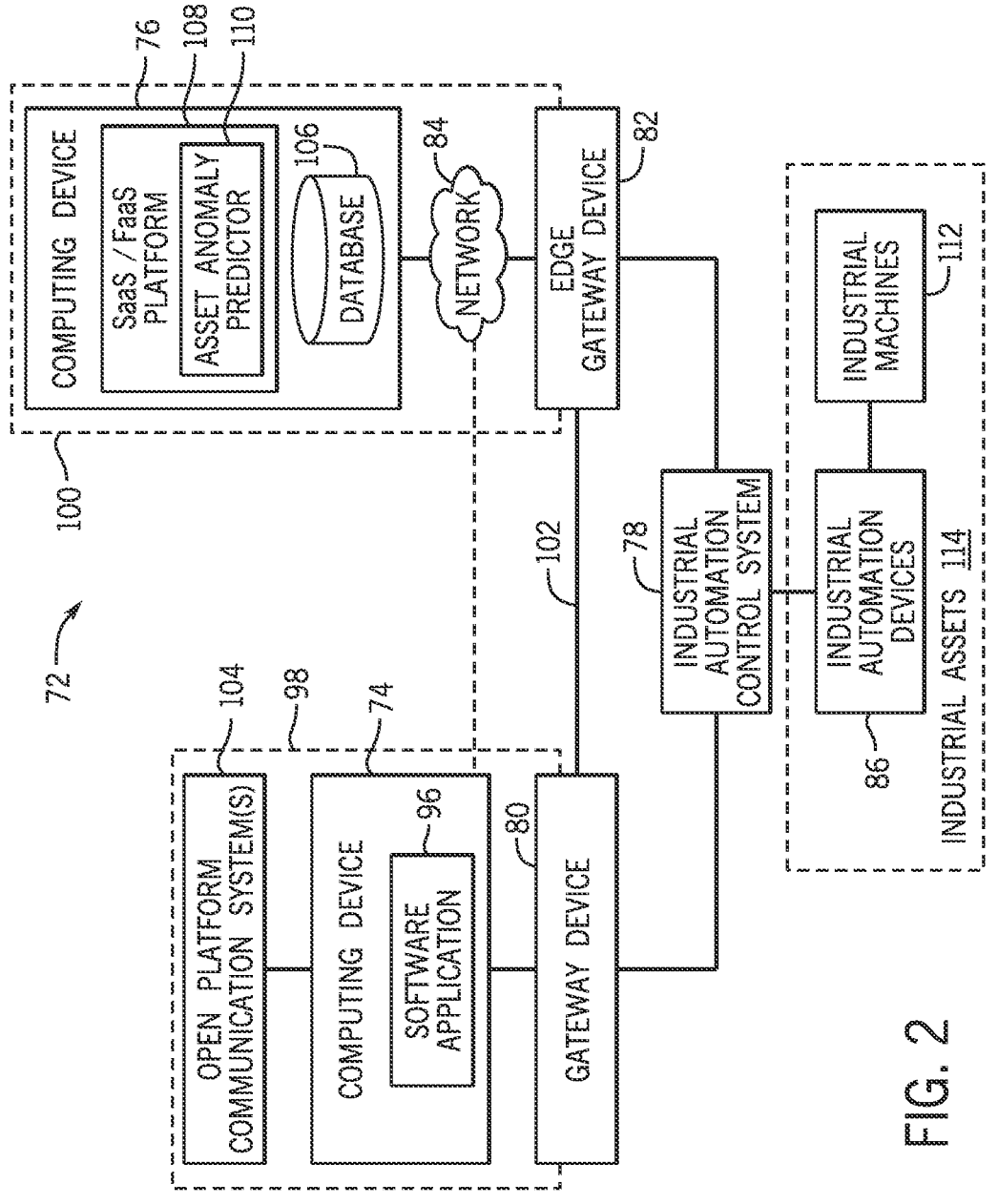
FIG. 2 is a system that includes the industrial automation system of FIG. 1 and first and second computing devices, in accordance with an embodiment.

To elaborate, FIG. 2 illustrates an example system 72 that includes computing devices 74 (e.g., associated with an on-premise computing system), computing devices 76 (e.g., associated with an off-premise computing device), and an industrial automation control system 78. Computing devices 74 may include a variety of electronic devices associated with the industrial automation system 46, for example one or more user equipment (e.g., cellular devices) disposed off-premise but communicatively coupled to one or more computing devices disposed on-premise, such as when the user equipment is located at a home of an operator and is accessing data associated with the industrial automation system 46. The distributed control system 48 described above may include the computing devices 74, a gateway device 80, the industrial automation control system 78, and the edge gateway device 82, where the edge gateway device 82 may communicate with computing devices 76 via a network 84. When accessing web-based applications and/or graphical user interfaces, as described above, the computing device 74 may do so via the network 84 and/or via another network configurable to communicatively couple to the network 84 (illustrated via dashed line). The gateway device 80 and the edge gateway device 82 may be communicatively coupled to each other and to the industrial automation control system 78.

The distributed control system 48 may include industrial automation devices 86 that couple to and/or control connected industrial components associated with industrial machines 112, to perform operations, such as making products, moving products, turning on, turning off, rotating, or the like. For example, the industrial automation devices 86 may include motor control drives within a motor control center that are coupled to and control operations of various industrial machines 112, like one or more motors, one or more fans, or the like. Industrial assets 114 may include industrial automation devices 86, industrial machines 112, industrial components described in FIG. 1, or the like. Industrial assets 114 may be a component of an industrial automation system 46, distributed control system 48, and/or related enterprise that is a physical or digital asset which degrades over time due to exposure to environmental conditions, due to normal use or "wear-and-tear," due to exposure to electrical signals, or the like, that, due to the possibility of degradation, are monitored overtime to predict the degradation or to analyze performance changes in the component as part of predictive maintenance system and methods. Some examples of industrial assets 114 may include physical structures (e.g., bathrooms having plumbing components and electrical components that might be associated as an industrial asset), vehicles (e.g., automotive, bicycles, scooters, autonomous aerial monitoring devices, drones), boilers, staircases, conveyors, elevators, fire extinguishers, fire pumps, fill systems, grease traps, heating and ventilation systems, air handlers, coils, dampers, fans, heat exchangers, pumps, split systems, unit heaters, IT equipment associated with the domain 98, irrigation components, line equipment, machines, pumps, roofs, spares components, or the like. An industrial asset may refer to a component (e.g., motor) or a collection of components (e.g., a motor control center) that may be more efficient to refer to as one associated component. For example, a work order may consume fewer memory resources when including an indication of a motor as opposed to including separate indications of each individual component of that motor (e.g., axis, windings, insulation, power supply or power input).

By way of example, the industrial automation control system 78 may access data from one or more of the industrial automation devices 86 using distributed IO products and other connected industrial automation devices, which may be associated with the distributed control system 48. The distributed IO products may include some of the circuitry described with reference to the industrial automation control system 78. Firmware of the industrial automation control system 78 may query a data source, or receive data from a data source based on a programmable logic controller address and store the retrieved datasets. The industrial automation control system 78 may directly receive sensed data from one or more sensors. The sensed data may identify a current operation of the industrial automation device 86, the industrial machines 112, or any suitable industrial asset 114 based on which the one or more sensors monitor.

Data associated with the various device-level systems may be accessed by other components of the industrial automation system 46 via the gateway device 80. The gateway device 80 may communicate on networks internal to the industrial automation system 46 with devices within the industrial automation system 46. The gateway device 80 may be locally connected to one or more industrial automation devices 86, the industrial automation control system 78, or both, and may communicate with the various devices using messages and/or control signals that employ some operational technology (OT) communication schemes, such as the common industrial protocol (CIP). The gateway device 80 may access data stored by the industrial automation control system 78 to process read requests from the computing device 74. The software application 96 may receive and process sensed data from the gateway device 80 to perform analysis, reporting, historical trending, or the like. The gateway device 80 and/or the industrial automation control system 78 may implement control loops based on the data and/or may analyze data received in real time.

The gateway device 80 may operate on a logical boundary between the industrial automation control system 78 and a domain 98 which refers to a computing domain in which associated devices within the domain 98 communicate via a first communication network and/or using communication methods corresponding to a first communication method or protocol. The edge gateway device 82 may operate on a logical boundary between the industrial automation system 46 and a different domain, domain 100. The domain 100 may correspond to an off-premise computing domain in which associated devices within the domain 100 communicate via a second communication network and/or using communication methods corresponding to a second communication method or protocol. In both cases, the industrial automation control system 78 may use a third communication network to communicate with the gateway device 80, the edge gateway device 82, and the industrial automation devices 86. When the domain 100 and the domain 98 use different protocols, formats, or networks, communications between the domains may be converted between the various protocols, formats, or networks.

A communicative coupling 102 between the gateway device 80 and the edge gateway device 82 may be used to transmit data between the gateway device 80 and the edge gateway device 82. The communicative coupling 102 may be disposed within or outside the distributed control system 48. The gateway device 80 may communicate with one or more computing devices 74 to receive data from or transmit data to the software applications 96 executed by the computing device 74 and/or open platform communication systems 104 provided via the computing device 74. Communications routed via the communicative coupling 102 may be afforded relatively lower transmission delays, different authentication operations, quicker processing, and thus lower consumption of computing resources, than communications between the gateway device 80 and the edge gateway device 82 routed through the industrial automation control system 78. Similarly, communications routed from the edge gateway device 82 to the industrial automation control system 78 may have different authentication operations than authentication operations used for communications routed from the gateway device 80 to the industrial automation control system 78. Furthermore, separating devices into different levels, as visualized in FIG. 1 but also as suggested in FIG. 2 with the differences between a domain including the industrial automation control system 78 and the domain 98, may have the additional improvement of selective deployment of authentication operations and security provisions.

The edge gateway device 82 may access data of the industrial automation devices 86 via communication with the industrial automation control system 78 and/or via communication with the gateway device 80. For example, the edge gateway device 82 may send or receive alarm notifications and/or acquired sensor data via the gateway device 80. As such, the edge gateway device 82 may acquire data from the industrial automation devices 86. The edge gateway device 82 may connect to the gateway device 80 via the communicative coupling 102. The edge gateway device 82 may provide the acquired sensor data to software applications executed outside the industrial automation system 46 on the computing device 76 (e.g., SaaS/FaaS Platform 108, asset risk predictor 110). The software applications outside of the industrial automation system 46 may then perform real time analysis of the sensor data within the industrial automation device 86 that has been acquired through the edge gateway device 82.

Data generated by the gateway device 80, the computing device 74, the edge gateway device 82, and/or the computing device 76 may be exchanged among the system 72 to perform additional historical data logging, additional analysis, perform security operations (e.g., authenticating a user), or the like. In some cases, the edge gateway device 82 may use an application programming interface (API) and/or an instantiated client on the gateway device 80 to access sensor data and/or alarms via the gateway device 80 by way of automated reporting according to a schedule. For example, the client may enable the edge gateway device 82 to directly subscribe to information provided by or stored within the industrial automation device 86 and/or the industrial automation control system 78, which may reduce an amount of time to communicate data between the gateway devices 80, 82 and/or reduce a number of computing resources used to map generated data to the edge gateway device 82. An API may formalize the data exchange between servers associated with the computing devices 76 and clients associated with the industrial automation control system 78, the industrial automation devices 86, the computing device 74, or the like. Indeed, exchange of data via an API may be continuous, subscription-based, or query-based, or the like and enable reformatting at various stages of transmission to comply with various communication network protocols used by domain 98, domain 100, the distributed control system 48, and/or the industrial automation system 46.

After obtaining the data from the industrial automation device 86, the computing device 76 and/or the computing device 74 may log the data in real time to perform historical trending and analysis of the data over time. The computing device 76 and/or the computing device 74 may analyze the stored data over time. This process may involve historical trending of the data logged over time. The edge gateway device 82 may communicate via the network 84 to access a software application and/or to log the data in a database 106.

As one example, the computing device 76 may provide a software-as-a-service and/or a Function-as-a-Service (SaaS/FaaS) platform 108 via the network 84. In this way, a processor of the computing device 76 may execute instructions stored in memory and/or storage to perform the asset risk predictor 110 systems and methods. In this way, the asset risk predictor 110 may correspond to instructions stored in non-transitory, computer readable medium of the computing device 76 that, when executed by processing circuitry, cause the computing device 76 to perform operations discussed herein as being performed by the asset risk predictor 110. The database 106 may include any suitable storage device, server, or the like, such as a web server (e.g., a unitary Apache installation), an application server (e.g., unitary JAVA Virtual Machine), and/or a database server (e.g., a unitary relational database management system (RDBMS) catalog). The SaaS/FaaS platform 108 provided by the edge gateway device 82 may include platforms such as THINGWORX® registered trademark of PTC, Inc., AZURE@ registered trademark of Microsoft Corporation, FIIX® registered trademark of Fiix, Inc., INFLUXDB® registered trademark of InfluxData, Inc. or the like. The SaaS/FaaS platform 108 may manage data stored in the database 106 based on data received from the edge gateway device 82. In some cases, the computing device 76 may correspond to one or more data centers that may include one or more servers, one or more virtual servers, or the like, that each may be operated on one or more physical computing devices. The computing device 76 may provide one or more dashboards via a web-enabled communicative coupling to one or more other computing devices (e.g., computing device 74) to enable presentation of information generated via the SaaS/FaaS platform 108 through outputs of the one or more other computing devices. The network 84 may be any suitable wired or wireless network, such as a network enabled by the Internet or a cloud-based network. The network 84 may be an off-premise network used by the computing device 76 to transmit data to the edge gateway device 82. Using this information, the network 84 may route data and instructions between the computing device 76, database 106, and the edge gateway device 82. The edge gateway device 82 may have access to network information used to communicate with the industrial automation control system 78 and/or the gateway device 80, such as corresponding internet protocol (IP) address, uniform resource locators (URLs), or the like. In some cases, the edge gateway device 82 may be disposed on-premise of the industrial automation system 46 and be owned by a same entity who owns the gateway device 80 and have connectivity to the network 84.

Figure 3:
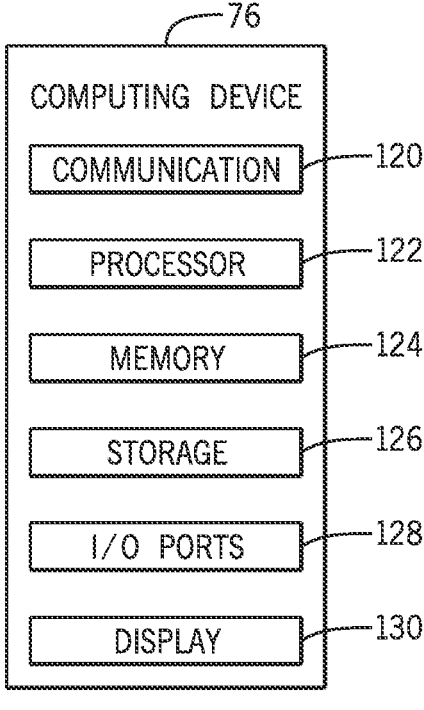
FIG. 3 is a block diagram of an example computing device like those in FIG. 2, in accordance with an embodiment.

To elaborate further on these various computing systems and methods, FIG. 3 is a block diagram of an example industrial automation control system 78 that may be used with the embodiments described herein. However, it should be understood that although described in reference to the industrial automation control system 78, similar components and operations may be used and implemented via other computing devices, like computing devices 74, gateway devices 80, open platform communication systems 104, computing devices 76, databases 106, systems implementing networks 84, the edge gateway device 82, and in some cases, one or more of the industrial automation devices 86.

With this in mind, the industrial automation control system 78 may include a communication component 120, a processor 122, a memory 124, a storage 126, input/output (I/O) ports 128, a display 130, and the like. The communication component 120 may be a wireless or wired communication component that facilitates communication between the computing device 76, the industrial automation control system 78, the edge gateway device 82, the computing device 74, the gateway device 80, or any other suitable electronic device. The processor 122 may be any type of computer processor or microprocessor capable of executing computer-executable code. The processor 122 may also include one or more processors may together or individually perform the operations described below.

The memory 124 and the storage 126 may be any suitable article of manufacture that may serve as media to store processor-executable code, data, or the like. These articles of manufacture may represent computer-readable media (e.g., any suitable form of memory or storage) that may store the processor-executable code used by the processor 122 to perform the presently disclosed systems and methods. The memory 124 and the storage 126 may represent non-transitory computer-readable media (e.g., any suitable form of memory or storage) that may store the processor-executable code used by the processor 122 to perform various systems and methods described herein. It should be noted that non-transitory merely indicates that the media is tangible and not a signal.

The I/O ports 128 may couple to one or more sensors, one or more input devices, one or more displays, or the like to facilitate human or machine interaction with the industrial automation control system 78. For example, when the components of FIG. 3 are used to provide the computing device 74, an input device may receive an input that instructs the adjustment of an industrial asset 114, such as in response to a notification generated and/or presented via the display 130.

The display 130, as discussed above, may operate to depict visualizations associated with software or executable code being processed by the processor 122. In one embodiment, the display 130 may be a touch display capable of receiving inputs from a user of the industrial automation control system 78. The display 130 may be any suitable type of display, such as a liquid crystal display (LCD), plasma display, or an organic light emitting diode (OLED) display, for example. Additionally, in one embodiment, the display

130 may be provided in conjunction with a touch-sensitive mechanism (e.g., a touch screen) that may function as part of a control interface for the industrial automation control system 78.

When considering the descriptions above, the circuitry of FIG. 3 may enable the SaaS/FaaS platform 108 to be executed via the computing device 76. Indeed, one or more servers associated with the computing device 76 may correspond to a managed network. The SaaS/FaaS platform 108 and/or the computing device 76 may implement or enable the asset risk predictor 110 systems and methods, previously described above.

To elaborate, the asset risk predictor 110 may generate a device model and used the received data to train the device model on operations of that specific industrial asset 114. In this way, the device model may be trained based on data received from one or more sensors, where data from the one or more sensors together may represent the baseline operation of the specific industrial asset. A device model may correspond to one or more additional device models. One trained device model may correspond to a baseline operation of an industrial asset and the baseline operation of the industrial asset may correspond to one or more sensor models that acquired data during the baseline operation of the industrial asset. Once a threshold amount of data is received from one or more data sources (e.g., sensors), the asset risk predictor 110 may train and store a device model, where the stored trained device model may be accessed as a baseline reference against which to compare future operations of the specific industrial asset to determine whether or not a future operation is similar to the normal operation of that specific industrial asset. These training operations are elaborated further in FIG. 4.

FIG. 4 is a flow diagram of a method 140 for operating the asset risk predictor 110, implemented via the computing device 76, to train a device model to indicate an operational baseline of an industrial asset 114. Although the following description of the method 140 is described as being performed by the asset risk predictor 110, it should be understood that any suitable computing device that may receive sensed data from the industrial automation control system 78 may perform the operations described herein. In addition, although the method 140 is described in particular order, it should be understood that the method 140 may be performed in any suitable order. For ease of description, the method 140 is described as performed relative to one industrial machine 112 and one sensor, however, it should be understood that any number of sensors, industrial automation devices 86, or other types of industrial assets 114 may be operationally represented via one or more device models.

At block 142, the asset risk predictor 110 may receive an indication of an industrial asset 114 and one or more associated industrial assets 114. For example, the asset risk predictor 110 may receive an indication of an industrial machine 112 that corresponds to one or more industrial automation devices 86. For purposes of discussion, a sensor is used as an example of the one or more industrial automation devices 86. The indication may include contextual (e.g., context) information about the sensor that associates the sensor with the industrial machine 112. The context information may include an indication of a type of programmable logic controller (PLC) that the sensor uses to communicate with the industrial automation control system 78 and/or an internet protocol or accessing address associated with that PLC. The context information may include a tag name for the PLC, which may be a variable name for where data is stored in the PLC (e.g., where the data is accessible).

The context information may include a description indicator. The description indicator may include a description of one or more tags associated with one or more data to be received from the PLC. The description indicator may enable the asset risk predictor 110 to differentiate between data, such as between first data that provides a sensor value and second data that indicates an operational status of the industrial machine 112 (e.g., "is running," "powered off," "idle," "error," "fault"). The context information may also sometimes include a pointType, which indicates a data type acquired by the sensor, such as a format, protocol, and/or a unit of measurement.

At block 144, the asset risk predictor 110 may associate the industrial machine 112 to an industrial asset name indicator (e.g., asset name indication 284 in FIG. 10) and associate the sensor to the industrial asset 114 in a data structure based on the context information. The context information may indicate the association between the industrial machine 112 and the sensor. Based on this indicated association, the asset risk predictor 110 may update a data structure to indicate the relationship the industrial machine 112 and the sensor. In some cases, the asset risk predictor 110 associates a sensor name indication (e.g., sensor name indication 364 of FIG. 12) with the asset name indication (e.g., asset name indication 284 in FIG. 10) in a data structure to indicate the relationship the industrial machine 112 and the sensor. The sensor may be referred to as a "child" device of the industrial machine 112. For example, the asset risk predictor 110 may associate any number of child devices with an industrial asset 114 (e.g., the industrial machine 112) for device modeling.

Indeed, at block 146, the asset risk predictor 110 may receive data from one or more data sources, for example the sensor. The data may correspond to a normal or baseline operation of the industrial machine 112. Data sources may include sources of process data from any variable supplied. For example, the variable supplied may include cycle time, units per hour, quality losses, sensor data, a value calculated or generated by a computing device as opposed to being directly received from an input or a sensor, or the like. The asset risk predictor 110 may receive data that is reported using an application programming interface (API) to enable consistent reporting, such as when the data is reported from different formats of different industrial automation devices. The asset risk predictor 110 may receive an indication that the industrial machine 112 is operating as expected or an indication that the industrial machine 112 is expected to remain in a normal (e.g., non-alarm) operational state for a period of time. The period of time may correspond to any number of days, hours, any suitable time period, or the like. A subset of this period of time may be used as a testing time period. Data may be received from the sensor that indicates the normal operation of the industrial machine 112 and/or the normal operation of the sensor while monitoring or acquiring data from the industrial machine 112. Additional data may be used to train the model. Additional sensors may be associated with the industrial machine 112 that provide sensed data to further train the device model. The industrial automation control system 78 may acquire or access information related to self-reported data from the industrial machine 112. The industrial machine 112 may maintain an indication of a status that is reported to the industrial automation control system 78, which reports to the asset risk predictor 110. Any suitable data indicative of the normal operational state of the industrial machine 112 may be used to train the device model.

At block 148, the asset risk predictor 110 may store the received data. At block 150, determine whether a threshold amount of sensed data has been stored and/or received to establish the operational baseline of the industrial machine 112. Any suitable threshold amount of data may be used to train the model. In some systems, one or more threshold amounts of data may be used for one or more industrial asset 114 types. For example, in some systems, seven days-worth of sensed data may be a suitable threshold amount. However, other quantifications of amount of sensed data may be used, such as Y entries of sensed data, Z minutes of observational sensed data, M amount of days of continually received sensed data, or the like, where Y, Z, M, are any suitable quantity. In response to determining that a threshold amount of sensed data has been not yet been stored, the asset risk predictor 110 may return to operations of block 146 and receive additional sensed data before commencing training. In response to determining that a threshold amount of sensed data has been stored and/or used to train the device model, at block 152, the asset risk predictor 110 may commence training the device model based on the stored data (e.g., threshold amount of stored data). By training the device model during periods of normal operations, training operations may be improved since data (e.g., data from the sensor) received during this time period is classified as the operational baseline, increasing training speeds and reducing complexity of modeling.

To elaborate, the asset risk predictor 110 may train a device model based on the threshold amount of sensed data. The trained device model may be stored in association with the industrial machine 112. The trained device model may indicate acquired sensor data that characterizes an in-situ operation of the industrial machine 112 while installed in the unit 50 and/or while being utilized for real-time processes and operations that the industrial machine 112 is intended to be used in (e.g., in situ). In this way, the trained device model may correspond to a baseline operation of the industrial machine 112. Trained device models (e.g., untrained sub-device models) may correspond to one or more child devices associated with the industrial machine 112. For example, for a motor that has three sensors, each sensor may correspond to its own device model. In some cases, the motor corresponds to another trained device model that nests or is associated with the device models of the three sensors, respectively. The respective sensor device models of the three sensors may be related as children of the motor device model. As operations of the one or more sensors are deemed normal and/or anomalous, the overall operation of the motor may be classified as normal and/or anomalous. The asset risk predictor 110 may identify a child-parent relationship between industrial assets 114 based on contextual information (e.g., context information), an indication of a device hierarchy, or the like. The respective device models may be used to identify when one or more operations of an industrial asset 114 indicate a likelihood of a future type of operation. After training the device model, the asset risk predictor 110 may store the model in memory as a trained device model corresponding to the industrial machine 112 for future use, such as in reference to operations corresponding to FIGS. 9-13.

Once the asset risk predictor 110 has trained the device model, the asset risk predictor 110 may use the trained device model to identify a current state of one or more industrial assets 114 since the trained device model indicates a baseline operation for the one or more industrial assets 114. For example, the asset risk predictor 110 may use the trained device model of the industrial machine 112 to identify whether a current state of the industrial machine 112 is anomalous or expected. For example, a current operation of a motor may help indicate that the motor is likely to experience an undesired overspeed condition within the next day when compared to the trained device model for that motor, and thus a work order or other notification may be generated corresponding to the determined likelihood. In some cases, the trained device model corresponds to indications of remedial action that may compensate the identified anomalous behavior when the current state is not expected. Indications of the remedial actions may be transmitted to the industrial automation control system 78 to implement the remedial actions and/or be included in generated work orders, as further elaborated on in FIG. 5.

Figure 5:
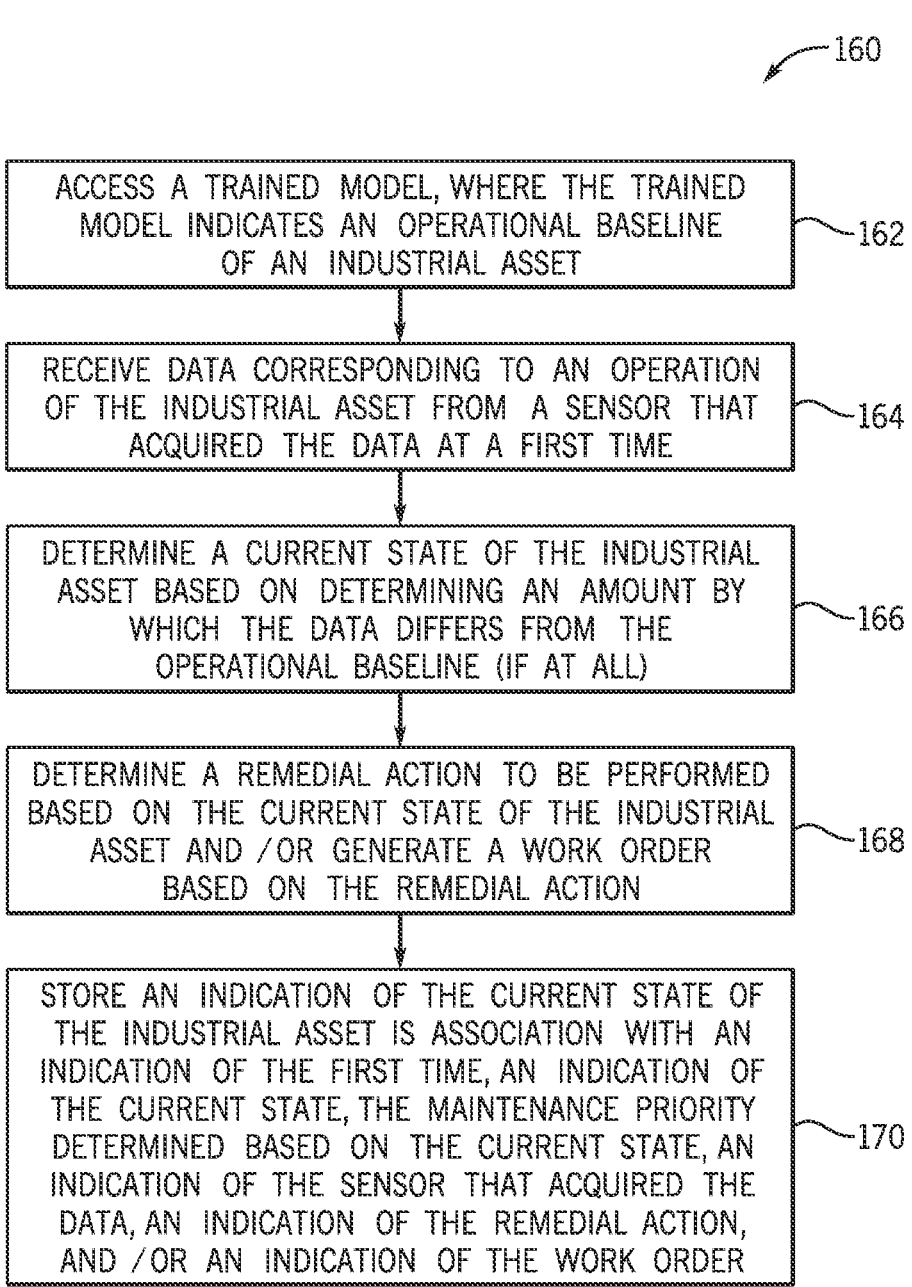
FIG. 5 is a flow diagram of a method for operating the second computing device of FIG. 2 to determine a current operational state of the industrial automation device based on the operational baseline represented in a trained data model of FIG. 4, in accordance with an embodiment.

FIG. 5 is a flow diagram of a method 160 for operating the asset risk predictor 110, via the computing device 76, to determine a current operational state of the industrial asset 114 based on the operational baseline represented in a trained data model. Although the following description of the method 160 is described as being performed by the asset risk predictor 110, it should be understood that any suitable computing device that may receive sensed data from the industrial automation control system 78 may perform the operations described herein. In addition, although the method 160 is described in particular order, it should be understood that the method 160 may be performed in any suitable order.

At block 162, the asset risk predictor 110 may access a trained device model, where the trained device model indicates an operational baseline of an industrial asset 114 from the perspective of one or more data sources (e.g., sensors). The model may be trained using operations described relative to FIG. 4. For example, a trained device model indicates an operational baseline of an industrial machine 112 based on sensor data received from three sensors. When an industrial asset 114 has a threshold number of sensors associated with it, the industrial asset 114 may correspond to sub-assets, and each sub-asset may correspond to respective trained device models. As an example, the industrial asset 114 may correspond to an extrusion line with 500 related data sources and, to aid monitoring, the extrusion line model is trained based on operations of sub-assets for a main extruder of the extrusion line. This may result in a trained device model for a feed hopper, a trained device model for a cooling system, a trained device model for one or more heating elements, a trained device model for a cutting mechanism, a trained device model for a control panel, and the like, each model being trained on the subset of the 500 related data sources that indicate the operation of the corresponding industrial asset 114 (e.g., feed hopper, cooling system, heating element, and so on).

At block 164, the asset risk predictor 110 may receive data corresponding to an operation of the industrial asset 114, The data may be acquired or generated by a data source, like a sensor. The data may correspond to an acquisition or generation time stamp and an indication of the time stamp may be transmitted with the data. The asset risk predictor 110 may receive the data from the domain 98 and/or the industrial automation system 46 from one or more of the edge gateway devices 82, the network 84, the computing device 74, the gateway device 80, the industrial automation control system 78, the computing device 76, or the like.

At block 166, the asset risk predictor 110 may determine a current state of the industrial asset 114 based on determining an alert score for one or more sensors and an alert level for the industrial asset 114 based on the alert scores of the one or more sensors. The alert score, and thus the current state, may indicate a likelihood of an operational anomaly or error occurring during operation of the industrial asset 114, where the likelihood is determined based on an expected baseline operation indicated by the trained device model and the sensed data indicating a recent operation of the industrial asset 114. When the sensed data equals (e.g., by a threshold amount) the operational baseline indicated by the trained device model, the asset risk predictor 110 indicates the detected operation is normal. When the detected operation is different from (e.g., by a threshold amount) the operational baseline of the trained device model, the asset risk predictor 110 indicates that the detected operation is anomalous. Alert scores may be determined based on an amount by which the data differs from the operational baseline (if at all) indicated via a device model, based on aggregated performance data for the industrial asset 114 and/or the one or more sensors, based on additional context information, or the like. Aggregated sensor data may be used to determine an alert score for the industrial asset 114. Sensors of the one or more sensors may correspond to separate device models, and thus be assigned respective alert scores as well, which may be used to determine the alert score of the industrial asset 114. The alert score may be generated by averaging results from two or more analysis methods, which may result in a more accurate alert score that is less susceptible to noise or false alarms. Other context information may be considered to generate the alert score, such as days of the week that the received data from block 164 corresponds. The asset risk predictor 110 may associate the time stamp from the received data to one or more corresponding alert scores. Associating the time stamps to the alert scores may enable the asset risk predictor 110 to generate indications historical trending, prioritize of alert scores or alert levels based on the time stamps (e.g., "highest levels today"), or the like.

The asset risk predictor 110 may process one or more alert scores for one or more days, one or more industrial assets 114, one or more sensors, or the like to determine an overall alert level. For example, each of the highest alert scores for an industrial asset 114 may be averaged, have the median taken, or otherwise processed based on thresholds. Thresholds may be used to identify one or more score values as "low" (e.g., alert score being less than a first threshold score value), "medium" (e.g., alert score being between the first threshold score value and a second threshold score value), or "high" (e.g., alert score being greater than the second threshold score value, where the second threshold has a higher score value than the first threshold score value). Multiple alert scores may be processed to identify a representative alert score on which to determine an alert level of an industrial asset 114. The representative alert score may be compared to thresholds similarly to the alert scores described above, where a respective representative alert score may indicate a low alert level, a medium alert level, or a high alert level for a corresponding industrial asset 114. Moreover, combinations of alert scores may be together compared to expected combinations of alert scores corresponding to the operational baseline of the trained device model to aid identifying when one or more higher-than-normal respective alert scores are instead normal or expected in overall collective operation of the industrial asset 114. Any suitable value may be used for the various thresholds and an indication of one or more of the thresholds may be stored in memory of the computing device 76, where the memory may be accessible by the asset risk predictor 110. At block 168, the asset risk predictor 110 may determine a remedial action to be performed based on the current state of the industrial asset 114 and/or generate a work order based on the remedial action. Thresholds may be used to determine whether an alert score is to be used to generate a work order and/or to identify a remedial action. When an operation or data deviates from the operational baseline indicated in the device model by a threshold amount, the asset risk predictor 110 may generate a work order. The work order may indicate the anomalous operation and assign a maintenance operation to attempt to remedy. In some cases, the work order includes an indication of the identified anomalous behavior and an indication of the severity parameter.

In some cases, indications of the thresholds are stored in memory with indications of desired remedial actions and relative to indications of the industrial asset 114 and/or indications of the device model. In some cases, the asset risk predictor 110 generates a work order to instruct, schedule, and/or provide context to the identified anomalous behavior. The asset risk predictor 110 may determine the remedial action based on validation feedback. When an anomalous operation is detected, the asset risk predictor 110 may generate a validation request to obtain information regarding a desired remedial action. Validation feedback received in response to the validation request may be stored and accessed at future times by the asset risk predictor 110 when determining the remedial action and/or generating the work order. The identified anomalous behavior may correspond to a severity parameter, which may be set via validation feedback and/or based on other data accessible by the asset risk predictor 110. The device model referenced by the asset risk predictor 110 may correspond to indications of severity associated with various anomalous behaviors. The asset risk predictor 110 may associate the severity parameter to the identified anomalous behavior based on the various anomalous behaviors and corresponding severity At block 170, the asset risk predictor 110 may store an indication of the current state of the industrial asset 114 is association with an indication of the first time, an indication of the current state, the maintenance priority determined based on the current state, an indication of the sensor that acquired the data, an indication of the remedial action, and/or an indication of the work order. In some cases, the indications stored at block 170 may be accessible by and/or requested by the industrial automation control system 78. In response to receiving the indications, the industrial automation control system 78 may generate one or more control signals to implement one or more control operations corresponding to the remedial actions.

In one example, the alert score crosses a threshold score and thus indicates a desired remediation. Before issuing a work order and/or control signal to trigger the desired remediation, the asset risk predictor 110 may compare the alert score to other alert scores and/or sensed data to a second device model for the industrial asset 114 to generate an alert level. From the second comparison, the asset risk predictor 110 may determine the industrial asset 114 has an alert level that is less than a threshold level, and thus does not correspond to a desired remediation (e.g., indicates normal operation). In this way, an operational baseline indicated via the second device model may include one or more of the sensors operating outside of the respective operational baselines indicated by the first device models. However, despite operating outside of these baselines, the second comparison indicating a normal operation may cause an alert score of the first comparison to be lowered. In other words, the asset risk predictor 110 may not differentiate alert score or alert level for a same asset and same sensor when comparing more than one alert score. Thus, if an overall alert level was lowered from one or more additional comparisons, reference alert scores may also be lowered from an original score determined. This may be thought of as an alert level feedback operation, where alert scores are adjusted based on determined alert levels in some cases.

Keeping the foregoing in mind, the asset risk predictor 110 may provide information to dashboards, such as information generated based on training and maintaining of various device models. Example dashboards are illustrated in FIGS. 8-13 and it should be understood that other dashboards may be generated by the asset risk predictor 110. The dashboards may include indications of data analyzed and/or generated by the asset risk predictor 110 and/or other systems and methods enabled via the SaaS/FaaS platform 108. In this way, the dashboards may be updated to indicate key performance indicators (KPIs) and other indications that communicate operations determined normal or anomalous by the asset risk predictor 110. Operations associated with the asset risk predictor 110 receiving electronic requests for dashboards and generating corresponding machine-readable indications of the dashboards to respond to the electronic requests are further elaborated on in FIGS. 6 and 7. FIG. 6 corresponds to a system where the edge gateway device 82 is used to transmit the dashboard request and FIG. 7 corresponds to a system where the computing device 74 transmits the dashboard request to the computing device 76, which may bypass one or more gateway devices 80, 82.

In both examples of FIGS. 6 and 7, the asset risk predictor 110 may generate graphical user interfaces (e.g., dashboards) with visualizations of industrial asset 114 health or performance monitoring data. The graphical user interfaces may be generated by the asset risk predictor 110, via the computing device 76 and/or the SaaS/FaaS platform 108, and delivered as an indication to the computing device 74. In some cases, the asset risk predictor 110 provides the graphical user interfaces via web-based user interfaces, which may be accessible via the network 84 or other suitable communication network. When the graphical user interfaces are web-based user interfaces, a graphical user interface may be accessed from a suitable Internet-enabled computing device. Due to server-side operations, individual operators of various industrial automation systems 46 and connected Enterprises may not have access to other industrial automation systems 46 and connected Enterprises data similarly stored or processed using the computing device 76. Operator profile metadata and computing device 74 metadata may be used by the computing device 76 to authenticate access to information presented in dashboards via the dashboards. In this way, a first operator of the industrial automation system 46 accessing the dashboard, either via indication or via web-based user interface, may be presented information in dashboards different from information presented to a second operator of the industrial automation system 46.

With this in mind, FIG. 6 is a flow diagram of a method 180 for operating the edge gateway device 82 to handle and convert a request from the computing device 74 from a first format used by a first communication network of domain 98 to a second format used by a second communication network of domain 100. Although the following description of the method 180 is described as being performed by the edge gateway device 82, it should be understood that any suitable computing device that may intercept communications from the industrial automation control system 78 and/or the domain 98 may perform the operations described herein, such as the gateway device 80. In addition, although the method 180 is described in particular order, it should be understood that the method 180 may be performed in any suitable order. For ease of description, the method 180 is described as performed relative to communications between domain 98 and domain 100, it should be noted that these operations may similarly apply to communications between a domain outside domain 98 or domain 100 that are sent to and/or received from the domain 100.

At block 182, the edge gateway device 82 may receive an indication of a request from the gateway device 80 originating from the computing device 74. The request corresponds to a request for a graphical user interface that indicates, for the one or more industrial assets 114 and/or the one or more geographic locations over the one or more time periods, a visualization of one or more of the following: an operational state (e.g., current state) of a respective industrial asset 114, a time associated with data acquisition used to generate the operational state, a maintenance priority associated with the operational state, a sensor (or other industrial asset 114) that performed the data acquisition, and/or a work order associated with the respective industrial asset 114.

At block 184, the edge gateway device 82 may convert the request from a first format (e.g., of domain 98) into a second format (e.g., of domain 100) and, at block 186, may send the converted request to the computing device 76. Converting the request may involve changing a data width of request, changing a size of a data and/or a set of data, aggregating data, changing a communication protocol of the request, adding or removing null data to improve suitability of transmission, or the like. Once processed, the request may be able to be handled and processed in the network 84, the asset risk predictor 110, and/or by the computing device 76.

In response to the request, the computing device 76 may update an indication presented via a graphical user interface associated with the computing device 74, such as an indication accessible via a web-portal or via a presented dashboard. The computing device 74 may access the dashboard via a web-based or -enabled interface and/or a CMMS platform. In some cases, the edge gateway device 82 may receive an indication of the graphical user interface (e.g., illustrated in one of FIGS. 8-13) from the computing device 76 based on the request. The resulting graphical user interface may include one or more indications of the one or more industrial assets 114, the one or more geographic locations, the one or more time periods, or the like, and/or the visualization of one or more of the following: an operational state (e.g., current state) of a respective industrial asset 114, a time associated with data acquisition used to generate the operational state, a maintenance priority associated with the operational state, a sensor (or other industrial asset 114) that performed the data acquisition, and/or a work order associated with the respective industrial asset 114, or the like. Other suitable information may be indicated via the graphical user interface. It is noted that the asset risk predictor 110 may use querying and other related operations described in FIG. 7 (e.g., blocks 206-210 of FIG. 7) in response to receiving the request transmitted to generate a subset of indications of all stored indications based on the indications included in the request received from the edge gateway device 82 (e.g., block 186 of FIG. 6). When the graphical user interface is presented via the display 130 of the computing device 74, visualizations corresponding FIGS. 8-13 may be presented.

Elaborating now on the example where the computing device 74 transmits the dashboard request to the computing device 76, FIG. 7 is a flow diagram of a method 200 for operating the computing device 76 to handle and convert a request from the computing device 74 from a first format used by a first communication network of domain 98 to a second format used by a second communication network of domain 100. Although the following description of the method 200 is described as being performed by the asset risk predictor 110, it should be understood that any suitable computing device that may intercept communications from the industrial automation control system 78 and/or the domain 98 may perform the operations described herein. In addition, although the method 200 is described in particular order, it should be understood that the method 200 may be performed in any suitable order. For ease of description, the method 200 is described as performed relative to communications between domain 98 and domain 100, it should be noted that these operations may similarly apply to communications between a domain outside domain 98 or domain 100 that are sent to and/or received from the domain 100.

Operations associated with blocks 202 and/or 204 may be similar to operations associated with blocks 182 and/or 184 and thus descriptions associated with FIG. 6 are relied on herein. In FIG. 7, the computing device 76 converts the received request to a suitable format for processing by the asset risk predictor 110. Indeed, the computing device 76 may include circuitry to convert the request between two or more communication protocols (e.g., two data formats). The circuitry may operate at an edge between a first communication protocol used by domain 98, the computing device 74, and/or the industrial automation control system 78, and a second communication protocol used by domain 100, the computing device 76 and/or the asset risk predictor 110. In some cases, an application programming interface (API) may map received requests (and sensor data) from the first format into the second format for handling in the domain 100 and/or by the asset risk predictor 110.

Indeed, at block 202, the computing device 76 may receive a request from an computing device 74, such as a request for a graphical user interface that indicates, for the one or more industrial assets 114 and/or the one or more geographic locations over the one or more time periods, or the like, and a visualization of one or more of the following: an operational state (e.g., current state) of a respective industrial asset 114, a time associated with data acquisition used to generate the operational state, a maintenance priority associated with the operational state, a sensor that performed the data acquisition, and/or a work order associated with the respective industrial asset 114, or the like. At block 204, the computing device 76 may convert the request from a first format (e.g., of domain 98) into a second format (e.g., of domain 100). Operations of blocks 202 and 204 are similar to blocks 182 and 184 described in FIG. 6 and thus descriptions are relied on herein.

At block 206, the computing device 76 may, on behalf of the asset risk predictor 110, query the memory to access information corresponding to the one or more industrial assets 114, the one or more geographic locations, one or more indications of an operational state (e.g., current state) of a respective industrial asset 114, one or more indications of a time associated with data acquisition used to generate the operational state, one or more indications of a maintenance priority associated with the operational state, one or more indications of a sensor that performed the data acquisition, and/or one or more indications of a work order associated with the respective industrial asset 114, or the like. Any suitable information may be request and queried for inclusion in the dashboard, such as information corresponding to visualizations depicted in FIGS. 8-13.

At block 208, the computing device 76 may, on behalf of the asset risk predictor 110, filter the stored indications based on the one or more time periods to generate filtered query results (e.g., a filtered subset of the information accessible via asset risk predictor 110). Thus, a subset of the query results may be identified as relevant to the request received at block 202 on which to base generation of a graphical user interface (e.g., dashboard). The computing device 76 may filter the query results based on a profile associated with the computing device 74. The profile may correspond to an operator profile that is accessing the computing device 74. The computing device 74 may be associated with metadata, like a permission level indication, a role indication, or the like. The permission level indication and the role indication may correspond to a user profile accessing the computing device 74 to generate the request for the graphical user interface. The computing device 76 may access the metadata and filter the query results to remove a subset of results that metadata indicates is to not be presented via a display 130 of the computing device 74. Permission metadata and/or role indications may be stored in the database 106 and/or in another suitable manner as to prevent (or reduce a likelihood of) the request transmitted from enabling indication of a different a permission or role than that which is assigned to a user profile and/or to the computing device 74.

At block 210, the computing device 76 may, on behalf of the asset risk predictor 110, generate an indication of a graphical user interface indicative of the filtered query results generated at block 208. The generated indication may be used to update a web-based indication of associated with the respective industrial asset 114, of the dashboard, a CMMS, a graphical user interface, or the like, similar to as described above in association with operations of block 186 of FIG. 6.

As described above, the asset risk predictor 110 may generate one or more GUIs illustrated in FIGS. 8-13 in response to request operations of FIG. 6 or FIG. 7 to present data generated based on device models trained and accessed in operations of FIGS. 4-5. GUIs of FIGS. 8-9 may correspond to a CMMS and GUIs of FIGS. 10-13 may correspond to dashboards. Although some information is depicted in FIGS. 8-13, it should be understood that any suitable information may be included in the GUIs.

For ease of description, the example dashboards described herein are generated by the asset risk predictor 110 in response to a request from the computing device 74 to include alerts processed by the asset risk predictor 110 using one or more methods described above (e.g., FIGS. 4-7). In each of the FIGS. 8-13, the asset risk predictor 110, via computing device 76, may have generated and provided an indication of the graphical user interface to the computing device 74 for presentation. Presentation of operational monitoring and control information via dashboards in graphical user interfaces may improve computational efficiency of the industrial automation system 46 since relatively fewer number of computing operations may be performed to access a similar quantity of the operational monitoring and control information relative to the alternative of accessing the operational monitoring and control information in individual transactions when not presented in association with each other.

To elaborate, FIG. 8 is a diagrammatic representation a graphical user interface presenting a visualization 220 corresponding to a CMMS presented via the computing device 74 to illustrate a set of work orders entries 224 (e.g., work order entry 224A, work order entry 224B, work order entry 224C) identified via indications of respective codes 226. The visualization 220 includes indications of drop down menus 228, indications of tabs 230, indications of work orders 232, visualization of work order parameters, like estimated time to complete indications 234, description indications 236, corresponding asset indications 238 (e.g., "asset name indication (asset code indication)"), assigned user profile indications 240, completion status indications 242, completed by user profile indications 244, type indications 246, priority indications 248, and the like.

The estimated time to complete indications 234 may correspond to an estimated time to complete the task or analysis indicated via description indications 236. The description indications 236 may indicate a remedial action or other preventive maintenance operation to perform to address a detected operational anomaly (e.g., an anomaly detected via asset risk predictor 110). Corresponding asset indications 238 may indicate the asset (e.g., industrial asset 114) to which the work order identified via the code 226 is assigned. The assigned user profile indications 240 may indicate a user profile to which the work order identified via the code 226 is assigned, where the assigned user profile indications 240 enable the customization of the dashboard based on user profile accessing the computing device 74 and/or otherwise requesting the dashboard. Completion status indications 242 may indicate whether the work order identified via the code 226 has been associated to a user profile (e.g., "assigned"), incomplete (e.g., "open"), or being completed (e.g., "work in progress"). When the work order is completed, a corresponding completion status indication 242 may be updated to "completed" and be filtered from presentation via one or more dashboards (e.g., as a default, in response to a setting being indicated to default to not presenting completed work orders). Completed by user profile indications 244 may indicate a user profile indication associated with performing or updating the completion status metadata, which may or may correspond to those included in the column having the assigned user profile indications 240. The combination of statuses "assigned" and "completed by users" "FN760057, FN760250" shown with work order entry 224C may be included when a subsequent maintenance operation is triggered and a related work order entry is generated while performing the task or analysis indicated via description indication 236 ("HVAC unit is making an irregular sound"). The type indication 246 may correspond to a category of work order associated with the respective work order entry 224. The priority indications 248 may correspond to a relative priority of a corresponding work order entry. The priority indications 248 may adjust a presentation of one or more work order entries 224 in a different dashboard (e.g., FIG. 12).

One or more of the work order entries 224 may correspond to a respective set of work order parameters. For example, a cooker work order entry 224A corresponds to description indication 236 ("Cooker—not reaching temperature of 350 F, only getting to 286 F"), corresponding asset indication 238 ("Cooker (A785)"), completion status indication 242 ("Open"), type indication 246 ("Damage"), priority indication 248 ("Low"), and the like. Once the cooker work order entry 224A is assigned to a user profile, the work order entry 224A may be associated with assigned user profile indication 240 (such as "FN760060" as associated with work order entry 224B).

Visualizations 220 may change based on data of a request from the computing device 74 and/or metadata associated with the computing device 74. For example, when the computing device 74 corresponds to a maintenance technologist (as opposed to a managing MA Tech), the visualizations presented may be reduced in complexity to emphasize the subset of work orders assigned to that maintenance technologist. Thus, the visualizations may be filtered by value of assigned user profile indication 240 based on user profile metadata indications by the request transmitted at block 182 of FIG. 6 or block 202 of FIG. 7. Other filtering operations described in reference to at least FIGS. 8-13 may occur based on various combinations of metadata available for filtering and/or otherwise maintained by the computing device 76 relative to the metadata indicated by the computing device 74. Any suitable combination of filtering operations may be performed to provide dashboards of FIGS. 8-13 to enable presenting a subset of information able to be included in a dashboard by the asset risk predictor 110 based on information requested by the computing device in the request of blocks 182 and 202 and identified permissions associated with the information requested.

Some of the work order parameters may link or be associated to other datasets or dashboards corresponding asset indications may link to a dataset corresponding to the indicated asset. For example, a visualization of the corresponding asset indication 238 in FIG. 8 may be a hyperlink that leads to an asset profile (e.g., example in FIG. 12), a work order dashboard (e.g., example depicted in FIG. 14), or another suitable dashboard. As another example, the assigned user profile indication 240 may link to a user profile dashboard that includes indications of outstanding and/or completed work orders assigned to the user profile. Furthermore, the asset may be associated with a geographic location and/or logical location and thus the asset profile may correspond to data that indicates the geographic location and/or the logical location. The location data may be used to categorize assets into sub-groups by location for comparison operations and enhance alert monitoring and management.

Figure 9:
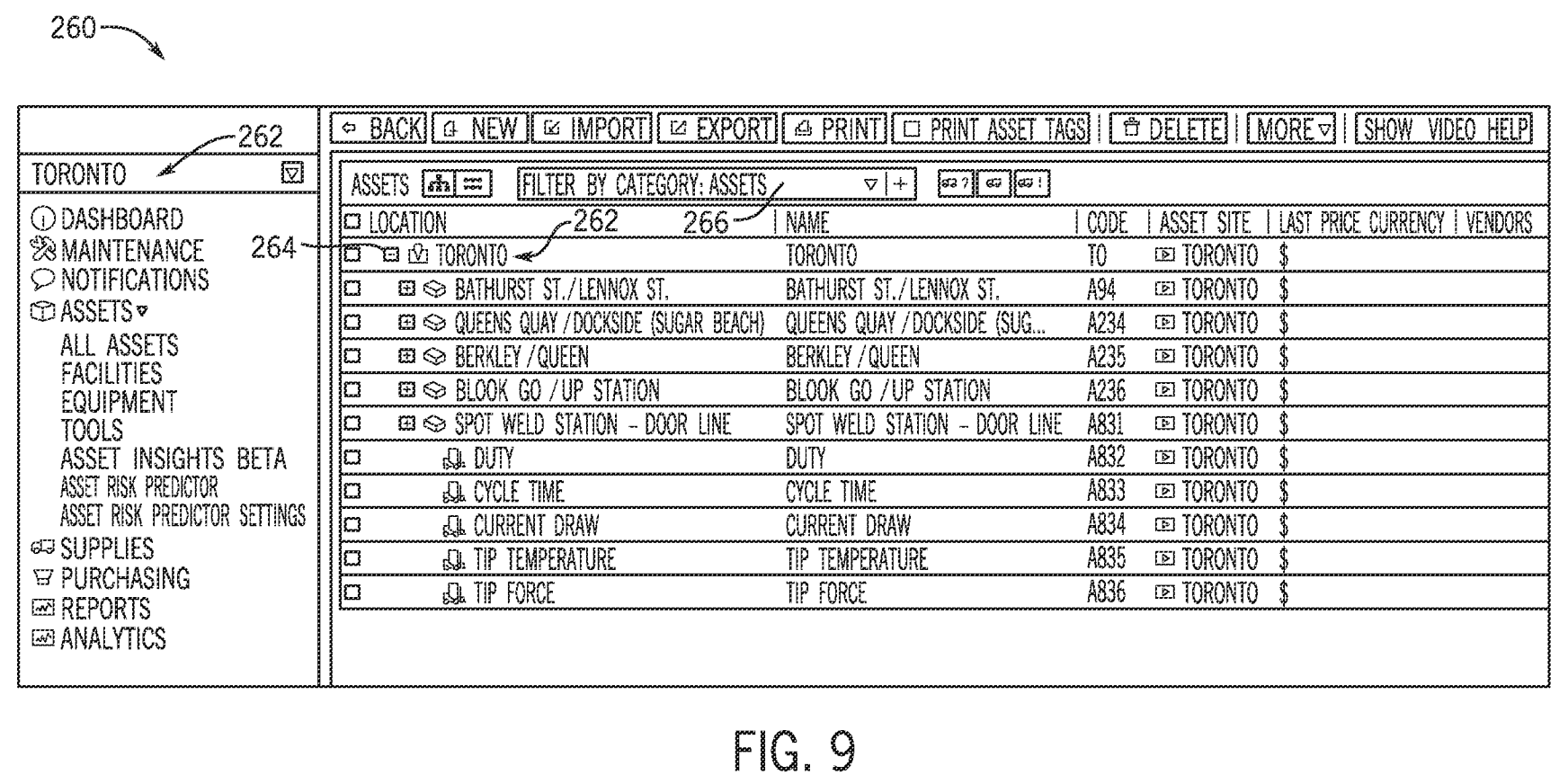

For example, FIG. 9 is a diagrammatic representation of a graphical user interface presenting a visualization 260 corresponding to a CMMS presented via the computing device 74 that groups asset profiles based on location indication 262 data. In the visualization 260, icons like the icon 264 may correspond one or more of the location indications 262. The icon 264 may respectively enable navigation to a subset of asset profiles associated with a location (e.g., within a threshold distance from a particular geophysical indication or coordinate, asset is considered as disposed generally at the location) that corresponds to the location indication 262. For example, selecting icon 264 may update the visualization 260 to present a first subset of asset profiles located in "Toronto" while selecting another icon may updates the dashboard to present a second subset of asset profiles located in a different location. Drop down menu 266 permits selection of a filtering criteria, where the filtering criteria corresponds to asset metadata that may be the same as or substantially similar to the work order parameters described above in FIG. 8. When selecting an icon 264, the visualization 260 may present an animation to transition to presenting a subset of assets and/or work orders associated with that location corresponding to the selected icon.

Figure 10:
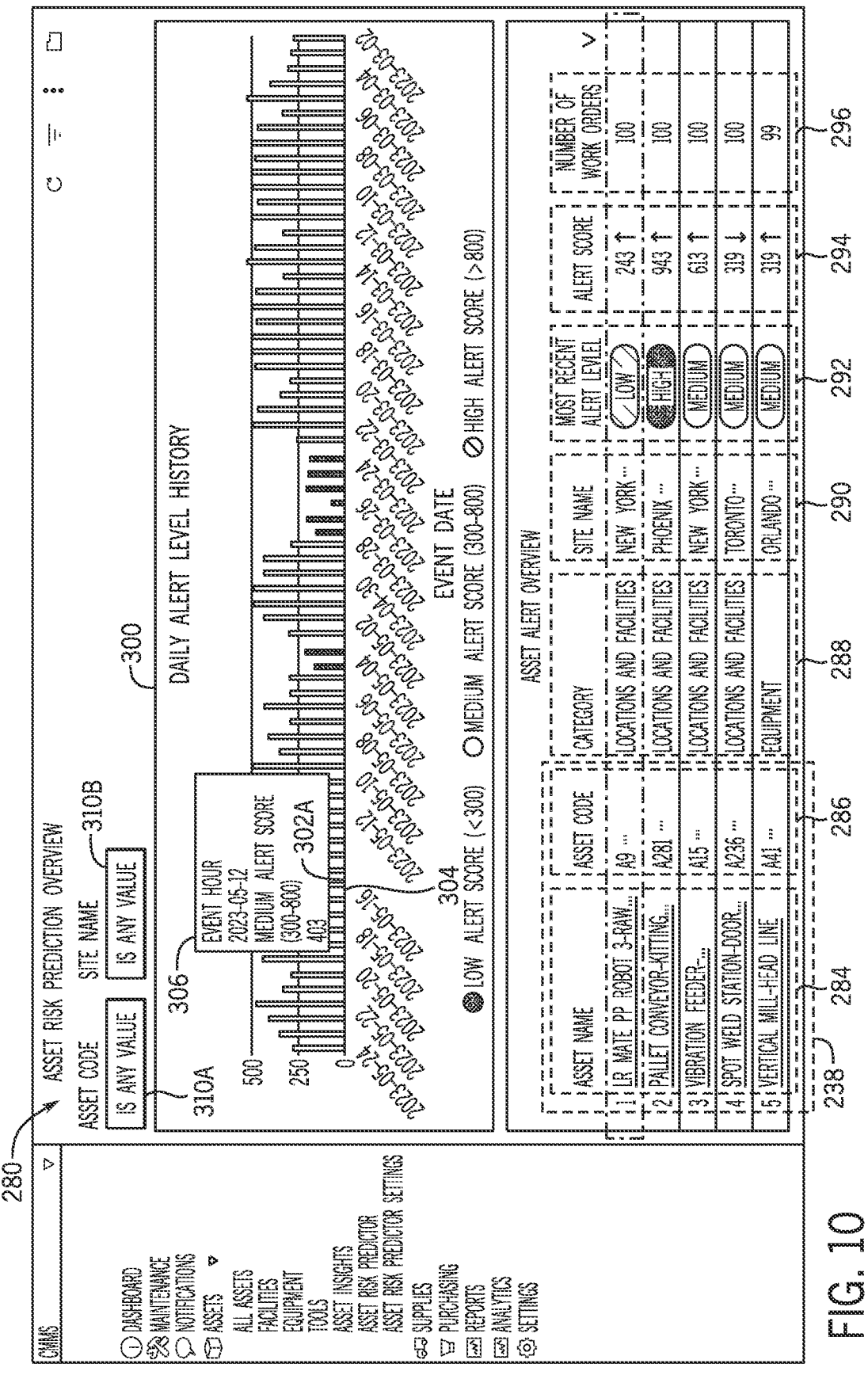
FIG. 10 is a diagrammatic representation of a GUI presented via the first computing device of FIG. 2, where the GUI may be generated based on one or more operations of FIGS. 5-7, in accordance with an embodiment.

To elaborate further on filtering, FIG. 10 is a diagrammatic representation of a graphical user interface presenting a dashboard 280 associated with the asset risk predictor 110 (e.g., "Asset Anomaly Prediction Overview"). The dashboard 280 may be presented via the computing device 74 that illustrates a dashboard that may result from filtering using a combination of a drop down menu, like the drop down menu 266 of FIG. 9, and filtering operations of the asset risk predictor 110 (e.g., block 206 of FIG. 7). A combination of data queried by the computing device 74 at block 206 of FIG. 7 resulted in a dashboard illustrating a variety of assets from a variety of locations being presented in the same third dashboard 280. Query parameters may be input via drop-down menus 310 (e.g., drop-down menu 310A, drop-down menu 310B). The drop-down menu 310A enables filtering by location (e.g., site name indication 290). The drop-down menu 310B enables filtering by asset (e.g., asset code indication 286). The third dashboard 280 resulting from filtering in the dashboard may include asset entries (e.g., asset entry 282 rows) associated with corresponding asset indications 238, asset name indications 284, asset code indications 286, category indications 288, site name indications 290, alert level indications 292 (e.g., most recent alert level corresponding to that asset name indication 284 in memory), alert score indications 294, number of work orders indication 296, or the like.

The asset code indications 286 may be an identified alphanumerical or symbolic value to aid filtering and associations with the asset entries 282. The asset code indications 286 may be unique to or shared among different locations (e.g., a motor in New York may have an asset code of "A11" and a motor in Phoenix may also have an asset code of "A11" since the entries may be distinguished based on a combination of asset code and location). The category indications 288 may indicate a class or type of an associated industrial asset 114 (e.g., identified via the corresponding asset indications 238). The corresponding asset indications 238 may be associated with one or more work order entries from FIG. 8, where this relationship is represented via the corresponding number of work orders indication 296 indicating a count of the associated work orders. The alert score indication 294 may correspond to a relatively highest alert score of multiple sensors associated with the given asset (and any related child assets to the given asset). Respective alert scores and alert levels discussed in reference to FIGS. 8-13 may be determined based on operations of FIG. 5. For a given asset, the alert level indication 292 may correspond to an alert level or a predicted alert level for the given asset based on the alert scores for the multiple sensors across one or more days of monitoring. It is noted that alert levels and predicted alert levels are sometimes separately presented in a dashboard, as indicated in FIG. 12.

The third dashboard may include a plot 300 that compares daily recent alert level over time. Each bar 302 corresponds to a different date in the plot 300. Each date corresponds to event information. When a cursor 304 hovers or selects a respective of bars 302 (e.g., bar 302A), information related to a maximum alert level (e.g., greater than a threshold level) for a particular day is presented (e.g., via overlaid box indication 306). For example, bar 302A corresponds to a first date (e.g., "May 12, 2023") and on the first date the highlighted medium alert score equaled 384. Sometimes the overlaid box indication 306 includes an indication of a sensor (e.g., sensor name) having the alert score and/or a more detailed time stamp to reduce complexity of comparing the alert score to other sensed data or reported scores. In some cases, the asset risk predictor 110 processes incoming data such that alert scores associated with a given date represent a maximum alert score for that day (e.g., greater than a threshold score).

Figure 11:
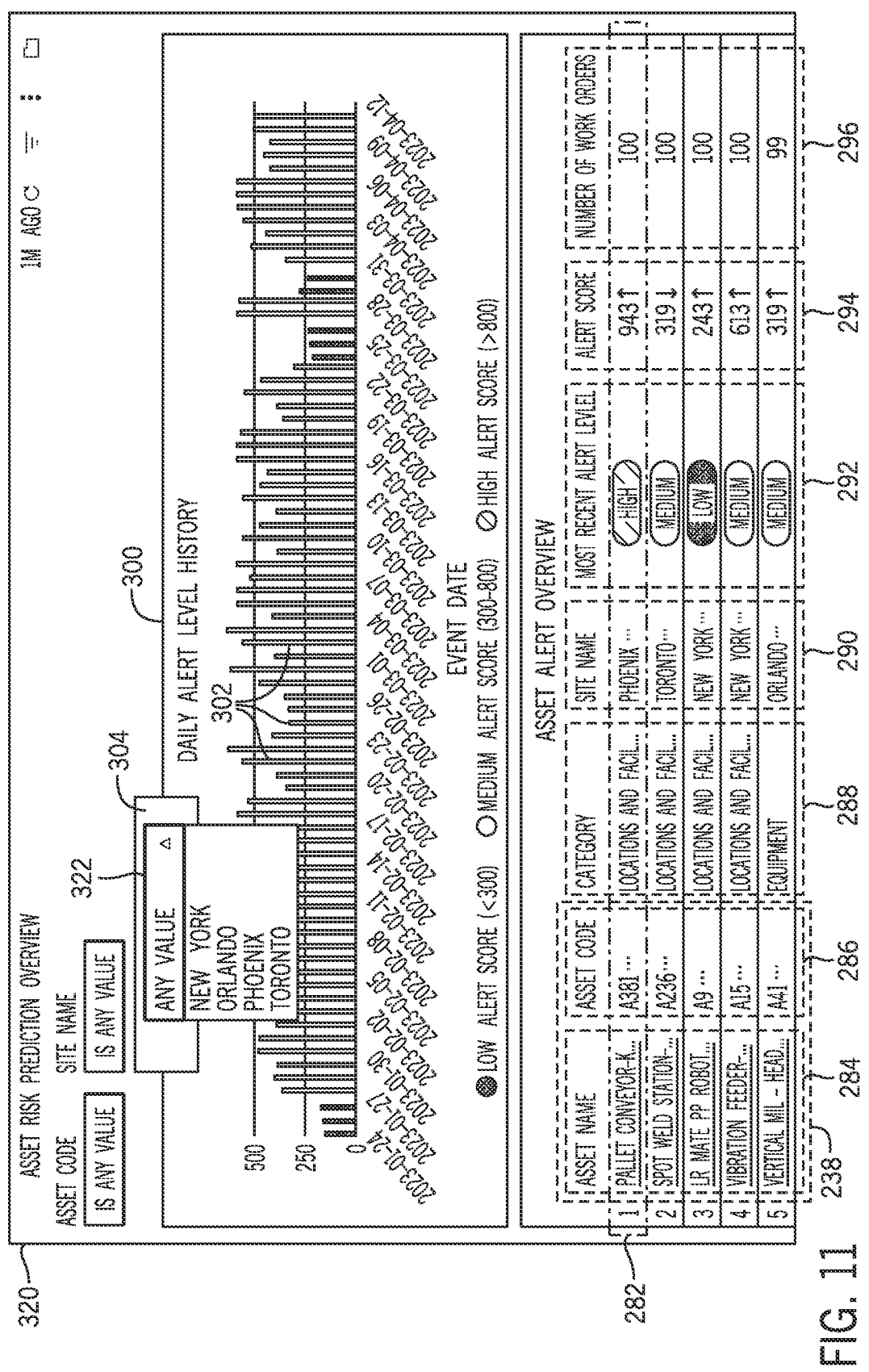
FIG. 11 is a diagrammatic representation of a GUI presented via the first computing device of FIG. 2, where the GUI may be generated based on one or more operations of FIGS. 5-7, in accordance with an embodiment.
Figure 12:
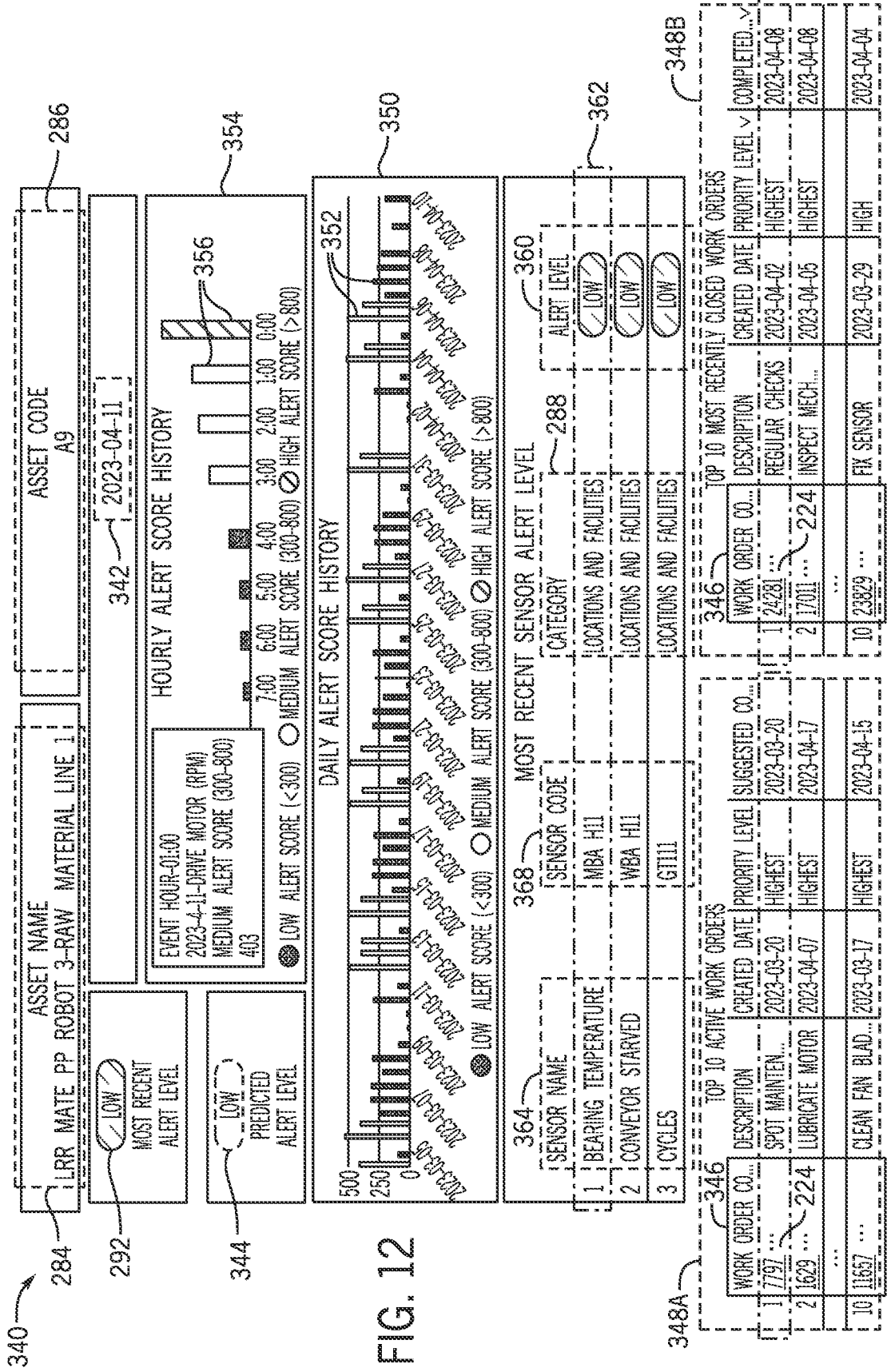
FIG. 12 is a diagrammatic representation of a GUI presented via the first computing device of FIG. 2, where the GUI may be generated based on one or more operations of FIGS. 5-7, in accordance with an embodiment.

FIG. 11 is a diagrammatic representation of a graphical user interface presenting a dashboard 320 corresponding to changes from filtering in the dashboard being applied to the third dashboard 280 and presented via the computing device 74 as the fourth dashboard 320, where a drop down menu 322 is extended. FIGS. 10-11 may represent a presented animation where the cursor 304 is moved from a respective bar 302 to the drop-down menus 310. Descriptions regarding the various illustrated indications are relied upon herein.

As filters are applied via the drop down menus 310, indications of industrial assets 114 in inset data structure "Asset Alert Overview" dynamically updates. The selection of the filter parameters via the drop-down menus 310 may serve as a command to request an updated dashboard from the computing device 76. The inset data structure "Asset Alert Overview" in FIGS. 10 and 11 overall illustrates via a visualization including most recent asset information for a subset of industrial assets 114.

Furthermore, as illustrated in FIGS. 10 and 11, asset name indications 284 may respectively link or be associated to other datasets or dashboards. For example, in the dashboard 280 and the dashboard 320, the asset name indication 284 may link to a dataset corresponding to the indicated asset. The dataset that is linked may, once engaged via an input, prompt presentation of an asset profile (e.g., FIG. 12).

To elaborate on an example asset profile that may be linked from asset name indications from various of the described dashboards, FIG. 12 is a diagrammatic representation of a graphical user interface presenting a fifth dashboard 340 presented via the computing device 74 to depict visualization of an asset profile. The fifth dashboard 340 includes the asset name indication 284 ("LR Mate PP Robot 3—Raw Material Line 1") and the asset code indication 286 ("A9") of the industrial asset 114 corresponding to the depicted asset profile of a respective industrial asset 114. The fifth dashboard 340 also include a time indication 342 that depicts the last update to the information presented via the asset profile. Also included are indications of alert levels for the industrial asset 114 (e.g., most recent alert level indication 292) and a predicted alert level 344 (e.g., an indication of expected future performance based on the current most recent alert level and one or more device models, indication of what performance the next day is expected to be if no change in operation).

Figure 14:
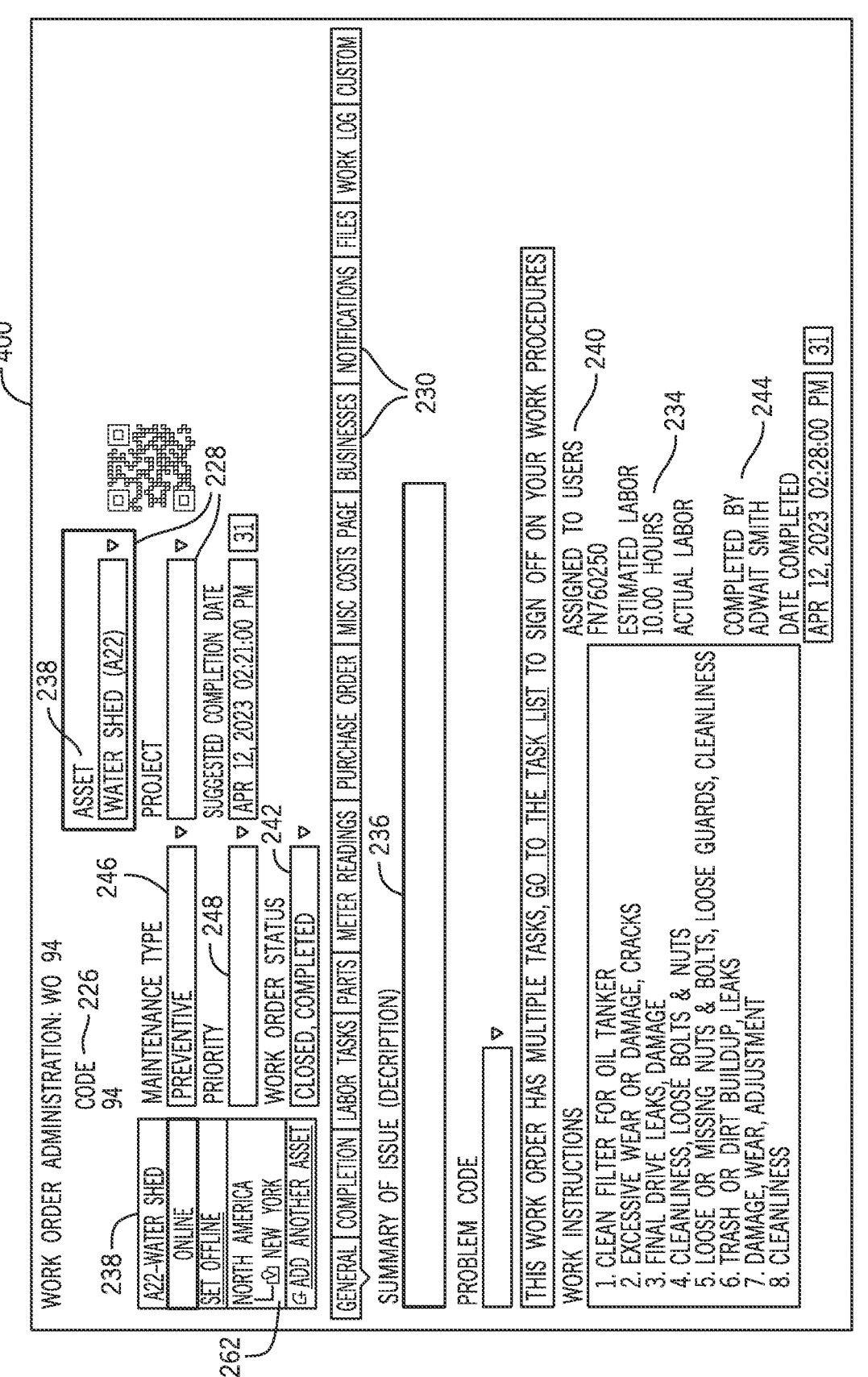
FIG. 14 is a diagrammatic representation of a GUI presented via the first computing device of FIG. 2, where the GUI may be generated based on one or more operations of FIGS. 5-7, in accordance with an embodiment.

Work order code indications 346 of the fifth dashboard 340 may link back to work order dashboards, such as the dashboard 400 of FIG. 14, and correspond to work order entries. Inset data structures 348 (data structure 348A, data structure 348B) may reorder a defined quantity of indications of work orders corresponding to the depicted asset profile of a respective industrial asset 114. As work orders are closed or completed, the inset data structures 348 may be updated.

Inset plot 350 includes bars 352 that correspond to highest alert score (e.g., y-axis) on a particular day (e.g., x-axis) among each sensor associated with the industrial asset 114 over time. Thus, the inset plot 350 may include one bar 352 on one day for a first sensor and a second bar 352 on a second day for a second sensor, when the first sensor is the highest alert score on one day but not another day. Alert score history shown indicates relatively highest alert scores over two time periods—a first inset plot 354 being for a first time periodicity (e.g., reported for each hour) and a second inset plot 350 being for a second time periodicity (e.g., reported for each day). The inset plot 354 may include one bar 356 for a first hour and a second bar 356 for a second hour, and each bar may or may not have a same alert score, which may correspond to respective coloring, a pattern, or other visualization. The inset plot 354 may depict one or more average alert scores derived from hourly data, highlighting a sensor name that had the relatively highest amount of impact in a respective hour and thus appeared most frequently in the alert scores reported for that respective hour (e.g., greater than a threshold amount of appearances in the alert scores received in a respective hour).

Most recent alert level indication 292 may represent the latest available record and a health trend or alert trend for the industrial asset 114 identified via the asset name indication 284, as discussed above with reference to FIGS. 10-11. The widget "Most Recent Sensor Alert Level" may include indications corresponding to one or more latest available records from one or more sensors. Alert level indications 360 indicate the latest available alert level for a particular sensor indicated in a sensor entry 362 by a sensor name indication 364. The sensor entries 362 include a sensor code indication 368 and a category indication 288. The alert level indications 360 of one or more associated sensors to the industrial asset 114 identified via the asset name indication 284 may be used by the asset risk predictor 110 when determining the most recent alert level indication 292.

Figure 13:
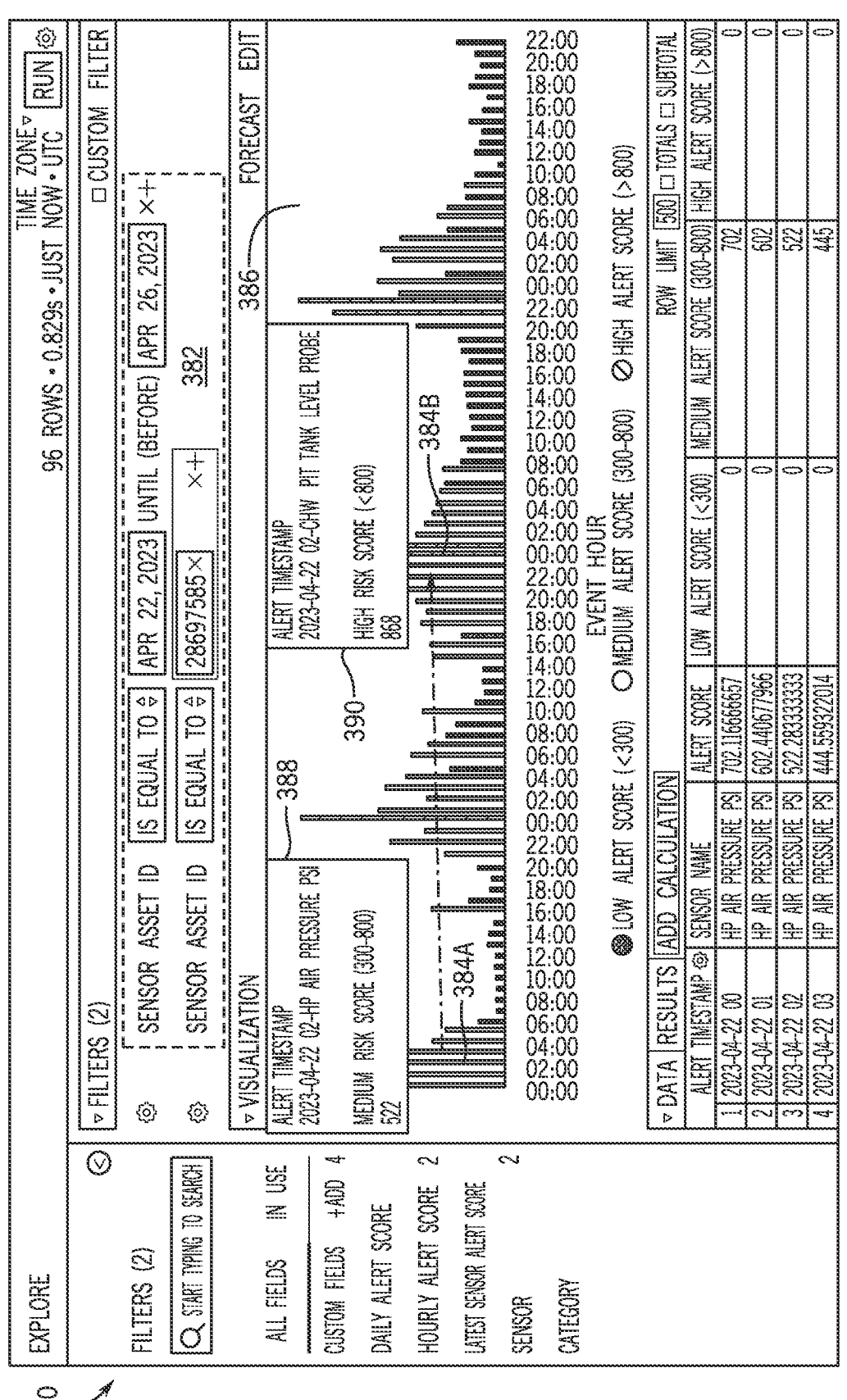
FIG. 13 is a diagrammatic representation of a GUI presented via the first computing device of FIG. 2, where the GUI may be generated based on operations of based on one or more operations of FIGS. 5-7, in accordance with an embodiment.

In some cases, the asset risk predictor 110 receives a request indicating to filter a generated dashboard based on two or more filtering operations. For example, FIG. 13 is a diagrammatic representation of a graphical user interface presenting a sixth dashboard 380 presented via the computing device 74 and an animation associated with the sixth dashboard 380 generated based on two filter parameters 382 ("event date" and "asset ID"). Although a two-day history of alert scores is illustrated, it should be understood that in this dashboard and/or in another other suitable dashboard described or suggested herein, any number of days of historical alert score or level data may be presented, such as 30 days, 45 days, 47 days, or the like. The animation is presented in response to a cursor moving across one or more alert score bars 384 (bar 384A, bar 384B) of a plot 386. As the cursor moves across the sixth dashboard, indicate of alert timestamps and alert scores corresponding to the alert timestamp appear as an overlaid visualization 388 and an overlaid visualization 390. Each of the overlaid visualizations 388, 390 correspond to respective alerts generated by the asset risk predictor 110 corresponding to sensed data, where each alert has an alert score and an alert timestamp that corresponds to a time the sensed data was acquired at (and thus a time of the event corresponding to the alert).

FIG. 14 is a diagrammatic representation of a graphical user interface (GUI) presenting a dashboard 400, where the GUI may be generated based on one or more operations of FIGS. 5-7. The dashboard 400 may correspond to a work order generated by the first computing device 74 or the asset risk predictor 110 via the second computing device 76. The dashboard 400 may include drop down menus 228, tabs 230, indications corresponding to one or more location indication 262 data, visualization of work order parameters, like estimated time to complete indications 234, description indications 236, corresponding asset indications 238 (e.g., "asset name indication (asset code indication)"), assigned user profile indications 240, completion status indications 242, completed by user profile indications 244, type indications 246, priority indications 248, a work order code 226, and the like. The dashboard 400 is an example of a type of work order that may be generated by the asset risk predictor 110, such as by using methods of FIG. 5 and/or FIG. 22, as will be appreciated.

Figure 15:
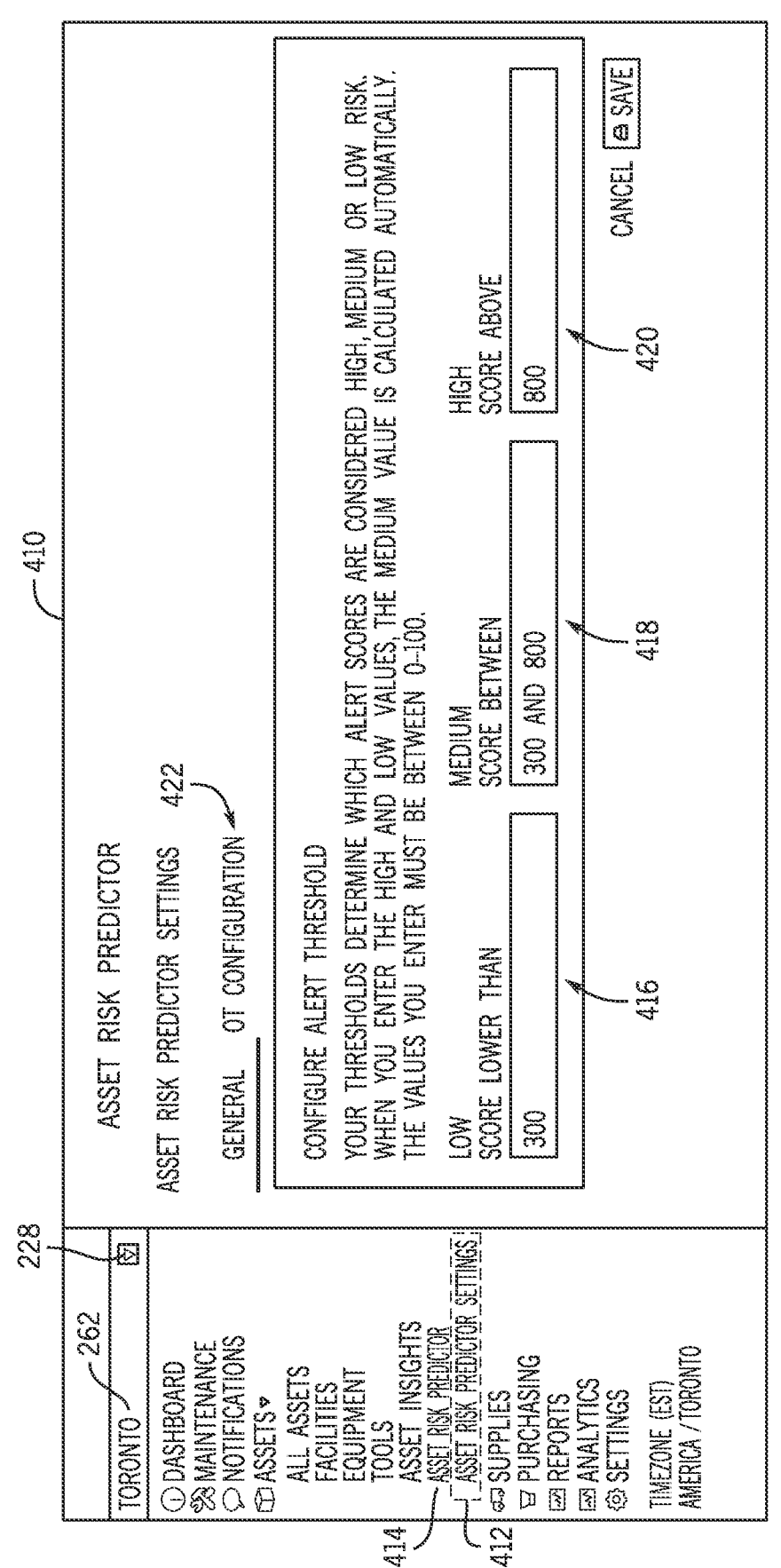
FIG. 15 is a diagrammatic representation of a GUI presented via the first computing device of FIG. 2, where the GUI may be generated to enable operations of FIG. 5, in accordance with an embodiment.

FIG. 15 is a diagrammatic representation of a GUI of a dashboard 410 presented via the first computing device 74, where the dashboard 410 may enable operations of the asset risk predictor 110 by providing an input to receive one or more threshold indications. The dashboard 410 may be presented in response to a selection of indication 412. The dashboard 280 may be presented in response to a selection of indication 414. Default thresholds may be set to a set of values, such as 300 for a low score threshold 416, 800 for a high score threshold 418, and a range between 300 and 800 for a medium score range 420. There may be a time period between when the threshold values are updated via the dashboard 410 and when the asset risk predictor 110 adjusts predictions based on the changes. Furthermore, in some cases, the changes to the thresholds are applied going forward as opposed to retroactively. In some systems, however, the changes are also applied retroactively (e.g., applied to previous predictions, alert scores, and/or alert levels). Other configurations of OT devices may be set as referenced via the asset risk predictor 110 via "OT Configuration" portion 422 of the dashboard 410. Changes applied to general asset risk predictor settings and/or to OT configurations may be associated globally (e.g., via "save" indication) with each industrial asset and corresponding trained device models based on the location indication 262 data selected via drop down menu 228.

Figure 16:
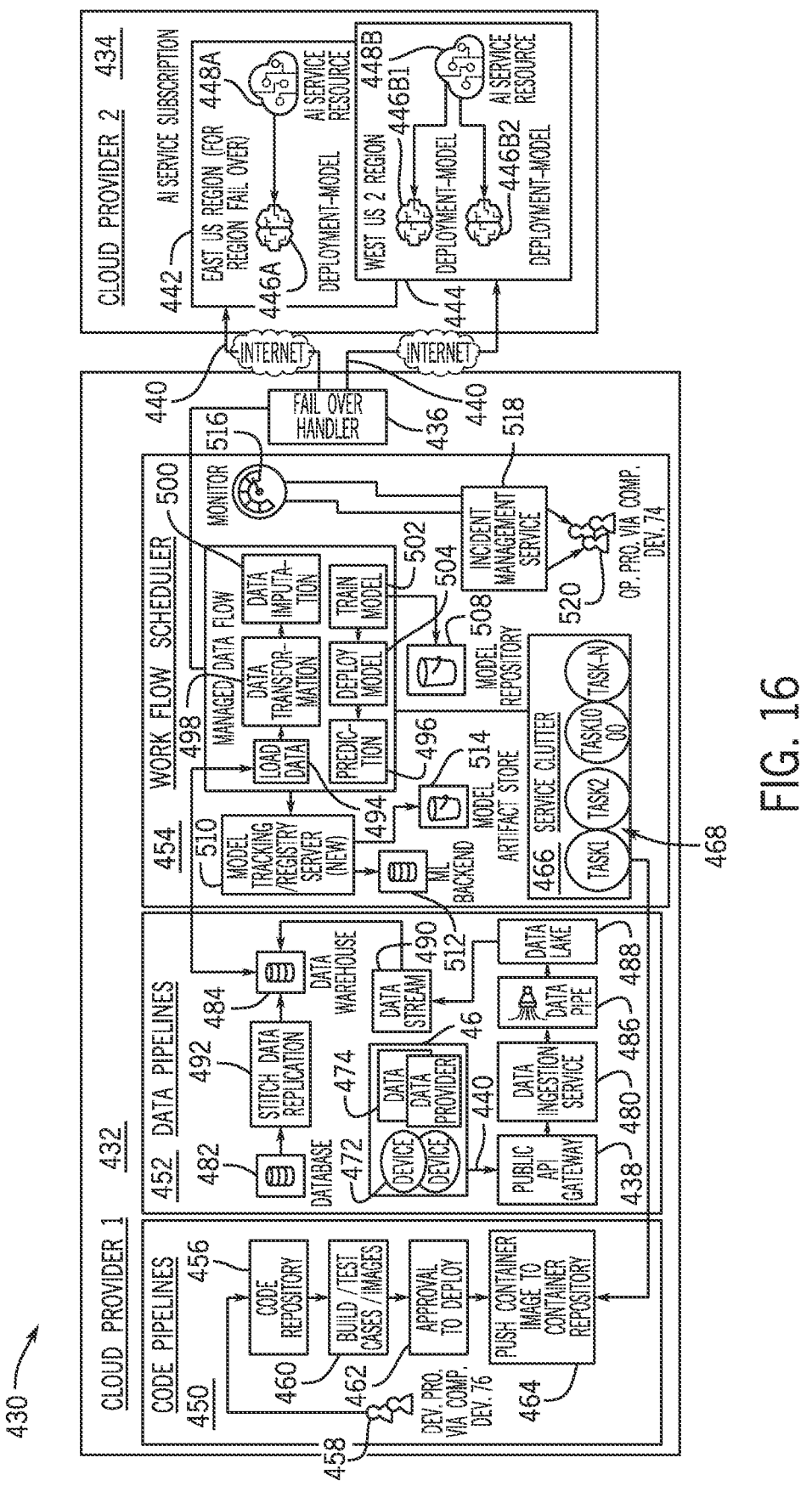
FIG. 16 is a diagrammatic representation of an example of at least a portion of the system of FIG. 2, in accordance with an embodiment.

FIG. 16 is a diagrammatic representation of an example of at least a portion 430 of the system 72. One or more computing devices illustrated and described herein may be implemented in one or more computing devices 76. These computing devices may be disposed off-premise relative to one or more industrial automation systems 46 and be accessible via wireless communicative couplings 440 (e.g., Internet-enabled systems and methods). In this example, a first cloud provider 432 is communicatively coupled to a second cloud provider 434 via a Fail Over Handler system 436 and to one or more industrial automation systems 46 via a public API gateway system 438.

The first cloud provider 432 and the second cloud provider 434 may correspond to one or more computing devices 76 that execute software instructions stored in memory to provide one or more computing services and resources over the wireless communicative couplings 440 (e.g., the Internet), which may enable computing devices 74 to access and utilize relatively powerful computing capabilities without owning and/or having direct programmable access to the physical infrastructure associated with the computing devices 76. The first cloud provider 432 and the second cloud provider 434 may be disposed in domain 100. These services may encompass infrastructure, platform, and software services delivered from one or more relatively large-scale data centers that may be implemented via one or more servers. The Fail Over Handler system 436 may detect and respond to a disruption or misoperation associated with the computing services and resources provided by the first cloud provider 432 by automatically redirecting traffic or switching to backup resources or instances provided via the second cloud provider 434. Using the Fail Over Handler system 436 may advantageously reduce downtime and maintain seamless operation from the perspective of the computing device 74. Indeed, the second cloud provider 434 may maintain separate and parallel backup systems 442, 444 in one or more different geographical regions (e.g., "East US Region" and "West US 2 Region"). The backup systems 442, 444 may include backups of data referenced by the first cloud provider 432 and may be periodically maintained as backups according to a schedule (e.g., once per week, once per day, any suitable frequency and time period). The second cloud provider 434 may provide an AI service subscription to which tenant devices may subscribe. Indeed, the backup data may include one or more deployment models 446 and one or more AI service resources 448, which may be associated with the AI service subscription. It is noted that the backup systems 442, 444 may be designated for different geolocations. For example, backup system 442 may backup data for East US Region and thus data of deployment model 446A may correspond to the East US Region (which may be different relative to data of deployment models 446B1 and/or 446B2 designated to West US 2 Region). The same may apply to data of AI service Resources 448A and 448B. In some cases, AI service resources may store results and/or configurations or otherwise enable of training operations of the asset risk predictor 110.

The first cloud provider 432 may correspond to one or more computing devices 76 and may implement the asset risk predictor 110 via one or more systems corresponding to the SaaS/FaaS platform 108. When doing so, the first cloud provider 432 may use one or more code pipelines 450, one or more data pipelines 452, one or more work flow schedulers 454, or the like. The code pipelines 450, data pipelines 452, and work flow schedulers 454 are specific examples and the first cloud provider 432 may use additional or alternative systems to perform or enable asset risk predictor 110 operations.

The code pipelines 450 may include one or more code repositories 456. The code repository 456 may be a centralized storage location accessible by developer profiles and/or corresponding computing devices 76 (e.g., at 458) to store and manage generated source code. The code repository 456 may enable changes from one or more computing devices 76 to collaborate, track changes, maintain version control over the codebase, or the like with reduced likelihood for duplicated edits or efforts among accessing computing device 76. Code repositories 456 may communicatively couple to a build/test cases/container image system 460, which may be associated with test container images. The test container images may be self-contained environments that encapsulate one or more dependencies and/or configurations used to execute and/or automate tests of operations or of the containers. The build/test cases/container image system 460 may provide a consistent and isolated testing environment, enabling functionality and performance of software applications to be verified before deployment. Once verified, at block 462, an approval to deploy may be given and a corresponding indication of deployment approval may be updated for that verified container image. Once approved, the verified container image may be, at block 464, pushed to a container repository based on outputs from one or more service cluster 466. The container repository may be a storage location that holds container images. The service cluster 466 may correspond to a group of interconnected computing resources, such as servers or virtual machines, that collaborate to deliver specific services or applications based on pooling resources and/or distributing workloads (e.g., tasks 468) across the service cluster 466. The tasks 468 may be generated based on outputs from a managed data flow 470.

Elaborating further on the managed data flow 470, the industrial automation system 46 may be coupled to one or more data pipelines 452, such as via one or more computing devices 74 and/or edge gateway device 82. The industrial automation system 46 is shown as including devices 472 and data providers 474, where the devices 472 may correspond to industrial machines 112 and the data providers 474 corresponding to the industrial automation devices 86. It is noted that any suitable provider of data may be referred to as the data provider 474, which may include any suitable data source described herein (e.g., industrial asset 114, sensors, data sources). The industrial automation system 46 may provide data to the data pipelines 452 via the public API gateway 438. The public API gateway 438 may be a centralized entry point to data processing operations of first cloud provider 432 that allows external applications and/or devices associated with the industrial automation system 46 to access and/or interact with a collection of APIs provided by a service or a platform (e.g., SaaS/FaaS platform 108), which may enable controlled integration with various applications and services external to the first cloud provider 432 that reduces complexity of integration.

The public API gateway 438 may communicatively couple to a data ingestion service 480. The data ingestion service 480 may be a system that facilitates receiving and importing data from one or more different data sources into a centralized data storage or processing system, such as a database 482 or data warehouse 484, to enable further analysis and utilization of the data. In some cases, conversion operations described in reference to FIGS. 6-7 may be performed via the data ingestion service 480. The data ingestion service 480 may output such processed data to a data pipe 486. The data pipe 486 may be a pipeline or channel that transmits data between different systems, applications, or components within the first cloud provider 432, while may enable data processing and handling between disparate data sources or destinations, such as between different industrial automation systems 46 regardless of whether associated with a same owning enterprise. The data pipe 486 may transmit data in association with metadata to aid suitable storage of data with corresponding data of that associated industrial automation system 46.

The data pipe 486 may transmit data from the data ingestion service 480 to a data lake 488. The data lake 488 may be a centralized repository or storage system that stores relatively large amounts of raw data in its native format. The raw data may be heterogeneous with respect to other data of the data lake 488. Configurations of a data stream 490 may enable the raw data from the data lake 488 to be processed by the asset risk predictor 110 for storage in the data warehouse 484. The data stream 490 may involve may refer to a continuous flow of raw data from the data lake 488 to the data warehouse 484 in real-time based on suitable data streaming systems and methods. Using a data lake 488, data stream 490, and/or a data warehouse 484 may enable real-time (e.g., with negligible delay) analysis and processing of data stored in the data lake 488.

Data streaming between the data lake 488 and the data warehouse 484 may occur at least partially in parallel to, at block 492, stitch data replication operations between the database 482 and the data warehouse 484. The stitch data replication operations may refer to a synchronizing data from the database 482 (e.g., a source database) to the data warehouse 484. This replication mechanism may reduce a likelihood of at least some data stored in the data warehouse 484 being outdate, helping the data warehouse 484 to reflects the latest changes and updates made in the database 482. The asset risk predictor 110 may, at block 494, reference data from the data warehouse 484 to generate predictions, at block 496, which may enable operations of at least FIGS. 4-7 in addition to operations that will be described in FIGS. 17-23.

Indeed, as part of the managed data flow 470 of the work flow scheduler 454 system, data may be loaded from the data warehouse 484 (block 494) and transformed (block 498). The transformed data may be analyzed as part of a data imputation operation (block 500), in which missing or incomplete data values within a dataset of the transformed data are filled in or populated. Once the transformed data is cleaned (from raw sensor data), at block 502, the asset risk predictor 110 may train a device model. These training operations of block 502 may correspond to operations described herein, such as operations of FIG. 4 and/or FIGS. 19-20 (as will be described). Once trained, at block 504, the trained device model is output for deployment. The deployed trained device models may be stored in model repository 508. Once deployed, the asset risk predictor 110 may access the trained device model from the model repository 508 to perform prediction operations of block 496, such as operations described in FIG. 5 and/or FIG. 21.

The managed data flow 470 may output predictions and/or data to a model tracking/registry server 510, the service cluster 466, the model repository 508, a monitor service 516, or the like. The model tracking/registry server 510 may facilitate management, versioning, and/or organization of trained device models based on a machine learning (ML) backend 512 and/or a model artifact store 514. The ML backend 512 may correspond to infrastructure (e.g., systems and/or services) used to support execution and/or deployment of machine learning models, such as ML models to improve on accuracy of the trained device models over time. The ML backend 512 may include computational resources, APIs, and/or computing frameworks used to generate and/or deploy machine learning models, such as in production environments. The model artifact store 514 may correspond to a repository and/or storage system able to securely stores and manage artifact data related to ML models. Artifact data may include trained ML model files, configurations, metadata, and/or other associated files used to deploy a ML model and/or related computational inferences.

The asset risk predictor 110, via the monitor service 516, may receive one or more output data from the managed data flow 470. The monitor service 516 may collect and analyze the output data to monitor the output data, such as to monitor predictions, alert scores, alert levels, or the like generated by at least the prediction operations of block 496, such as operations described in FIG. 5 and/or FIG. 21.

The monitor service 516 may output indications of observations to an incident management service 518, which may be a service or system that handles and/or reports incidents or anomalies identified by the monitor service 516. The incident management service 518 may receive the output from the monitor service 516 and perform incident monitoring and response operations to aid in proper management of identified incidents or anomalies identified via the monitor service 516. Configurations and/or settings implemented via the incident management service 518 (e.g., shown in FIG. 15) may be customizable and change how one or more operator profiles and/or corresponding computing devices 74 are notified (e.g., at 520). For example, configurations of the incident management service 518 may change how work orders are generated, dashboard are updated, or the like discussed herein with reference to FIGS. 5-14 and as will be discussed in reference to FIGS. 21-23.

Figure 17:
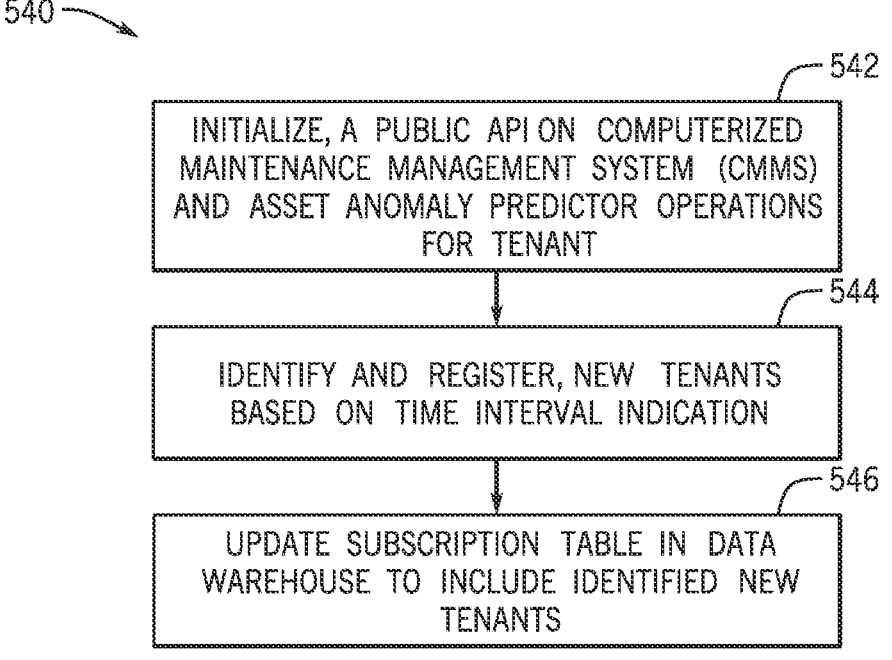
FIG. 17 is a flow diagram of a method for operating the second computing device of FIG. 2 to initialize subscriber tenants with asset risk predictor operations, in accordance with an embodiment.

FIG. 17 is a flow diagram of a method 540 for operating the second computing device 76 to initialize subscriber tenants with asset risk predictor 110 systems and methods. Although the following description of the method 540 is described as being performed by the second computing device 76 to implement asset risk predictor 110 operations, it should be understood that any suitable computing device that may intercept communications from the industrial automation control system 78 and/or the domain 98 may perform the operations described herein. In addition, although the method 540 is described in particular order, it should be understood that the method 540 may be performed in any suitable order. For ease of description, the method 540 is described as performed based on one or more communications between domain 98, domain 100, and/or an industrial automation system 46, it should be noted that these operations may similarly apply to communications between a domain outside domain 98 or domain 100 that are sent to and/or received from the domain 100.

At block 542, the computing device 76 may initialize a Public API on a computerized maintenance management system (CMMS) and asset risk predictor 110 operations for a tenant. The tenant may correspond to one or more computing devices associated with a shared infrastructure, such as IT side (e.g., computing devices 74 of domain 98) of an industrial automation system 46 (e.g., distributed control system 48). The tenant may correspond to an enterprise associated with the industrial automation system 46. Tenants may have respective sets of resources, data, configurations, and the like to ensure separation and privacy from other tenants also communicatively coupled to the computing device 76 and/or the domain 100. The public API gateway 438, after initialization, may receive data from devices of the domain 98 and/or the industrial automation system 46 from respective tenants.

At block 544, the computing device 76 may identify and register new tenants based on a time interval indication. The time interval indication may correspond to a midnight enrollment job executed by the computing device 76 to identify new subscribing tenants.

At block 546, the computing device 76 may update a subscription table in the data warehouse 484 to include the identified new tenants. The computing device 76 may use one or more portions of the data pipeline 452 systems described herein to update the subscription table stored in the data warehouse 484. The computing device 76 may reference the subscription table when performing various CMMS and/or asset risk predictor 110 operations to determine which tenants are to have what operations performed.

Figure 18:
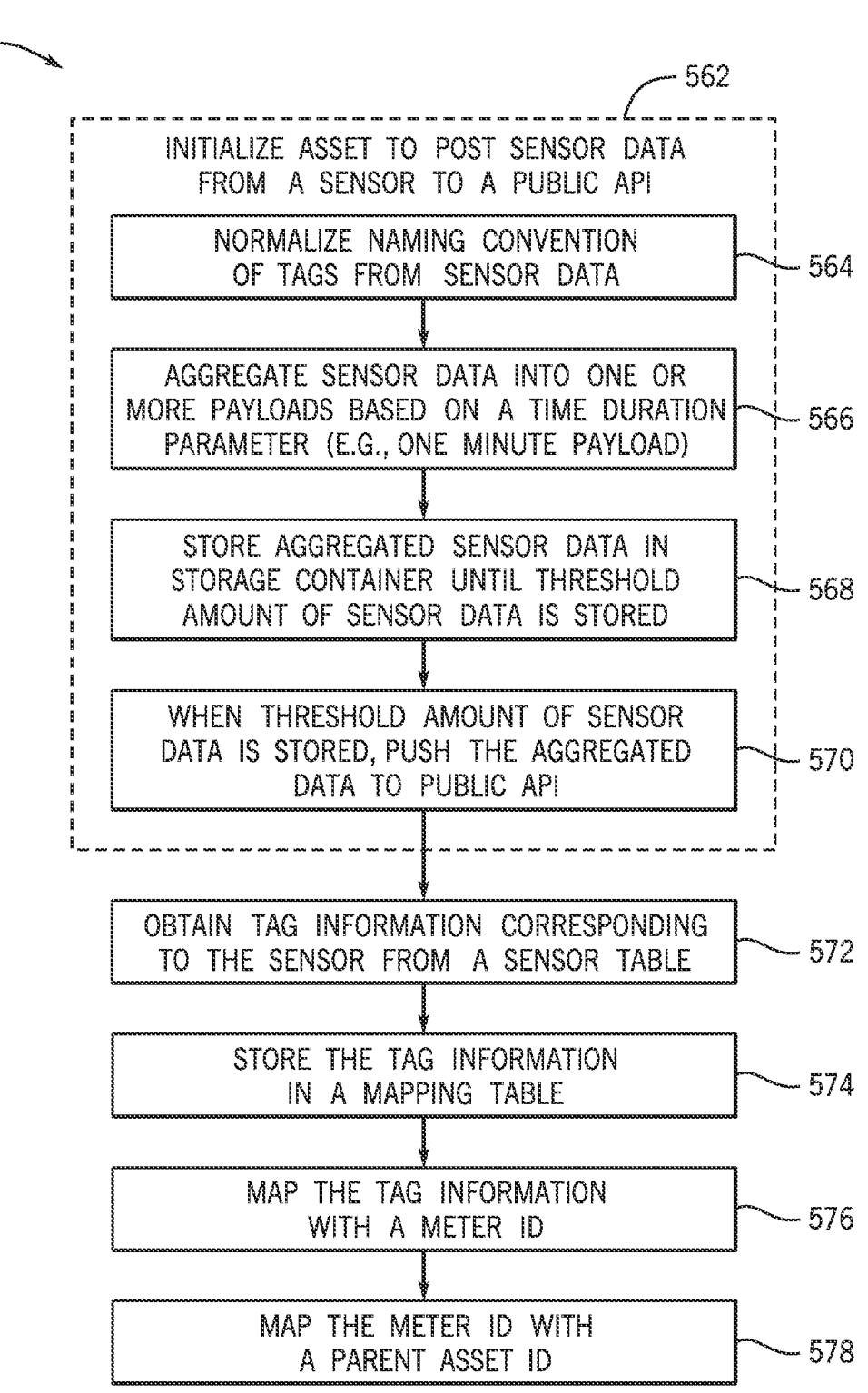
FIG. 18 is a flow diagram of a method for operating the second computing device of FIG. 2 to initialize data pipeline between a subscriber tenant and the asset risk predictor of FIG. 2, in accordance with an embodiment.

FIG. 18 is a flow diagram of a method 560 for operating the second computing device 76 to initialize the data pipeline 452 between a new tenant subscriber and the asset risk predictor 110. Although the following description of the method 560 is described as being performed by the second computing device 76 to implement asset risk predictor 110 operations, it should be understood that any suitable computing device that may intercept communications from the industrial automation control system 78 and/or the domain 98 may perform the operations described herein. In addition, although the method 560 is described in particular order, it should be understood that the method 560 may be performed in any suitable order. For ease of description, the method 560 is described as performed based on one or more communications between domain 98, domain 100, and/or an industrial automation system 46, it should be noted that these operations may similarly apply to communications between a domain outside domain 98 or domain 100 that are sent to and/or received from the domain 100.

At block 562, the second computing device 76 may initialize an industrial asset 114 (e.g., a sensor) to post data to a public API (e.g., public API gateway 438). For example, the second computing device 76 may initialize the industrial automation device 86 to post sensed data to the public API gateway 438. To do so, the second computing device 76 may transmit a configuration to cause the industrial asset 114, the industrial automation control system 78, and/or the edge gateway device 82, to perform operations of block 564, block 566, block 568, and/or block 570 when posting data to the public API gateway. Other suitable methods may be used and operations of block 564, block 566, block 568, and/or block 570 may be one suitable example.

At block 564, the second computing device 76 may generate the configuration to cause the industrial asset 114, the industrial automation control system 78, and/or the edge gateway device 82 to normalize naming convention of tags from data (e.g., sensor data). At block 566, the second computing device 76 may generate the configuration to cause the industrial asset 114, the industrial automation control system 78, and/or the edge gateway device 82 to aggregate data into one or more payloads based on a time duration parameter (e.g., one minute payloads, N minute payloads). At block 568, second computing device 76 may generate the configuration to cause the industrial asset 114, the industrial automation control system 78, and/or the edge gateway device 82 to store aggregated data in a storage container until threshold amount of data is stored. At block 570, second computing device 76 may generate the configuration to cause the industrial asset 114, the industrial automation control system 78, and/or the edge gateway device 82 to push the aggregated data to the public API (e.g., public API gateway 438) in response to determining that the threshold amount of data is stored. With the operations of block 564, block 566, block 568, and/or block 570, one example may be a sensor that generates sensor data that is collected and stored by the edge gateway device 82 over time. The edge gateway device 82 may receive a configuration from the second computing device 76 that causes the edge gateway device 82 to normalize a naming convention of the collected sensor data, aggregated the normalized sensor data into a payload based on 1-minute increments, store the sensor data payloads in a storage container until N number of payloads (e.g., 60 payloads) are stored in the storage container, then push the aggregated data of the storage container to the public API gateway 438. N may be any suitable number of payloads, such as 1 payload, 5 payloads, 10 payloads, 50 payloads, and so on.

At block 572, the second computing device 76 may obtain tag information corresponding to the industrial asset 114 from a data structure or storage location (e.g., tag information for a sensor from a sensor table stored in memory). At block 574, the second computing device 76 may store the tag information in a mapping table. At block 576, the second computing device 76 may map the tag information with a meter identifier (ID). At block 578, the second computing device 76 may map the meter ID with a parent asset ID. The parent asset ID may correspond to the industrial asset 114 initialized at block 562. Operations of blocks 574, 576, and 578 may enable the second computing device 76 to associate data from the public API gateway 438.

Figure 19:
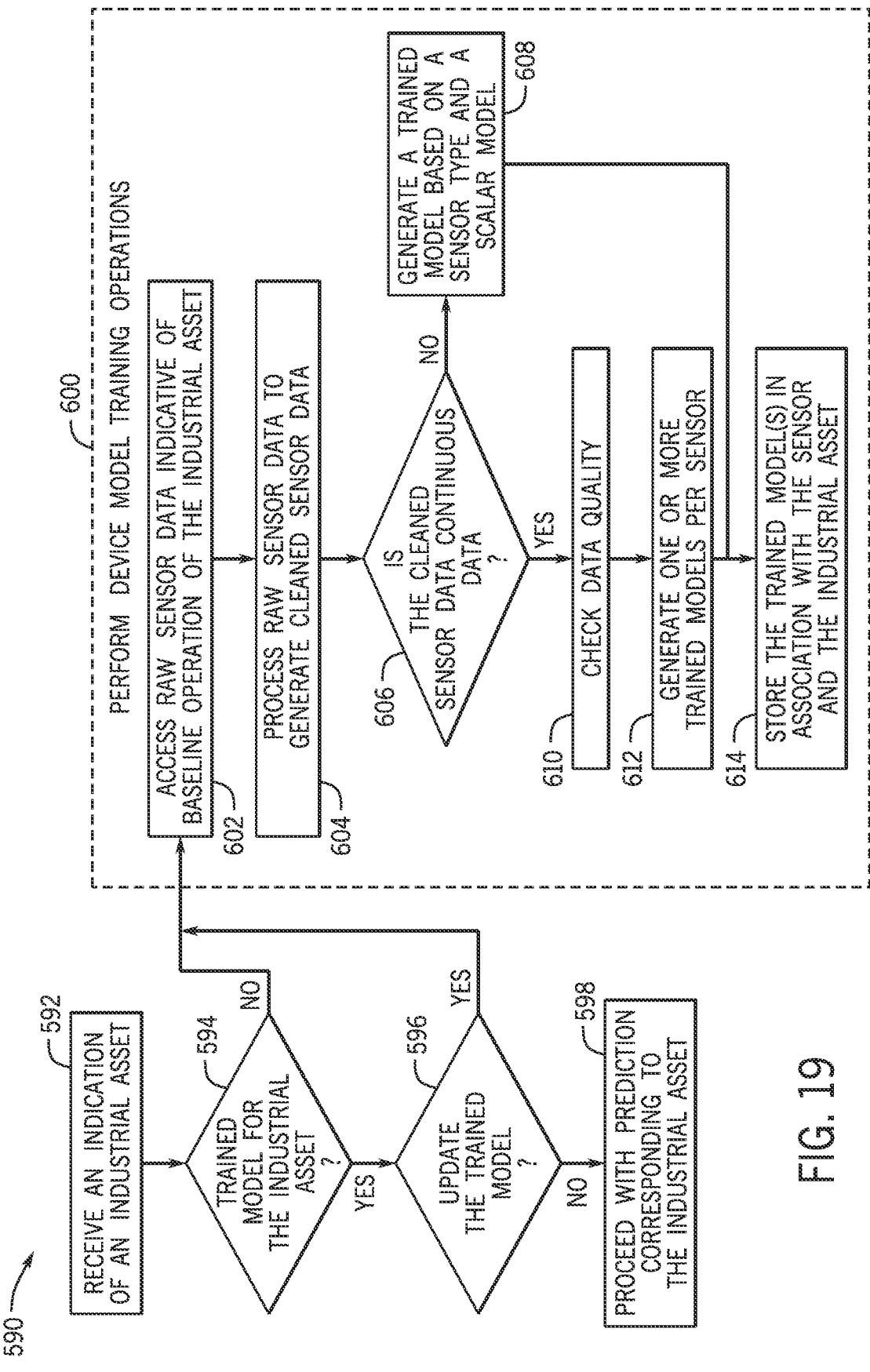
FIG. 19 is a flow diagram of a first method for operating the second computing device of FIG. 2 to generate a trained data model via the asset risk predictor of FIG. 2, in accordance with an embodiment.
Figure 21:
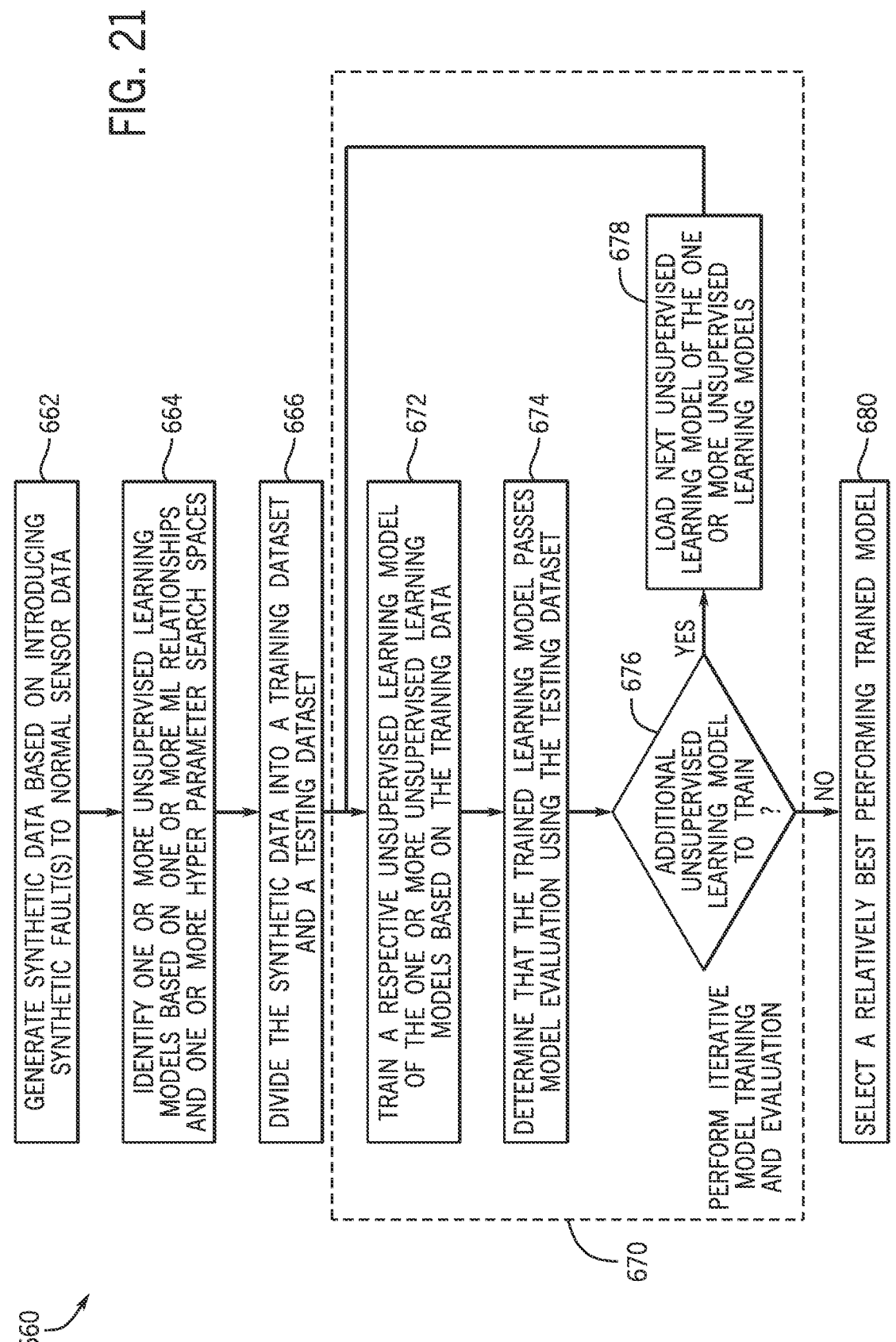
FIG. 21 is a flow diagram of a third method for operating the second computing device of FIG. 2 to generate a trained device model via the asset risk predictor of FIG. 2, in accordance with an embodiment.

Once data sources associated with the industrial asset 114 are mapped to the public API based on operations of FIG. 18, the second computing device 76 may perform asset risk predictor 110 operations on data received is association with the industrial asset 114. FIGS. 19-21 illustrate example operations to train data models referenced by prediction operations of the asset risk predictor 110. Other suitable systems and/or methods may be used herein alternatively or additionally to one or more operations of FIGS. 19-21.

To elaborate, FIG. 19 is a flow diagram of a first method 590 for operating the second computing device 76 to generate a trained data model via the asset risk predictor 110. Although the following description of the method 590 is described as being performed by the second computing device 76 to implement asset risk predictor 110 operations, it should be understood that any suitable computing device may perform the operations described herein. In addition, although the method 590 described in particular order, it should be understood that the method 590 may be performed in any suitable order. For ease of description, the method 590 is described as performed based on one or more communications between domain 98, domain 100, and/or an industrial automation system 46, it should be noted that these operations may similarly apply to communications between a domain outside domain 98 or domain 100 that are sent to and/or received from the domain 100.

At block 592, the second computing device 76 may receive an indication of an industrial asset 114. The indication of the industrial asset 114 may be received via a dashboard. The indication of the industrial asset 114 may trigger the second computing device 76 to attempt a prediction via the asset risk predictor 110.

To do so, the second computing device 76, at block 594, may determine whether there is a trained device model corresponding to the industrial asset 114. Trained device models may be stored in the model repository 508 and/or database 106.

When there is a trained device model corresponding to the industrial asset 114, at block 596, the second computing device 76 may determine whether to update the trained device model. The second computing device 76 access a timestamp corresponding to when the trained device model was last trained to determine whether to update the trained device model. For example, the second computing device 76 may determine to re-train the trained device model in response to the timestamp indicating that a month has passed since the model was trained. In some cases, the second computing device 76 determines whether a performance drift has been detected for the industrial asset 114. The performance drift may be identified by asset risk predictor 110 operations and may correspond to one or more false positives, one or more normal operations being flagged as anomalous or otherwise undesirable, or the like. The performance draft may be identified by the asset risk predictor 110 in response to a median alert score of normal operations changing by a threshold score over time, triggering the retraining to compensate for the performance drift. Indeed, the second computing device 76 may compensate for the performance drift by retraining the trained device model to the new normal of that industrial asset 114. Industrial automation system 46 operations may improve since the asset risk predictor 110, via the second computing device 76, detecting the performance drift in alert scores may result in early detection of changes in operation that may have otherwise gone undetected due to the change in normal operation not being anomalous enough to be detected via normal alarming or alerting operations.

When the second computing device 76 determines that the trained device model corresponding to the industrial asset 114 is not to be updated at this time, the second computing device 76 may proceed with performing device model training operations of block 600. The prediction may be performed based on the trained device model as uses one or more prediction operations described herein at, for example, FIG. 5 and/or FIG. 21.

However, when at block 594 or block 596, the second computing device 76 determines that the trained device model corresponding to the industrial asset 114 is to be updated or created, the second computing device 76 may proceed with performing device model training operations of block 600. The device model training operations of block 600 may include the second computing device 76, at block 602, accessing raw sensor data indicative of baseline operation of the industrial asset 114 (e.g., corresponding to load data operations of block 494 of FIG. 16). The raw sensor data may have been acquired by a sensor (e.g., industrial automation device 86), where the sensor has a sensor type. The sensor type and an indication of the sensor may be stored in memory in association with the raw sensor data based on operations of FIG. 18. The device model training operations of block 600 may include the second computing device 76, at block 604, processing raw sensor data to generate cleaned sensor data (e.g., corresponding to data transformation operations of block 498 of FIG. 16). To clean the raw sensor data, the second computing device 76 may filter constant values, filter null values, and associate sensor or dataset features like hour of day of acquisition, day of week of acquisition, or the like, with the sensor data. The resulting cleaned sensor data may include a reduced amount of data relative to the raw sensor data that is indicative of changes in the sensor data and of timestamps of acquisition.

After generating the cleaned sensor data, the second computing device 76 may, at block 606, proceed with determining whether the cleaned sensor data is continuous data. Continuous data may refer to data that may have any value within a range of values (e.g., range of values within a continuous scale). Examples of continuous data include time, temperature, some electrical values, and the like. Categorical data may represent distinct categories or types of data that may not be continuous in nature, such as alarm events or an operational status reported from a device (e.g., "on," "off," "fault," "alarm").

When the cleaned sensor data is not continuous data, the second computing device 76 may, at block 608, generate a trained device model based on a sensor type and a scalar model (e.g., corresponding to train data operations of block 502 of FIG. 16). The cleaned sensor data is presumed categorical if it is not deemed to be continuous. The scalar model may correspond to a minmax scalar model that is generated per sensor used to generate the raw sensor data. The minmax scalar model may scale and transform the cleaned sensor data to fit the various values within a specific range (e.g., between 0 and 1) by subtracting the minimum value and dividing by the range. Other suitable models may be used.

However, when the cleaned sensor data is continuous data, the second computing device 76 may, at block 610, check data quality, which may include imputing data if anomaly percentage increases (e.g., corresponding to data imputation operations of block 500 of FIG. 16). At block 610, the second computing device 76 may generate one or more trained device models per sensor (e.g., corresponding to train data operations of block 502 of FIG. 16). The one or more trained device models may include or be based on methods that include implementing a One-Class Support Vector Machine (OCSVM), a standard scaler, a minmax scaler for isolation forest, a minmax scaler for OCSVM, a minmax scaler for robust covariance, an isolation forest, a robust covariance, or other suitable computing method by which to process the cleaned sensor data. An OCSVM training model may enable the second computing device 76 to learn a boundary to separate normal data in the cleaned sensor data from outliers in an unsupervised manner. A standard scaler training model may enable the second computing device 76 to standardize features of the cleaned sensor data by subtracting the mean and dividing by the standard deviation, ensuring that the transformed data has zero mean and unit variance. A minmax scaler for isolation forest training model may enable the second computing device 76 to scale the cleaned sensor data within a specified range (usually between 0 and 1), which may be used in outlier detection by constructing random decision trees. A minmax scaler for OCSVM training model may be similar to the minmax scaler for isolation forest training model and based on a one-class classification model for anomaly detection during training in the cleaned sensor data. A minmax scaler for robust covariance training model may enable the second computing device 76 to scale the cleaned sensor data to a specified range used by robust covariance algorithm in multivariate outlier detection based on estimating a covariance matrix. An isolation forest training model may enable the second computing device 76 to isolate anomalies based on random forests methods that use binary trees and measure average depth of a respective data point, in which anomalies in the dataset correspond to relatively shorter average depths. A robust covariance training model may enable the second computing device 76 to estimate a covariance matrix in the presence of outliers, which may provide robustness against data points that deviate a threshold value from a majority value, median value, average value, or the like.

After generating the trained device model, at block 612, the second computing device 76 may store the trained device model(s) in association with the sensor and the industrial asset. The second computing device 76 may store the trained device models in the model repository 508 of FIG. 16. Storing the trained device models may correspond to deployment model operations at block 504 of FIG. 16 to be used in the prediction operations at block 496 of FIG. 16.

FIG. 20 is a flow diagram of a second method 630 for operating the second computing device 76 to generate a trained data model via the asset risk predictor 110. Although the following description of the method 630 is described as being performed by the second computing device 76 to implement asset risk predictor 110 operations, it should be understood that any suitable computing device may perform the operations described herein. In addition, although the method 630 described in particular order, it should be understood that the method 630 may be performed in any suitable order. For ease of description, the method 630 is described as performed based on one or more communications between domain 98, domain 100, and/or an industrial automation system 46, it should be noted that these operations may similarly apply to communications between a domain outside domain 98 or domain 100 that are sent to and/or received from the domain 100.

At block 632, the second computing device 76 may receive an instruction to identify sensors for training (e.g., training to occur today or at the current time). This may be part of a to-be-trained discovery operation where the second computing device 76, queries indications of sensors to identify one or more sensors that are to be trained for the first time or are to be retrained based on various parameters. Indeed, at block 634, the second computing device 76 may identify sensors to be trained. The second computing device 76 may do so based on operations of block 636, block 638, and block 640. Indeed, these blocks 636-640 illustrate example queries the asset risk predictor 110 may execute to identify the sensors to be trained to generate a trained device model.

At block 636, the second computing device 76 may determine that a respective sensor does not correspond to a trained device model and is associated with at least a threshold amount of data stored sensed during a threshold amount of time and identify that sensor for training. For example, the second computing device 76 may determine a subset of sensors to be trained that have no corresponding trained device model stored and include at least five days of sensed data from the past seven days.

At block 638, the second computing device 76 may determine that a respective sensor does correspond to a trained device model that has not been retrained within a threshold amount of time and is associated with at least a threshold amount of data stored sensed during a threshold amount of time and identify that sensor for training. For example, the second computing device 76 may determine a subset of sensors to be trained that each correspond to respective trained device models generated more than 30 days prior and include 20 days of sensed data from the past 30 days.

At block 640, the second computing device 76 may determine that a respective sensor does correspond to a trained device model that has been retrained at least once and has not been retrained within a threshold amount of time while also being associated with at least a threshold amount of data stored sensed during a threshold amount of time and identify that sensor for training. For example, the second computing device 76 may determine a subset of sensors to be trained that each correspond to respective trained device models retained once at least six months earlier and include 20 days of sensed data from the past 30 days.

Based on the sensors identified for training at block 634, the second computing device 76 may, at block 642, perform device model training operations, such as those operations of block 600 of FIG. 19. Similarly, storing the trained device models may correspond to deployment model operations at block 504 of FIG. 16 to be used in the prediction operations at block 496 of FIG. 16.

FIG. 21 is a flow diagram of a third method 660 for operating the second computing device 76 to generate a trained data model via the asset risk predictor 110. Although the following description of the method 660 is described as being performed by the second computing device 76 to implement asset risk predictor 110 operations, it should be understood that any suitable computing device may perform the operations described herein. In addition, although the method 660 described in particular order, it should be understood that the method 660 may be performed in any suitable order. For ease of description, the method 660 is described as performed based on one or more communications between domain 98, domain 100, and/or an industrial automation system 46, it should be noted that these operations may similarly apply to communications between a domain outside domain 98 or domain 100 that are sent to and/or received from the domain 100.

At block 662, the second computing device 76 may generate synthetic data based on introducing one or more synthetic fault(s) to normal sensor data. To do so, the second computing device 76 may adjust values of the normal sensor data relative to threshold values to simulate fault data. At block 664, the second computing device 76 may identify one or more unsupervised learning models based on one or more ML relationships and one or more hyperparameter search spaces. The learning models may include one or more of the models described at block 612 of FIG. 19. Hyperparameter search spaces may correspond to additional settings, configurations, or parameters referenced when training or operating the learning models.

At block 668, the second computing device 76 may divide the synthetic data into a training dataset and a testing dataset. At block 670, the second computing device 76 may perform iterative model training and evaluation at least in part by performing operations of block 672, block 674, block 676, and block 678. It is noted that other methods may be used in additional to or alterative of these operations.

At block 672, the second computing device 76 may train a respective unsupervised learning model of the one or more unsupervised learning models based on the training data. At block 674, the second computing device 76 may determine that the trained learning model passes model evaluation using the testing dataset.

At block 676, the second computing device 76 may determine whether there is an additional unsupervised learning model to train from the one or more unsupervised learning models. When there is, the second computing device 76 may proceed to block 678 to load a next unsupervised learning model of the one or more unsupervised learning models and perform the next round of training at block 672. However, when the second computing device 76 determines that all of the one or more unsupervised learning models were trained, the second computing device 76 may proceed to block 680 to select a relatively best performing trained device model of the one or more trained device models. The selected trained device model may be associated with the sensor in the model repository 508 and/or memory. The best performing trained device model may be selected based on a variety of criteria, which may include an indication of accuracy when comparing actual classifications to expected classifications.

Figure 22:
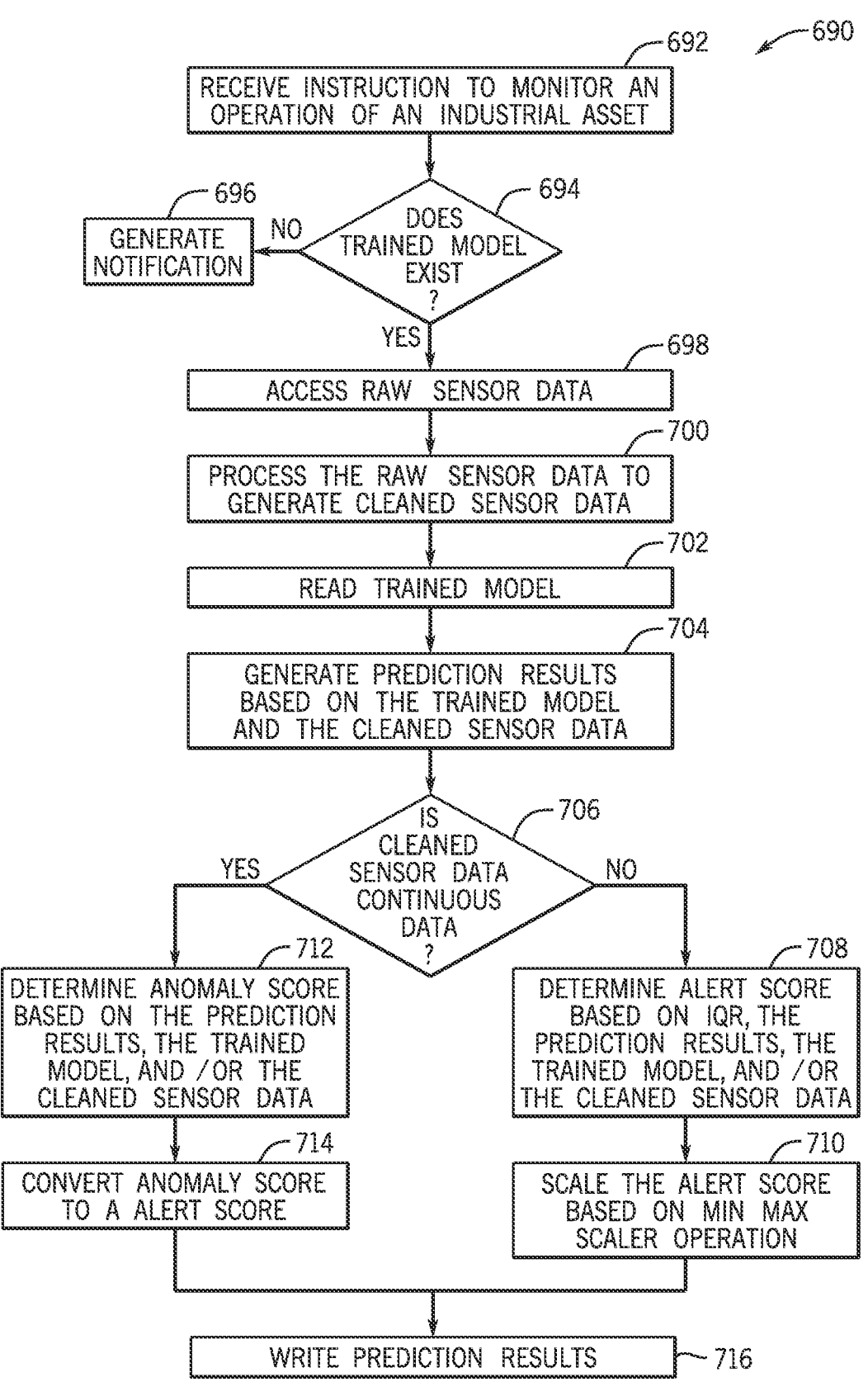
FIG. 22 is a flow diagram of a method for operating the second computing device of FIG. 2 to generate prediction results based on the trained device model of FIGS. 19 and/or 20 via the asset risk predictor of FIG. 2, in accordance with an embodiment.

FIG. 22 is a flow diagram of a method 690 for operating the second computing device 76 to generate prediction results based on the trained device model of FIGS. 19-21 via the asset risk predictor 110. Although the following description of the method 690 is described as being performed by the second computing device 76 to implement asset risk predictor 110 operations, it should be understood that any suitable computing device may perform the operations described herein. In addition, although the method 690 described in particular order, it should be understood that the method 690 may be performed in any suitable order. For ease of description, the method 690 is described as performed based on one or more communications between domain 98, domain 100, and/or an industrial automation system 46, it should be noted that these operations may similarly apply to communications between a domain outside domain 98 or domain 100 that are sent to and/or received from the domain 100.

At block 692, the second computing device 76 may receive an instruction to monitor an operation of an industrial asset 114. At block 694, the second computing device 76 may determine whether a trained device model exists for that industrial asset 114. For example, whether a corresponding trained device model is stored in association with an indication of the industrial asset 114 in the model repository 508 of FIG. 16.

When the trained device model does not exist in memory, the second computing device 76 may proceed to, at block 696, generate a notification. The notification may include an indication that the trained device model does not exist and prompt the first computing device 74 to instruct training to occur for that industrial asset 114.

When the trained device model does exist in memory, the second computing device 76 may proceed to, at block 698, access raw sensor data and, at block 700, process the raw sensor data to generate cleaned sensor data. Raw sensor data may correspond to data received from a data source in association with that industrial asset 114 identified at block 692 and thus may be from sensors or other suitable data sources as described herein. Cleaning the raw sensor data may involve filtering one or more values from the dataset, like null values, and including one or more features with the dataset, like time indications and/or other related industrial asset information. Once the data is ready for processing, the second computing device 76 may, at block 702, read a trained device model corresponding to the industrial asset

114 identified at block 692. The trained device model may be read from memory, such as the model repository 508. At block 704, the second computing device 76 may generate prediction results based on the trained device model and the cleaned sensor data. The prediction results may be used to generate alert scores and alert levels, as described herein.

To do so, the second computing device 76 may, at block 706, determine whether the cleaned sensor data is continuous data, similar to operations of block 606 of FIG. 19. When the cleaned sensor data is continuous data (as opposed to categorial data), the second computing device 76 may, at block 712, determine an anomaly score based on the prediction results, the trained device model, and/or the cleaned sensor data. The anomaly score may be scaled by the second computing device 76, at block 714, to generate an alert score having a value scaled between a minimum and a maximum of a range (e.g., between 0 and 1000, 0 and 100, any suitable range of values). When the raw sensor data corresponds to multiple data sources, respective alert scores may be generated per data source. When the cleaned sensor data is not continuous data (and thus is categorial data), the second computing device 76 may, at block 712, determine an alert score that is unscaled based on inner quartile range (IQR) processing, the prediction results, the trained device model, and/or the cleaned sensor data. IQR processing may be used by the second computing device 76 to determine and process data outliers in the cleaned sensor data. By determining a range between 25th and 75th percentiles (or other suitable percentiles), the IQR processing may detect data values which are relatively deviant from a central tendency of the cleaned sensor data. The alert score may be scaled by the second computing device 76, at block 714, to generate an alert score that is scaled to a value between the minimum and maximum of the range (e.g., between 0 and 1000, 0 and 100, any suitable range of values) also used at block 714. When the raw sensor data corresponds to multiple data sources, respective alert scores may be generated per data source. The scaling performed by the second computing device at block 710 may be based on the minmax scalar operation described in reference to FIG. 19.

It is noted that training operations of FIGS. 19-21 and/or prediction operations of FIG. 22 may be used additionally or alternatively to training operations described herein, such as in FIGS. 4-7. Furthermore, FIG. 23 elaborates on work order generation operations described herein, such as in FIG. 5.

Figure 23:
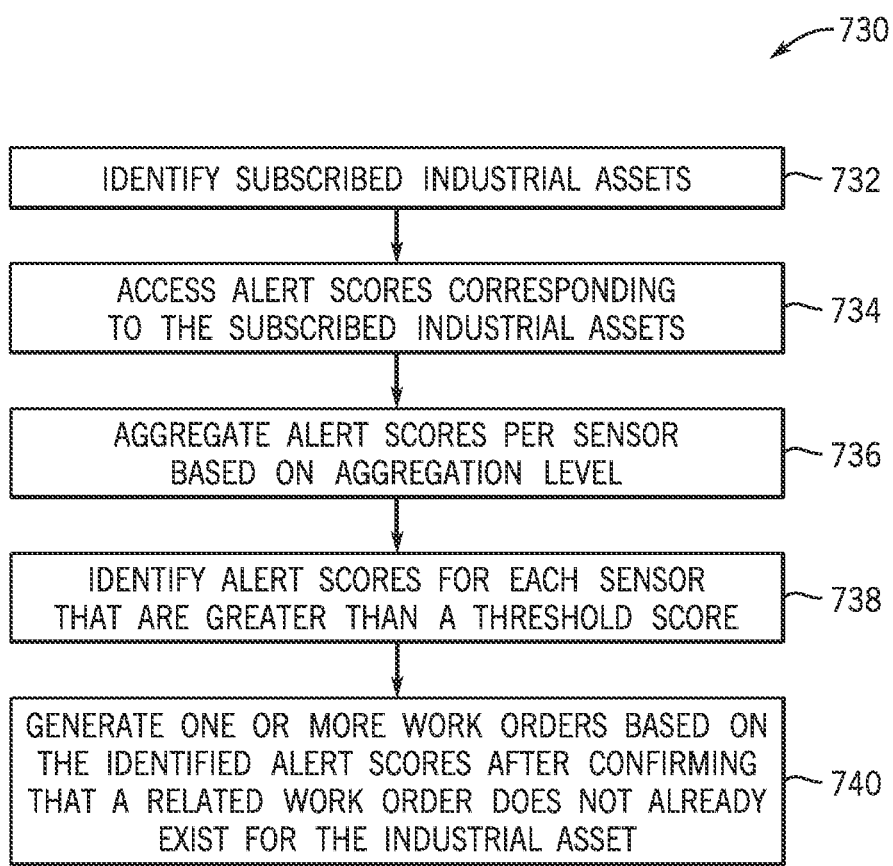
FIG. 23 is a flow diagram of a method for operating the second computing device of FIG. 2 to generate a work order based on the prediction results of FIG. 22 via the asset risk predictor of FIG. 2, in accordance with an embodiment.

FIG. 23 is a flow diagram of a method 730 for operating the second computing device 76 to generate a work order based on the prediction results of FIG. 21 via the asset risk predictor 110. Although the following description of the method 730 is described as being performed by the second computing device 76 to implement asset risk predictor 110 operations, it should be understood that any suitable computing device may perform the operations described herein. In addition, although the method 730 described in particular order, it should be understood that the method 730 may be performed in any suitable order. For ease of description, the method 730 is described as performed based on one or more communications between domain 98, domain 100, and/or an industrial automation system 46, it should be noted that these operations may similarly apply to communications between a domain outside domain 98 or domain 100 that are sent to and/or received from the domain 100.

At block 732, the second computing device 76 may identify subscribed industrial assets 114. The second computing device 76 may generate work orders based on alert scores of the subscribed industrial assets 114 at a defined time period and/or interval, such as daily. Indeed, some industrial assets 114 may not be indicated as to have work orders generated based on prediction results for that industrial asset 114. Thus, the second computing device 76 may query a table or memory to determine one or more industrial assets 114 indicated by a tenant or first computing device 74 as subscribed for work order generation.

At block 734, the second computing device 76 may access alert scores corresponding to the subscribed industrial assets 114. At block 736, the second computing device 76 may aggregate alert scores per data source (e.g., sensor) per industrial asset 114 based on aggregation level. Indeed, the second computing device 76 may aggregate alert scores at any suitable time increment (e.g., each N minutes, each Y hours, each 1 minute, each 1 hour) at least in part by fetching relatively highest alert scores for a respective subscribed industrial asset 114 across its various data sources. For example, for a motor (e.g., industrial asset 114), the second computing device 76 may aggregate alert scores of that motor over minute intervals, determining for each minute group of alert scores the relatively highest alert score of the minute group of alert scores, and aggregating the relatively highest alert scores for the motor over the dataset as a whole. This may reduce the dataset of alert scores to include just the relatively highest alert scores for threshold analysis and potential work order generation.

At block 738, the second computing device 76 may identify alert scores for each data source (e.g., sensor) that are greater than a threshold score (e.g., cross a threshold score). Continuing with the motor example of block 736, the second computing device 76 may compare the reduced dataset of relatively highest alert scores to one or more thresholds, respectively, to determine if any of the relatively highest alert scores meet at least one condition. Any suitable threshold or limit may be used, such as one that has the second computing device 76 identifying whether the alert scores are less than a threshold score. Any suitable condition may be used, such as a frequency of alert (e.g., at least two alert scores over a 5 minute time period, N alert scores over a Y time period), a type of alert (e.g., a high pressure related alert score, a temperature related alert score), or the like.

At block 740, the second computing device 76 may generate one or more work orders based on the alert scores identified at block 736 after confirming that a related work order does not already exist for the industrial asset 114. In this way, work order generation may be based on one or more indications of existing work orders. Other threshold numbers of work orders than 1 may be used when confirming whether another related work order does not already exist, such as a two existing work order threshold, a three existing work order threshold, or the like. An example work order generated by the second computing device 76 based on asset risk predictor 110 operations may be illustrated in FIG. 14 and may be used to change the indication 296 of FIGS. 10-11 and/or the indications 346 of FIG. 12. Generated work orders may be presented with work orders generated by the first computing device 74 and/or the industrial automation system 46 in the GUI of FIG. 8. Generated work orders and/or the analysis of block 738 may be at least partially implemented via monitor service 516 and/or the incident management service 518 associated with the work flow scheduler 454 of the asset risk predictor 110.

Figure 24:
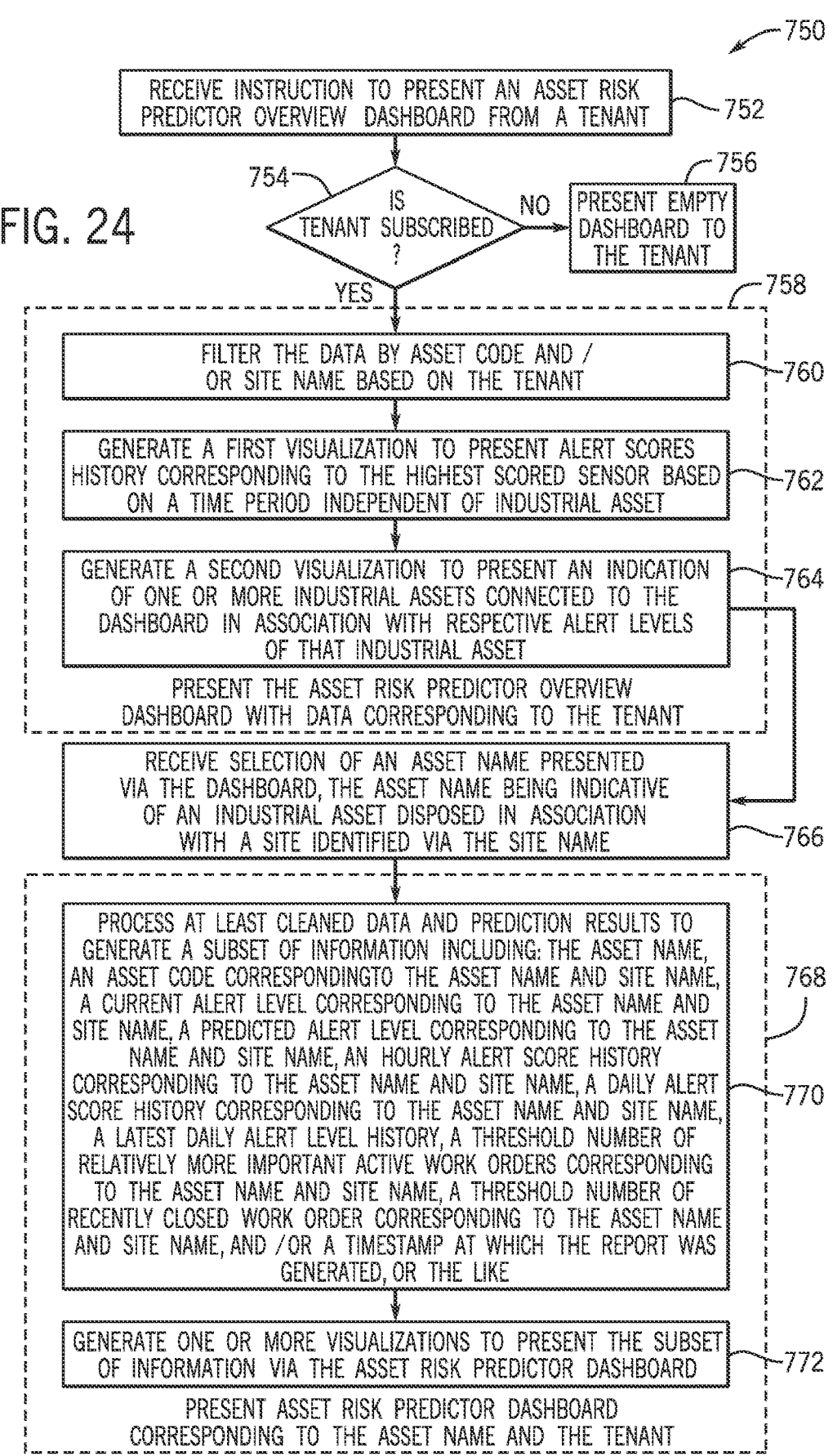
FIG. 24 is a flow diagram of a method for operating the second computing device of FIG. 2 to generate one or more dashboards based on the prediction results of FIG. 22 and/or the work order of FIG. 23 via the asset risk predictor of FIG. 2, in accordance with an embodiment.

Indeed, as noted above, dashboards and/or GUIs may be updated based on the generated work orders of FIGS. 5 and/or 23. One or more of the dashboards and/or GUIs described herein (e.g., in at least FIGS. 5 and 8-15) may also be updated based on the prediction results. FIG. 24 elaborates further on these dashboards and/or GUIs update operations. It is noted that a GUI may implement a change or update to a dashboard without being updated or changed itself, such as may be the case in web-based or internet-enabled dashboard interfaces.

To elaborate, FIG. 24 is a flow diagram of a method 750 for operating the second computing device 76 to generate one or more dashboards based on the prediction results of FIG. 21 and/or the work order of FIG. 22 via the asset risk predictor 110. Although the following description of the method 750 is described as being performed by the second computing device 76 to implement asset risk predictor 110 operations, it should be understood that any suitable computing device may perform the operations described herein. In addition, although the method 750 described in particular order, it should be understood that the method 750 may be performed in any suitable order. For ease of description, the method 750 is described as performed based on one or more communications between domain 98, domain 100, and/or an industrial automation system 46, it should be noted that these operations may similarly apply to communications between a domain outside domain 98 or domain 100 that are sent to and/or received from the domain 100.

At block 752, the second computing device 76 may receive an instruction to present an asset risk predictor over dashboard from a tenant. The instruction may be generated based on an input to the first computing device 74, such as a selection of an indication presented via a GUI.

At block 754, the second computing device 76 may determine whether the tenant is subscribed to the asset risk predictor 110 operations. When the second computing device 76 determines that the tenant is not subscribed, the second computing device 76 may proceed to block 756 and present an empty dashboard to the tenant. Thus, the second computing device 76 may present a graphical user interface corresponding to an over CMMS visualization (e.g., sidebar illustrated in FIG. 10) and an embedded or overlaid dashboard which may include indications of the asset risk predictor 110 operations would be presented as null data or empty visualizations (e.g., without plot 300 or "asset alert overview" of FIG. 10).

When the second computing device 76 determines that the tenant is subscribed, the second computing device 76 may proceed, at block 758, to present the asset risk predictor overview dashboard with data corresponding to the tenant. These presentation operations may include operations of block 760, block 762, and block 674. Indeed, to do so, the second computing device 76 may, at block 760, filter data by asset code and/or site name based on the tenant, such as what device the tenant is accessing the asset risk predictor overview dashboard from, or the like. Additional filtering may occur based on profile of the device, or the like, described above. Filtering may be desired as filtering may specialize a presentation of data to the device accessing the asset risk predictor overview dashboard. This specialization may reduce a likelihood of the tenant accessing data of a different tenant, increasing privacy associated with data, while also reduces a number of computing resources may be used by the device of the tenant access the data. At block 762, the second computing device 76 may generate a first visualization to present an alert scores history corresponding to a relatively highest scored sensor based on a time period independent of industrial asset 114. At block 764, the second computing device 76 may generate a second visualization to present an indication of one or more industrial assets connected to the dashboard in association with respective alert levels of that industrial asset 114. Other data may be presented via the anomaly predictor overview dashboard, such as that illustrated via FIGS. 10-11. At block 766, the second computing device 76 may receive a selection of a visualization of an asset name presented via the anomaly predictor overview dashboard. The asset name may indicate an industrial asset 114 disposed in or is otherwise associated with a site identified via the site name of block 760, such as a motor physically disposed in an industrial automation system 46 having the site name.

In response to the selection, the second computing device 76, at block 768, may present an asset risk predictor dashboard corresponding to the asset name and the tenant. The asset risk predictor dashboard may be similar to that illustrated in FIG. 12, where the asset selected may be identified by indication 284. To present the asset risk predictor dashboard, the second computing device 76 may, at block 770, process at least cleaned data and prediction results to generate a subset of information to be presented. The subset of information may include an asset name, an asset code corresponding to the asset name and site name, a current alert level corresponding to the asset name and site name, a predicted alert level corresponding to the asset name and site name, an hourly alert score history corresponding to the asset name and site name, a daily alert score history corresponding to the asset name and site name, a latest daily alert level history, a threshold number of relatively more important active work orders corresponding to the asset name and site name, a threshold number of recently closed work order corresponding to the asset name and site name, and/or a timestamp at which the report was generated, or the like. At block 772, the second computing device 76 may generate one or more visualizations to present the subset of information via the asset risk predictor dashboard. It is noted that other suitable filtering or presentation methods may be used with or instead of these methods above.

With the foregoing in mind, the asset risk predictor 110 may follow rules accessible in memory when flagging the detected operation as "normal" or "anomalous." Rules may be generated based on the asset risk predictor 110 determining, during training, that certain combinations of sensor readings indicate normal device operation, as may occur when a motor changes a load processed, during start up or shut down, or other periods of operational change. Furthermore, the asset risk predictor 110 may access rules generated based on validation of the device model. For example, the asset risk predictor 110 may receive an indication that a combination of sensor readings indicates normal device operation. An example rule may specify that the asset risk predictor 110 is to classify a detected operation as "anomalous" in response to two or more sensors reporting anomalous sensor data for a threshold duration of time, for a threshold number of instances, or both. Another example rule may specify that the asset risk predictor 110 is to classify a specific sensor reading as "anomalous" when different from the corresponding sensor model in the trained data model by a threshold amount. When doing so, the asset risk predictor 110 may report the "anomalous" operation of one sensor while reporting other sensors and/or the overall device status as "normal." This situation may arise from a combination of rules or thresholds set enabling it as so and/or a rule defining that the combination of sensor readings for the device is normal overall.

Overtime, performance of a device model of a specific industrial asset 114 may shift, such as due to device model degradation. The asset risk predictor 110 may detect the shift and retrain the trained device model to compensate for the shift in baseline operation represented in the device model.

It is noted that some of the indications presented via the various dashboards of FIGS. 8-13 may change in visualization based on the indication. For example, an alert score less than a threshold score (e.g., a "low" alert score) may correspond to a first visualization and an alert score that exceeds a threshold score (e.g., a "high" alert score) may correspond to a second visualization. First visualization and second visualization may refer to a color, a flashing, a pattern, a dynamic change in icon, or the like associated with how the various bars, levels, plots, indications, and so on, are presented via a graphical user interface. Dynamic visualizations may correspond to bars 384, overlaid visualizations 306, 388, 390, most recent alert level indication 292, predicted alert level 344, alert level indication 360, bars 356, bars 352, bars 302, alert score indication 294, or the like.

The present disclosure is generally related to industrial automation systems that implement device models to improve control and monitoring operations. An asset risk predictor is described herein that has read access to data of an industrial automation system. The asset risk predictor may train device models on industrial asset operation while the industrial asset is operating in the industrial automation system, and thus is trained in situ in the ongoing process. Training the device model on an industrial asset in situ in the ongoing process may improve device model training operations by training without interruption to the ongoing process and/or production. Once the device model is trained, the asset risk predictor may compare sensed data to the operational baseline indicated by the device model to determine whether the sensed data corresponds to a normal operation of an industrial asset or not. A variety of suitable calculation operations may generate an alert score from data resulting from a difference between the sensed data to the operational baseline, including averaging the difference, finding a minimum or a maximum of the difference, comparing the difference in values to other indications of anomalous operations or fault events to perform root-cause analysis of the difference, or the like. A combination of the calculation operations may be averaged to determine a final alert score for a sensor that acquired the sensed data. Using multiple calculation operations to determine the final alert score may improve an accuracy of the score. Other factors may be considered to evaluate patterns of differences to improve classification of the alert score for determining an alert level for the associated industrial asset. Alert levels and alert scores, along with other information, may be maintained and presented in various dashboards by the asset risk predictor. Using dashboards to communicate operational statuses and predictions made using the asset risk predictor may improve operations of the industrial automation system by enabling computing devices to use fewer interactions and computing operations, therefore fewer computing resources, to obtain a monitoring and control information relative to using individual queries and individual interactions to obtain the same monitoring and control information.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 178(f). However, for any claims containing elements designated in any other manner, it is intended that such elements are not to be interpreted under 35 U.S.C. 178(f).

What is claimed is:

1. A tangible, non-transitory, computer-readable medium storing instructions that, when executed by processing circuitry of a computing device, cause the computing device to perform operations comprising:

receiving an indication of an industrial device and a sensor, wherein the sensor is associated with the industrial device;

receiving aggregated data from a storage container, wherein the sensor is configured to acquire data during a normal operation of the industrial device, and wherein the storage container is configured to aggregate the data from the sensor over a threshold amount of time before pushing the aggregated data to the computing device;

adjusting an indication of a baseline operation based on the data, wherein the data indicates the normal operation of the industrial device;

determining that the indication of the baseline operation has been adjusted based on a threshold amount of data acquired by the sensor;

storing the indication of the baseline operation, as a trained device model, in association with the sensor and the industrial device in memory based on determining that the indication of the baseline operation has been adjusted based on the threshold amount of sensor data;

receiving additional aggregated data from the storage container; and determining an alert score based on comparing the additional aggregated data to the baseline operation indicated by the trained device model, wherein the alert score indicates a forecasted probability of an alarm event occurring at the industrial device.

2. The tangible, non-transitory, computer-readable medium of claim 1, wherein the operations comprise generating the indication of the baseline operation based on an indication of contextual information corresponding to a relationship between the industrial device and the sensor, wherein the contextual information comprises an indication of a type of programmable logic controller, a variable name for where the data acquired by the sensor is accessible, and one or more tags corresponding to the data.

3. The tangible, non-transitory, computer-readable medium of claim 1 storing instructions that cause the computing device to perform operations comprising:

receiving an indication of an additional sensor;

generating an additional indication of the baseline operation; and associating the additional sensor and the sensor as child devices of the industrial device, wherein the indication of the baseline operation and the additional indication of the baseline operation respectively correspond to the normal operation of the industrial device.

4. The tangible, non-transitory, computer-readable medium of claim 3 storing instructions that cause the computing device to perform operations comprising:

receiving additional data from the additional sensor, wherein the additional sensor is configured to acquire the additional data during the normal operation of the industrial device; and adjusting the additional indication of the baseline operation based on the additional data.

5. The tangible, non-transitory, computer-readable medium of claim 1, wherein the threshold amount of data is associated with a total time of data acquisition.

6. The tangible, non-transitory, computer-readable medium of claim 1 storing instructions that cause the computing device to perform operations comprising:

receiving an indication of a first communication network, wherein the first communication network enables a plurality of industrial assets and a control system to communicate, wherein the plurality of industrial assets comprises the industrial device and the sensor;

receiving the data from the sensor having a first format corresponding to the first communication network; and converting the data from the first format into a second format used in a second communication network associated with the computing device.

7. The tangible, non-transitory, computer-readable medium of claim 1 storing instructions that cause the computing device to perform operations comprising receiving the data from the sensor via an edge gateway device, wherein the edge gateway device is configured to convert the data from a first protocol into a second protocol not used by the sensor.

8. The tangible, non-transitory, computer-readable medium of claim 1 storing instructions that cause the computing device to perform operations comprising determining an alert level based on a plurality of alert scores corresponding to a plurality of days, a plurality of industrial devices, a plurality of sensors, or any combination thereof.

9. The tangible, non-transitory, computer-readable medium of claim 8 storing instructions that cause the computing device to perform operations comprising:

receiving a request for a graphical user interface from an additional computing device, wherein the request comprises an indication of a subset of the plurality of industrial devices and an indication of a time period;

generating an indication of the graphical user interface at least part by filtering a plurality of indications of alert levels based on the indication of the subset of the plurality of industrial devices and the indication of the time period, wherein the plurality of indications of alert levels comprises an indication of the alert level; and transmitting the indication of the graphical user interface to the additional computing device for presentation.

10. The tangible, non-transitory, computer-readable medium of claim 9 storing instructions that cause the computing device to perform operations comprising generating the indication of the graphical user interface, wherein the graphical user interface is configured to cause the additional computing device to present a visualization comprising:

an asset name indication;

an asset code indication;

a category indication;

a site name indication; and an alert level indication comprising a respective alert level of the plurality of indications of alert levels.

11. A tangible, non-transitory, computer-readable medium storing instructions that, when executed by processing circuitry of a computing device, cause the computing device to perform operations comprising:

receiving an indication of an industrial device and a data source, wherein the data source is associated with the industrial device;

generating a device model based on the indication of the industrial device and the data source, wherein the device model is configured to indicate a relationship between a normal operation of the industrial device and data acquired by one or more data sources including the data source during the normal operation;

receiving first data from the data source, wherein the data source is configured to acquire the first data during an operation of the industrial device;

determining a first alert score based on comparing the first data to the device model, wherein the first alert score indicates a forecasted probability of an alarm event occurring at the industrial device; and storing, in memory, an indication of a current state of the industrial device based on the first alert score.

12. The tangible, non-transitory, computer-readable medium of claim 11 storing instructions that cause the computing device to perform operations comprising generating the indication of the current state based on a plurality of alert scores generated based on data acquired by at least two data sources of the one or more data sources during the operation and the device model.

13. The tangible, non-transitory, computer-readable medium of claim 11 storing instructions that cause the computing device to perform operations comprising:

determining a remedial action based on the indication of the current state;

generating an indication of a work order based on the indication of the current state and an indication of the industrial device; and generating an indication of a graphical user interface configured to cause an additional computing device to present a visualization comprising the indication of the remedial action and a visualization comprising the indication of the work order, wherein the visualization comprising the indication of the work order is configured to link to a visualization of an indication of an asset profile of the industrial device.

14. The tangible, non-transitory, computer-readable medium of claim 11 storing instructions that cause the computing device to perform operations comprising:

receiving a request for a graphical user interface from an additional computing device, wherein the request comprises an indication of a subset of a plurality of industrial devices and an indication of a time period, wherein the plurality of industrial devices corresponds to a plurality of device models;

generating an indication of the graphical user interface at least in part by filtering a plurality of indications of alert scores based on the indication of the subset of the plurality of industrial devices and the indication of the time period, wherein the plurality of indications of alert scores comprises the first alert score; and transmitting the indication of the graphical user interface to the computing device, wherein the indication of the graphical user interface corresponds to a filtered subset of alert scores, the subset of the plurality of industrial devices, and the time period.

15. The tangible, non-transitory, computer-readable medium of claim 11 storing instructions that cause the computing device to perform operations comprising:

receiving a request for a graphical user interface from an additional computing device, wherein the request corresponds to a first format;

converting the request from the first format to a second format;

generating the indication for the graphical user interface in the second format based on the converted request;

converting the indication for the graphical user interface from the second format to the first format; and sending the converted indication for the graphical user interface to the additional computing device.

16. The tangible, non-transitory, computer-readable medium of claim 15, wherein receiving the first data comprises receiving the first data in the second format via an application programming interface configured to receive the first data in the first format.

17. A method comprising:

receiving an indication of an industrial device and a sensor, wherein the sensor is associated with the industrial device;

generating a device model based on the indication of the industrial device and the sensor, wherein the device model is configured to indicate a relationship between a normal operation of the industrial device and data acquired by a plurality of sensors including the sensor during the normal operation;

receiving first data from the sensor, wherein the sensor is configured to acquire the first data during an operation of the industrial device;

determining a first alert score based on comparing the first data to the device model, wherein the first alert score indicates a forecasted probability of an alarm event occurring at the industrial device;

determining an indication of a current state of the industrial device based on the first alert score; and generating an indication of a graphical user interface based on the indication of the current state.

18. The method of claim 17, comprising generating the indication of the current state based on a plurality of alert scores generated based on data respectively acquired by the plurality of sensors during the operation and based on the device model, wherein the plurality of alert scores comprises the first alert score; and processing the plurality of alert scores by averaging two or more alert scores of the plurality of alert scores, calculating a median of two or more alert scores of the plurality of alert scores, processing two or more alert scores of the plurality of alert scores based on one or more thresholds, or any combination thereof.

19. The method of claim 17, comprising:

receiving the first data from the sensor via an application programming interface configured to convert a first format to a second format;

receiving a request for a graphical user interface from an additional computing device, wherein the request corresponds to a third format;

converting the request from the third format to the second format;

generating an indication of the graphical user interface in the second format based on the converted request and the first data;

converting the indication of the graphical user interface from the second format to the first format; and sending the converted indication of the graphical user interface to the additional computing device.

20. The method of claim 19, comprising generating the indication of the graphical user interface based on the indication of the current state, wherein the graphical user interface is configured to cause the additional computing device to present a visualization comprising:

a sensor name indication;

an asset name indication;

an alert score indication corresponding to the first alert score; or an alert level indication corresponding to the indication of the current state; or any combination thereof.

\* \* \* \* \*